(12) United States Patent
Lee et al.

(10) Patent No.: US 12,446,748 B2
(45) Date of Patent: Oct. 21, 2025

(54) CORDLESS VACUUM CLEANER AND METHOD OF CONTROLLING OPERATION OF CORDLESS VACUUM CLEANER

(71) Applicant: SAMSUNG ELECTRONICS CO., LTD., Suwon-si (KR)

(72) Inventors: Seongu Lee, Suwon-si (KR); Hyunwoo Kim, Suwon-si (KR); Mijeong Song, Suwon-si (KR); Kunwoo Baek, Suwon-si (KR); Yeongju Lee, Suwon-si (KR); Jaeshik Jeong, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 63 days.

(21) Appl. No.: 18/589,433

(22) Filed: Feb. 28, 2024

(65) Prior Publication Data
US 2024/0298859 A1   Sep. 12, 2024

Related U.S. Application Data

(63) Continuation of application No. PCT/KR2024/002187, filed on Feb. 20, 2024.

(30) Foreign Application Priority Data
Mar. 9, 2023   (KR) .................. 10-2023-0031365

(51) Int. Cl.
*A47L 9/28* (2006.01)
*A47L 9/00* (2006.01)
*G01R 19/00* (2006.01)

(52) U.S. Cl.
CPC ........... *A47L 9/2805* (2013.01); *A47L 9/0063* (2013.01); *A47L 9/2842* (2013.01); *A47L 9/2847* (2013.01);
(Continued)

(58) Field of Classification Search
None
See application file for complete search history.

(56) References Cited

U.S. PATENT DOCUMENTS 10,886,763 B1   1/2021  Ha
2013/0033418 A1  2/2013  Bevilacqua et al.
(Continued)

FOREIGN PATENT DOCUMENTS

CN   106175599 A   12/2016
GB    2596854 A    1/2022
(Continued)

OTHER PUBLICATIONS

Google Patents translation of KR20200035735A (Year: 2025).*
(Continued)

*Primary Examiner* — Eric W Golightly
(74) *Attorney, Agent, or Firm* — CANTOR COLBURN LLP

(57) ABSTRACT

A method of controlling an operation of a cordless vacuum cleaner includes storing information about predefined movement patterns corresponding to a plurality of control commands in a memory of the cordless vacuum cleaner, in response to detecting that docking or charging of the cordless vacuum cleaner on a station device is terminated, detecting at least one movement pattern among the predefined movement patterns by analyzing movement information obtained via at least one motion sensor, identifying at least one control command corresponding to the detected at least one movement pattern, and controlling an operation of the cordless vacuum cleaner based on the identified at least one control command.

14 Claims, 30 Drawing Sheets

(52) U.S. Cl.
CPC ........... *A47L 9/2857* (2013.01); *A47L 9/2873* (2013.01); *A47L 9/2884* (2013.01); *A47L 9/2894* (2013.01); *G01R 19/0084* (2013.01)

(56) References Cited

U.S. PATENT DOCUMENTS

| | | |
|---|---|---|
| 2014/0033137 A1 | 1/2014 | Song et al. |
| 2017/0220038 A1 | 8/2017 | Lee et al. |
| 2020/0029769 A1 | 1/2020 | Son et al. |
| 2020/0154967 A1 | 5/2020 | Sato et al. |
| 2021/0068606 A1 | 3/2021 | Lee et al. |
| 2024/0074632 A1* | 3/2024 | Lee ..................... A47L 9/0411 |

FOREIGN PATENT DOCUMENTS

| | | |
|---|---|---|
| GB | 2596855 A | 1/2022 |
| GB | 2596856 A | 1/2022 |
| GB | 2596857 A | 1/2022 |
| GB | 2596858 A | 1/2022 |
| GB | 2596859 A | 1/2022 |
| GB | 2596860 A | 1/2022 |
| GB | 2596861 A | 1/2022 |
| GB | 2596862 A | 1/2022 |
| JP | 2017146775 A | 8/2017 |
| JP | 6405702 B2 | 10/2018 |
| JP | 6922842 B2 | 8/2021 |
| KR | 20140014548 A | 2/2014 |
| KR | 101832323 B1 | 2/2018 |
| KR | 101842459 B1 | 5/2018 |
| KR | 101914283 B1 | 11/2018 |
| KR | 20200035735 A | 4/2020 |
| KR | 102124509 B1 | 6/2020 |
| KR | 20210073032 A | 6/2021 |
| KR | 20210132785 A | 11/2021 |
| KR | 20210133720 A | 11/2021 |
| KR | 102343100 B1 | 12/2021 |

OTHER PUBLICATIONS

International Search Report mailed May 28, 2024 for PCT/KR2024/002187, citing the above reference(s). In conformance with MPEP 609—Concise explanation of the relevance includes issue date of foreign OA and references cited therein. 10 pages, not in English.

* cited by examiner

FIG. 8
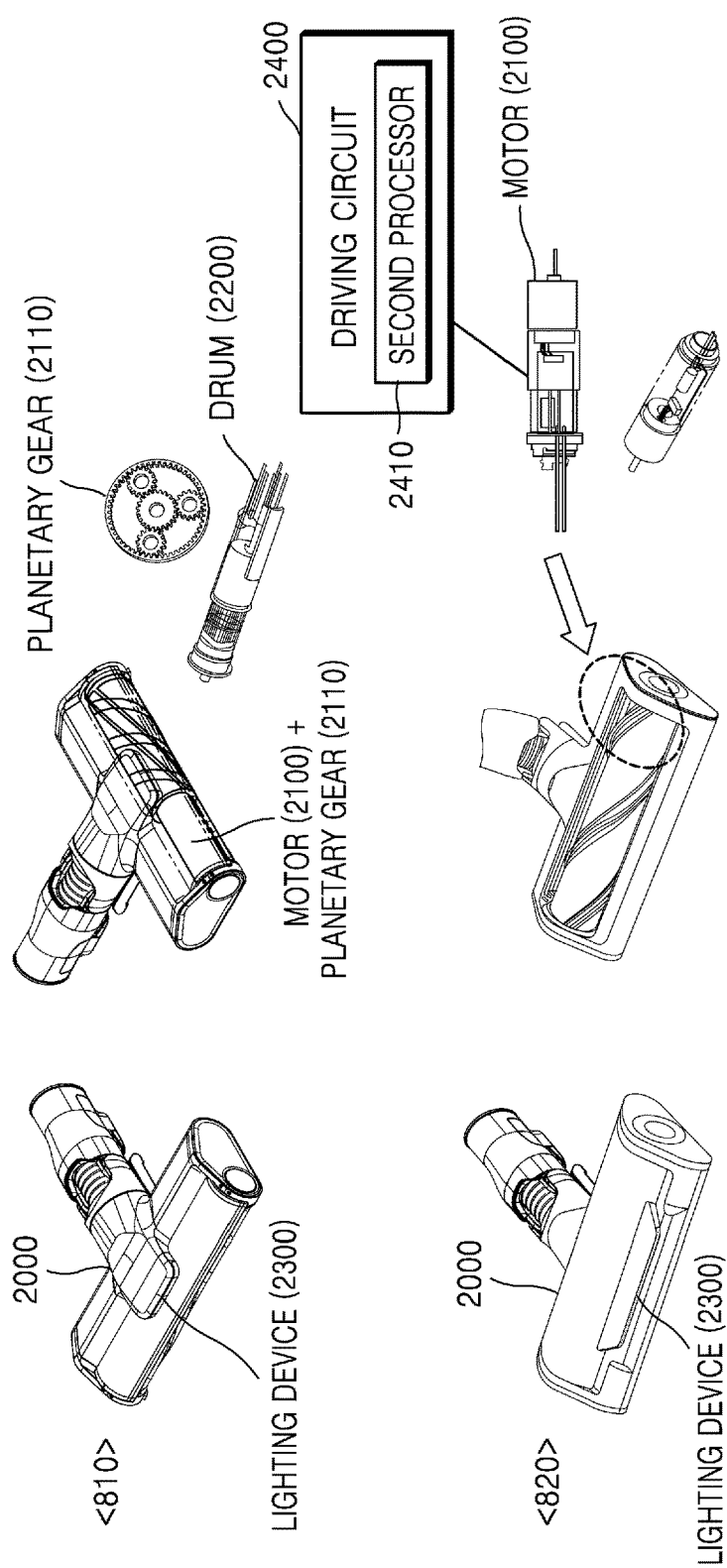
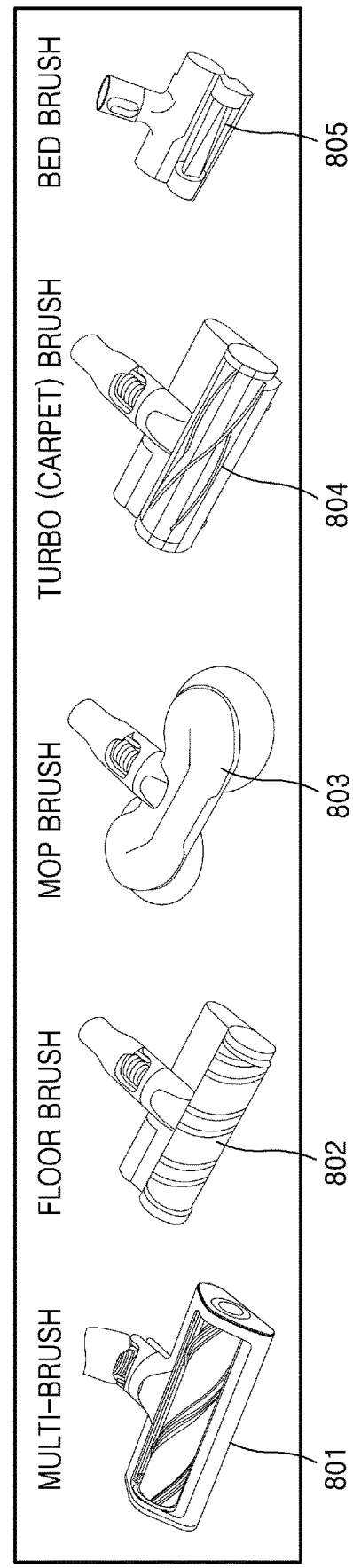

FIG. 12

| | 1 | 2 | 3 | 4 | 5 | 6 |
|---|---|---|---|---|---|---|
| GESTURE | CLOCKWISE | COUNTER CLOCKWISE | ↕ | ⬇⬇ | ⬆⬆ | ⬅⬅ |
| CORRESPONDING OPERATION | ROTATING CLOCKWISE | ROTATING COUNTERCLOCKWISE | CONSECUTIVELY MOVING LEFT/RIGHT (LEFT ← RIGHT → RIGHT → LEFT ←) | MOVING TWICE TO LEFT CONSECUTIVELY (LEFT ←←) | MOVING TWICE TO RIGHT CONSECUTIVELY (RIGHT →→) | MOVING TWICE UPWARD CONSECUTIVELY (UP ↑↑) |
| | SUCTION POWER STRENGTH UP (INCREASING FROM CURRENT REFERENCE) | SUCTION POWER STRENGTH DOWN (DECREASING FROM CURRENT REFERENCE) | STATIONARY: POWERING ON IN OPERATION: POWERING OFF | TURNING ON DISPLAY SCREEN | TURNING OFF DISPLAY SCREEN | MOVING DISPLAY MENU UP |
| | | | | | | GOING TO HIGHER-LEVEL MENU |
| NOTES | ROTATIONS AND LEFT/RIGHT MOVEMENTS MAY OCCUR ONCE, TWICE, THREE TIMES, ETC. | | | | | |

| | 7 | 8 | 9 | 10 | 11 | 12 |
|---|---|---|---|---|---|---|
| GESTURE | ➡➡ | ↻ ↺ | Z | ⤢ | ⤡ | ⤡ |
| CORRESPONDING OPERATION | MOVING TWICE DOWNWARD TWICE CONSECUTIVELY (DOWN↓↓) | ROTATING HALF TURN CLOCKWISE (ROTATING HALF TURN COUNTERCLOCKWISE) | MOVING CONSECUTIVELY IN Z SHAPE (→↙→) | MOVING CONSECUTIVELY IN ↙→ DIRECTIONS | MOVING CONSECUTIVELY IN ←↗ DIRECTIONS | MOVE CONSECUTIVELY IN →↘ DIRECTIONS |
| | GOING TO Display Menu Down | BRUSH RPM UP (BRUSH RPM DOWN) | PERFORMING SELF-DIAGNOSIS | SWITCHING TO ENERGY SAVING MODE | OPERATING IN JET MODE FOR 2 SECONDS (SWITCHING TO DEFAULT MODE AFTER 2 SECONDS) | VOICE NOTIFICATION MODE On ↔ OFF |
| | GOING TO LOWER-LEVEL MENU | | | | | |
| NOTES | AMOUNT OF TURNING MAY BE 0.5/1/1.5 TURNS | | | | | |

FIG. 15
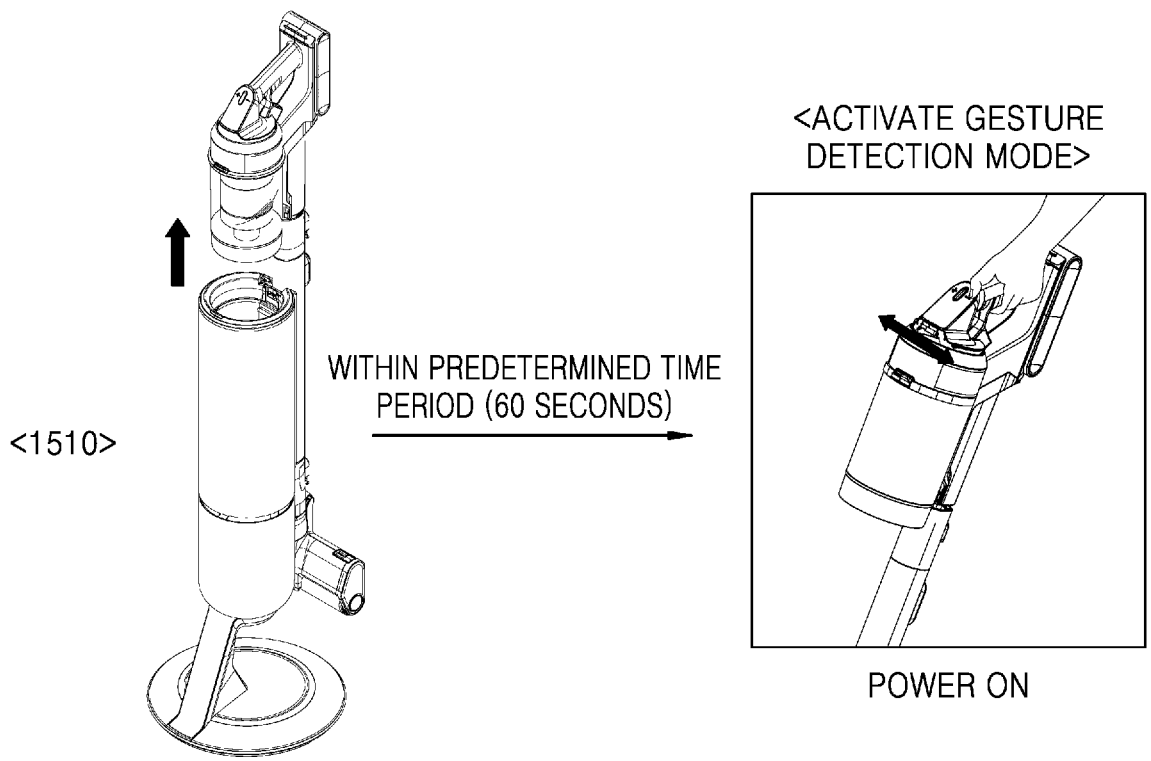
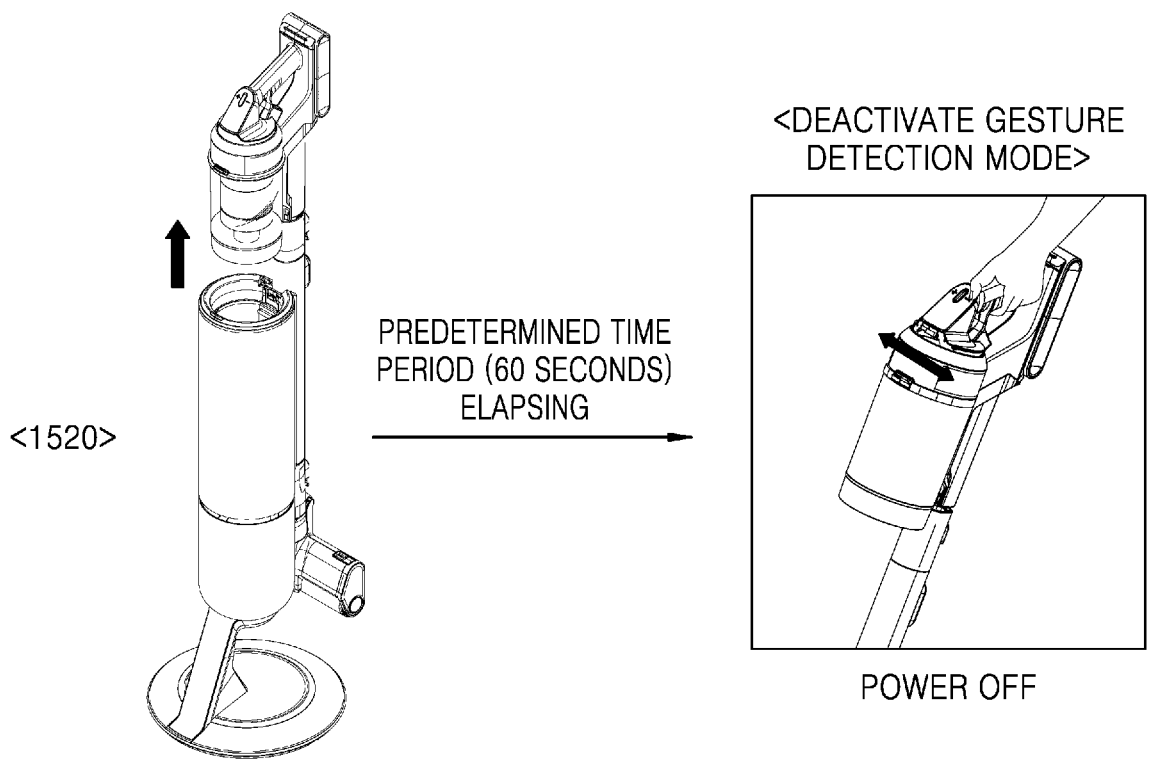

FIG. 19
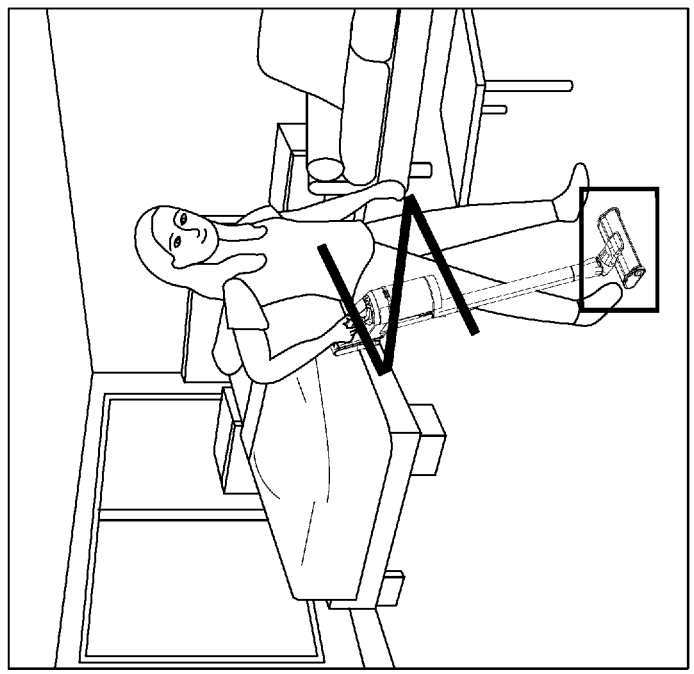
<1920>
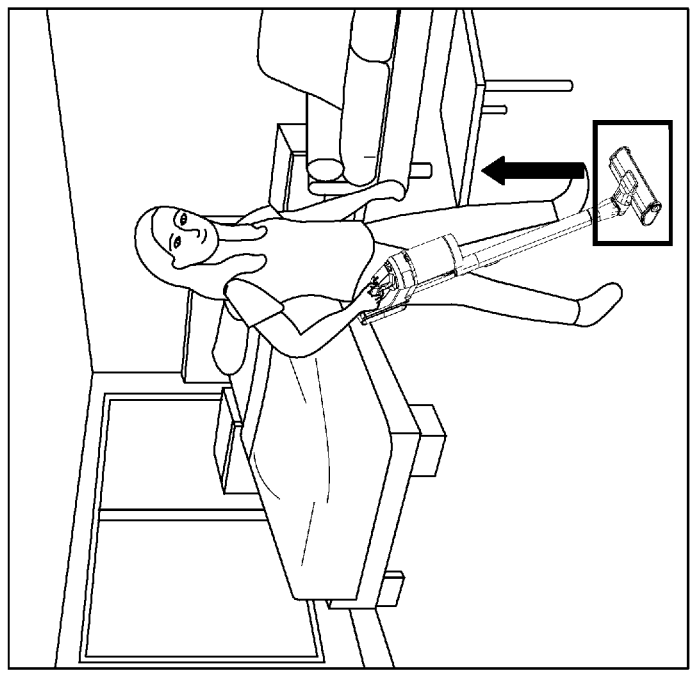
<1910>

| STATUS CHECKING | 2101 | 2102 | 2103 | 2104 | 2105 |
|---|---|---|---|---|---|
| | USER CHECKING | AUTOMATIC CALIBRATION | NORMAL | AUTOMATIC CALIBRATION | USER CHECKING |
| MEASUREMENT DATA (Pa) | 0 ~ 200 | 200 ~ 300 | 300 ~ 500 | 500 ~ 1000 | 1000↑ |
| CHECKING GUIDE | CHECK DUST BIN (EMPTY DUST BIN/ CLEAN FILTER) | AI MODEL AUTOMATIC CALIBRATION | — | AI MODEL AUTOMATIC CALIBRATION | CHECK FOR CLOGGING IN FLOW PATH (PIPE, BRUSH, ETC.) |

FIG. 27
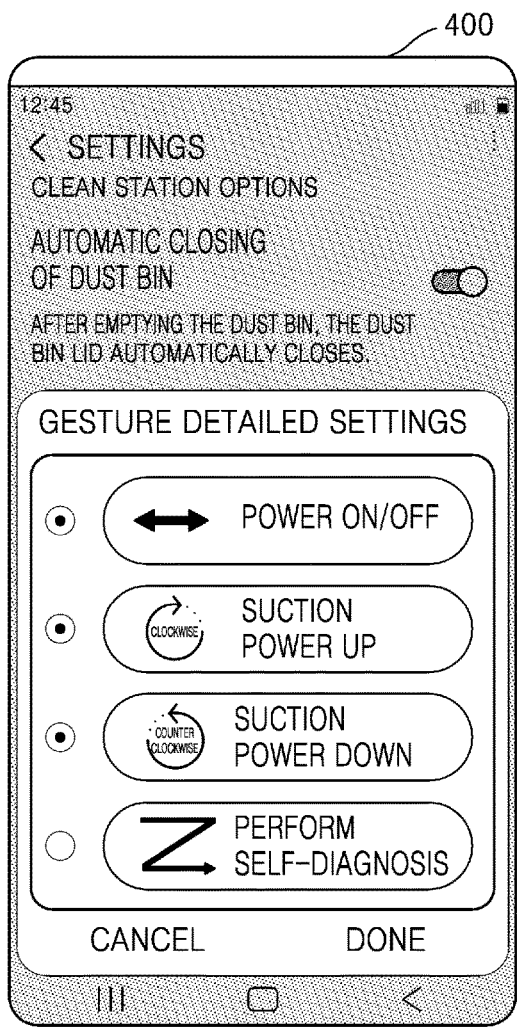
<2710>
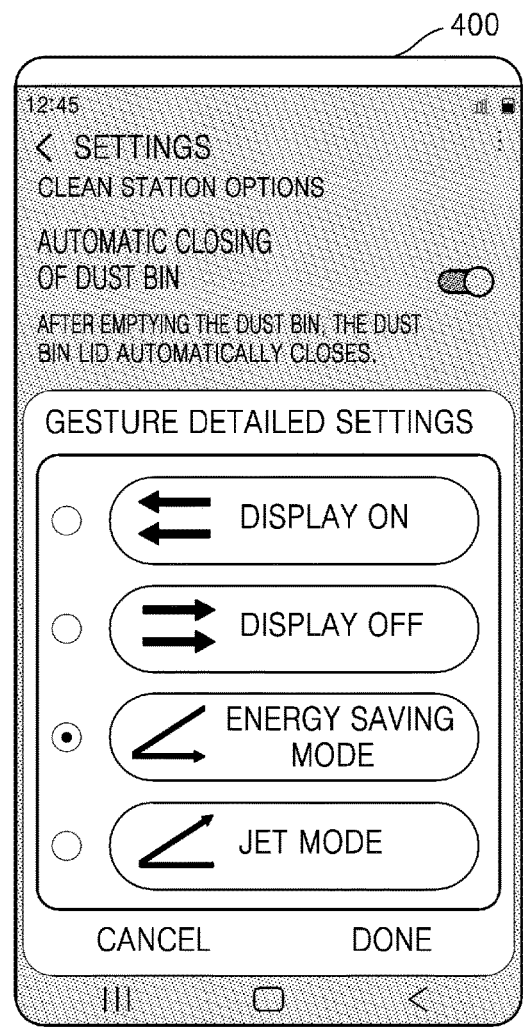
<2720>

CORDLESS VACUUM CLEANER AND METHOD OF CONTROLLING OPERATION OF CORDLESS VACUUM CLEANER

CROSS-REFERENCE TO RELATED APPLICATIONS

This application is a continuation application, under 35 U.S.C. § 111(a), of International Patent Application No. PCT/KR2024/002187, filed on Feb. 20, 2024, which claims priority to Korean Patent Application No. 10-2023-0031365, filed on Mar. 9, 2023, the content of which in its entirety is herein incorporated by reference.

TECHNICAL FIELD

Embodiments of the disclosure relate to a cordless vacuum cleaner for controlling an operation in response to detecting a predefined movement pattern, and a method of controlling an operation of the cordless vacuum cleaner.

BACKGROUND ART

A cordless vacuum cleaner is a type of vacuum cleaner operated by charging a battery built into the vacuum cleaner itself without the need to connect a wire to an outlet. The cordless vacuum cleaner includes a suction motor for generating a suction power, and may suck in foreign substances such as dust along with air from a cleaner head (brush) by the suction power generated by the suction motor, and separate the sucked in foreign substances from the air to collect the foreign substances.

Recently, more different types of cleaner heads (brushes) connected to a main body of a cordless vacuum cleaner are becoming available. Brushes of the cordless vacuum cleaner may be divided into a main brush which is generally used to clean the floor, and an auxiliary brush which is used for special purposes. To be adaptively applicable to various cleaning environments, the types of auxiliary brushes used for special purposes are being further subdivided. Various types of brushes may each have a different mechanical structure and different motor specifications (power consumption, shape, etc.). As the types of brushes are becoming more diverse, the number of functions of the cordless vacuum cleaner, which may be controlled by a user, is being gradually increasing.

SUMMARY

For current cordless vacuum cleaners, it is cumbersome and inconvenient for the user to manipulate a control panel during cleaning. Therefore, methods that allow users to more easily manipulate functions of a cordless vacuum cleaner are desired.

A cordless vacuum cleaner in an embodiment of the disclosure may include at least one motion sensor which obtains movement information of the cordless vacuum cleaner, a memory storing information about predefined movement patterns corresponding to a plurality of control commands, and at least one processor. The at least one processor of the cordless vacuum cleaner may, in response to detecting that docking or charging of the cordless vacuum cleaner on a station device is terminated, detect at least one movement pattern among the predefined movement patterns by analyzing the movement information obtained via the at least one motion sensor. The at least one processor of the cordless vacuum cleaner may identify at least one control command corresponding to the detected at least one movement pattern. The at least one processor of the cordless vacuum cleaner may control an operation of the cordless vacuum cleaner based on the identified at least one control command.

A method of controlling an operation of a cordless vacuum cleaner in an embodiment of the disclosure, may include storing information about predefined movement patterns corresponding to a plurality of control commands in a memory of the cordless vacuum cleaner. The method of controlling the operation of the cordless vacuum cleaner may include, in response to detecting that docking or charging of the cordless vacuum cleaner on a station device is terminated, analyzing movement information obtained via at least one motion sensor to detect at least one movement pattern among the predefined movement patterns. The method of controlling the operation of the cordless vacuum cleaner may include identifying at least one control command corresponding to the detected at least one movement pattern. The method of controlling the operation of the cordless vacuum cleaner may include controlling an operation of the cordless vacuum cleaner based on the identified at least one control command.

BRIEF DESCRIPTION OF DRAWINGS

The above and other exemplary embodiments, advantages and features of this disclosure will become more apparent by describing in further detail exemplary embodiments thereof with reference to the accompanying drawings, in which:

FIG. 8 is a diagram illustrating an embodiment of a brush device according to the disclosure.

FIG. 12 is a diagram illustrating an embodiment of an operation in which a cordless vacuum cleaner detects termination of docking thereof to a station device, according to the disclosure.

FIG. 15 is a diagram illustrating an embodiment of an operation in which a cordless vacuum cleaner activates or deactivates a gesture detection mode, according to the disclosure.

FIG. 19 is a diagram illustrating an embodiment of an operation in which a cordless vacuum cleaner performs self-diagnosis according to a user gesture according to the disclosure.

FIG. 27 is a diagram illustrating an embodiment of a GUI for inputting detailed gesture settings, according to the disclosure.

DETAILED DESCRIPTION

Figure 1:
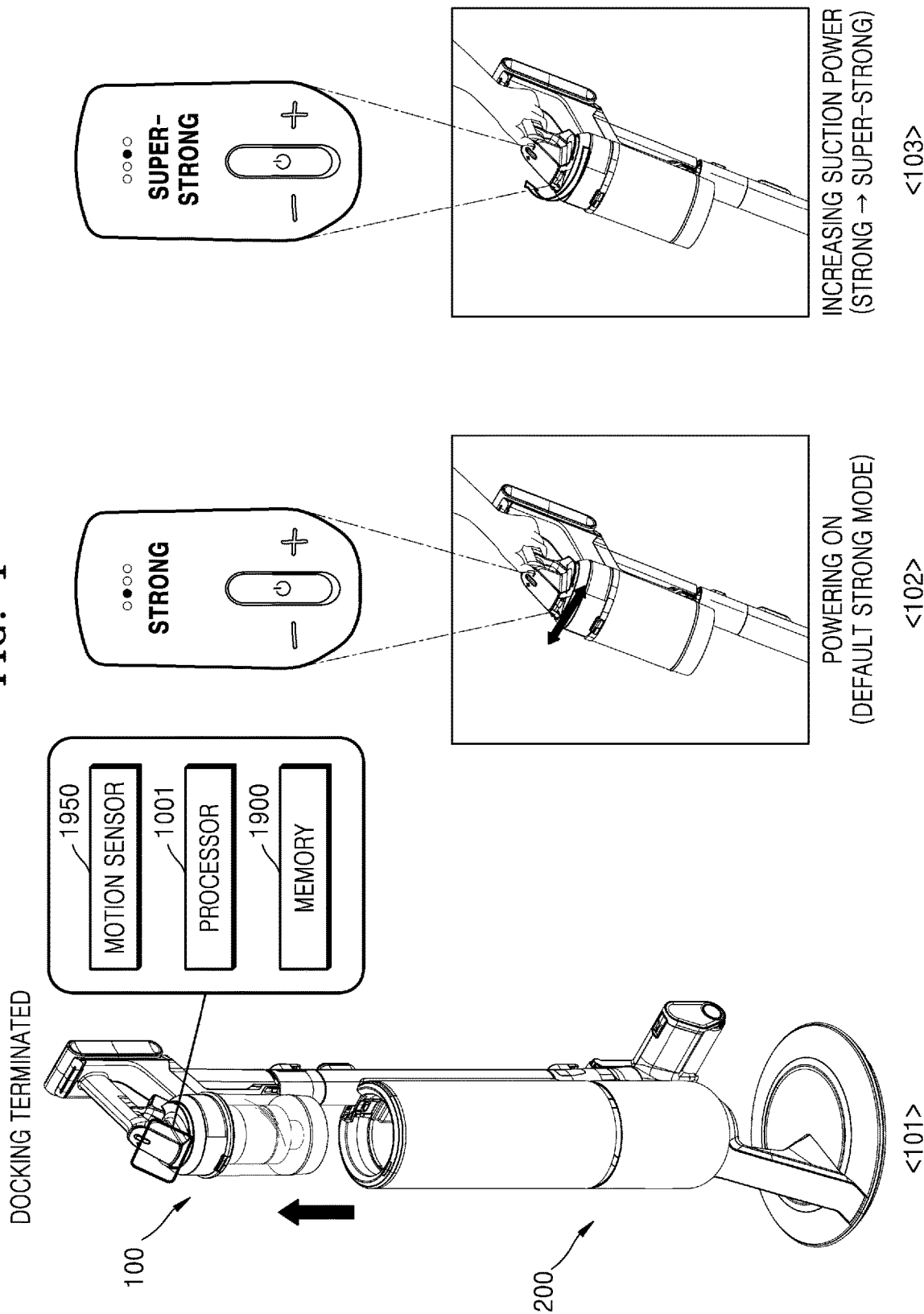
FIG. 1 is a diagram illustrating a cleaning system for detecting gestures, according to the disclosure.

Terms used in the disclosure will now be briefly described and an embodiment of the disclosure will be described in detail.

As the terms used herein, general terms that are currently widely used are selected by taking functions in an embodiment of the disclosure into account, but the terms may be changed according to an intention of one of ordinary skill in the art, precedent cases, advent of new technologies, etc. Furthermore, specific terms may be arbitrarily selected by the applicant, and in this case, the meaning of the selected terms will be described in detail in the detailed description of a corresponding embodiment of the disclosure. Thus, the terms used herein should be defined not by simple appellations thereof but based on the meaning of the terms together with the overall description of the disclosure.

Throughout the disclosure, the expression "at least one of a, b or c" indicates only a, only b, only c, both a and b, both a and c, both b and c, all of a, b, and c, or variations thereof.

Throughout the disclosure, when a part "includes" or "comprises" an element, unless there is a particular description contrary thereto, the part may further include other elements, not excluding the other elements. Furthermore, terms, such as "portion," "module," etc., used herein indicate a unit for processing at least one function or operation, and may be embodied as hardware or software or a combination of hardware and software.

An embodiment of the disclosure will be described more fully hereinafter with reference to the accompanying drawings so that the embodiment of the disclosure may be easily implemented by one of ordinary skill in the art of the disclosure. However, an embodiment of the disclosure may be implemented in different forms, and the disclosure should not be construed as being limited to embodiments of the disclosure set forth herein. In addition, parts not related to descriptions are omitted to clearly explain an embodiment of the disclosure in the drawings, and like reference numerals denote like elements throughout.

FIG. 1 is a diagram illustrating an embodiment of a cleaning system for detecting gestures, according to the disclosure.

Referring to FIG. 1, a cleaning system for detecting gestures in an embodiment of the disclosure may include a cordless vacuum cleaner 100 and a station device 200.

However, at least one of the components shown in FIG. 1 may not be an essential component. The cleaning system may be implemented with more or fewer components than those shown in FIG. 1. In an embodiment, the cleaning system may be implemented to further include a server device (not shown) and a user terminal (not shown), for example. The cleaning system further including the server device and the user terminal will be described in detail below with reference to FIG. 10.

The cordless vacuum cleaner 100 may refer to a vacuum cleaner that has a built-in rechargeable battery and does not need to connect a power cord to an outlet during cleaning. The user may move the cordless vacuum cleaner 100 back and forth using a handle disposed (e.g., mounted) on a cleaner main body to allow a brush device (a cleaner head) to suck up foreign substances (e.g., dust, hair, debris, etc.) from a surface to be cleaned. The cordless vacuum cleaner 100 may include a suction motor that creates a vacuum inside the cordless vacuum cleaner 100. The foreign substances sucked from the surface to be cleaned via the brush device may be collected in a dust bin (1200 in FIG. 4, for example, also referred to as a dust collection container) of the cleaner main body. In an embodiment of the disclosure, the cordless vacuum cleaner 100 may include at least one motion sensor 1950 for obtaining movement information of the cordless vacuum cleaner 100, at least one processor 1001, and a memory 1900 for storing information about predefined movement patterns corresponding to a plurality of control commands. The components of the cordless vacuum cleaner 100 are described in detail below with reference to FIGS. 2 to 4.

The station device 200 may be a device for charging a battery of the cordless vacuum cleaner 100 and storing (docking) the cordless vacuum cleaner 100. Furthermore, the station device 200 may be a device for discharging dust, charging the battery, and storing (docking) the cordless vacuum cleaner 100. The station device 200 may also be expressed as a charging station or a clean station. In an embodiment of the disclosure, the station device 200 may be fixed to a wall or stand on the floor.

In an embodiment of the disclosure, the station device 200 may communicate with the cordless vacuum cleaner 100 or the server device over a network (NET). In an embodiment, the station device 200 may transmit and receive data to and from the cordless vacuum cleaner 100 over a short-range wireless network (wireless personal area network (WPAN)) without connecting to an access point (AP), for example. The station device 200 may also transmit and receive data to and from the server device via an AP that connects a local area network (LAN) to which the station device 200 is connected to a wide area network (WAN) to which the server device is connected. In an embodiment, the station device 200 may be connected to the cordless vacuum cleaner 100 via Bluetooth Low Energy (BLE) communication, and may be connected to the server device via Wi-Fi™ communication (based on Institute of Electrical and Electronics (IEEE) 802.11 standard), for example, but is not limited thereto.

Referring to 101 in FIG. 1, when the user separates the cordless vacuum cleaner 100 docked to the station device 200 from the station device 200 to use the cordless vacuum cleaner 100, the cordless vacuum cleaner 100 may detect that the docking or charging of the cordless vacuum cleaner 100 on the station device 200 is terminated. In this case, because the user is highly likely to control the cordless vacuum cleaner 100, the cordless vacuum cleaner 100 may analyze movement information of the cordless vacuum cleaner 100, which is obtained via the motion sensor 1950, to detect a user gesture. In an embodiment, in order to control the cordless vacuum cleaner 100, the user may move the cleaner main body in a predefined movement pattern while holding the handle of the cleaner main body, for example. In this case, the cordless vacuum cleaner 100 may detect a predefined movement pattern by analyzing the movement information of the cordless vacuum cleaner 100 obtained via the motion sensor 1950. When the predefined movement pattern is detected, the cordless vacuum cleaner 100 may control an operation thereof based on a control command corresponding to the predefined movement pattern. A predefined movement pattern may also be hereinafter referred to as a gesture or a user gesture. Predefined movement patterns (user gestures) may be defined in various ways depending on a function of the cordless vacuum cleaner 100 or a type of a control command.

Referring to 102 in FIG. 1, a movement pattern achieved by shaking the cleaner main body left and right may be predefined with respect to an operation of turning on power. When the user shakes the cleaner main body left and right within a predetermined time period after separating the cordless vacuum cleaner 100 from the station device 200, the cordless vacuum cleaner 100 may detect termination of docking thereof to the station device 200 and a movement pattern in which the cleaner main body shakes left and right, and automatically turn on the power. When the cordless vacuum cleaner 100 is turned on, the cordless vacuum cleaner 100 may operate in a default mode (e.g., strong mode). That is, the user may easily turn on the cordless vacuum cleaner 100 by simply shaking the cleaner main body left and right instead of pressing a power button.

The cordless vacuum cleaner 100 may deactivate a gesture detection mode when a predefined movement pattern (e.g., a movement pattern in which the cleaner main body shakes left and right) is not detected for a predetermined time period (e.g., 60 seconds) after detecting the termination of docking to the station device 200. The gesture detection mode is intended for detecting predefined movement patterns, and when the gesture detection mode is deactivated, the cordless vacuum cleaner 100 may ignore a predefined movement pattern even when the predefined movement pattern is input. In an embodiment, the user may separate the cordless vacuum cleaner 100 from the station device 200 to use the cordless vacuum cleaner 100, but when the doorbell rings, the cordless vacuum cleaner 100 may be temporarily left standing by leaning the cordless vacuum cleaner 100 against the wall. In this case, a safety issue may occur when the cordless vacuum cleaner 100 turns on the power by incorrectly detecting a movement of the cordless vacuum cleaner 100 leaning against the wall and then falling over as a movement pattern in which the cleaner main body shakes left and right, for example. Thus, when the predetermined time period (e.g., 60 seconds) has elapsed since detecting the termination of docking to the station device 200, the cordless vacuum cleaner 100 may not respond to a predefined movement pattern even when the predefined movement pattern is input. A method of increasing safety and reducing battery consumption by deactivating a gesture detection mode when a predefined movement pattern is not detected for a predetermined time period after docking of the cordless vacuum cleaner 100 to the station device 200 is terminated will be described in more detail below with reference to FIG. 14.

Referring to 103 in FIG. 1, a movement pattern of rotating the cleaner main body clockwise may be predefined with respect to an operation of adjusting the strength of a suction power. In this case, when the user rotates the cleaner main body clockwise during cleaning, the cordless vacuum cleaner 100 may detect a movement pattern in which the cleaner main body rotates clockwise. The cordless vacuum cleaner 100 may adjust the strength of a suction power to be higher than a current level in response to detecting a movement pattern in which the vacuum cleaner main body rotates clockwise. In an embodiment, when a current operation mode is a strong mode, the cordless vacuum cleaner 100 may change the operation mode to a super-strong mode, for example. That is, the user may easily adjust the strength of the suction power of the cordless vacuum cleaner 100 via a simple operation of rotating the cleaner main body clockwise instead of pressing a suction power button.

Therefore, according to the disclosure, the user may easily manipulate the cordless vacuum cleaner 100 by moving the cleaner main body according to a predefined movement pattern (user gesture). A method, performed by the cordless vacuum cleaner 100, of controlling an operation thereof in response to detecting a predefined movement pattern (user gesture) will be described in detail below with reference to FIG. 11, and the cordless vacuum cleaner 100 and the station device 200 are described in more detail with reference to FIG. 2.

Figure 2:
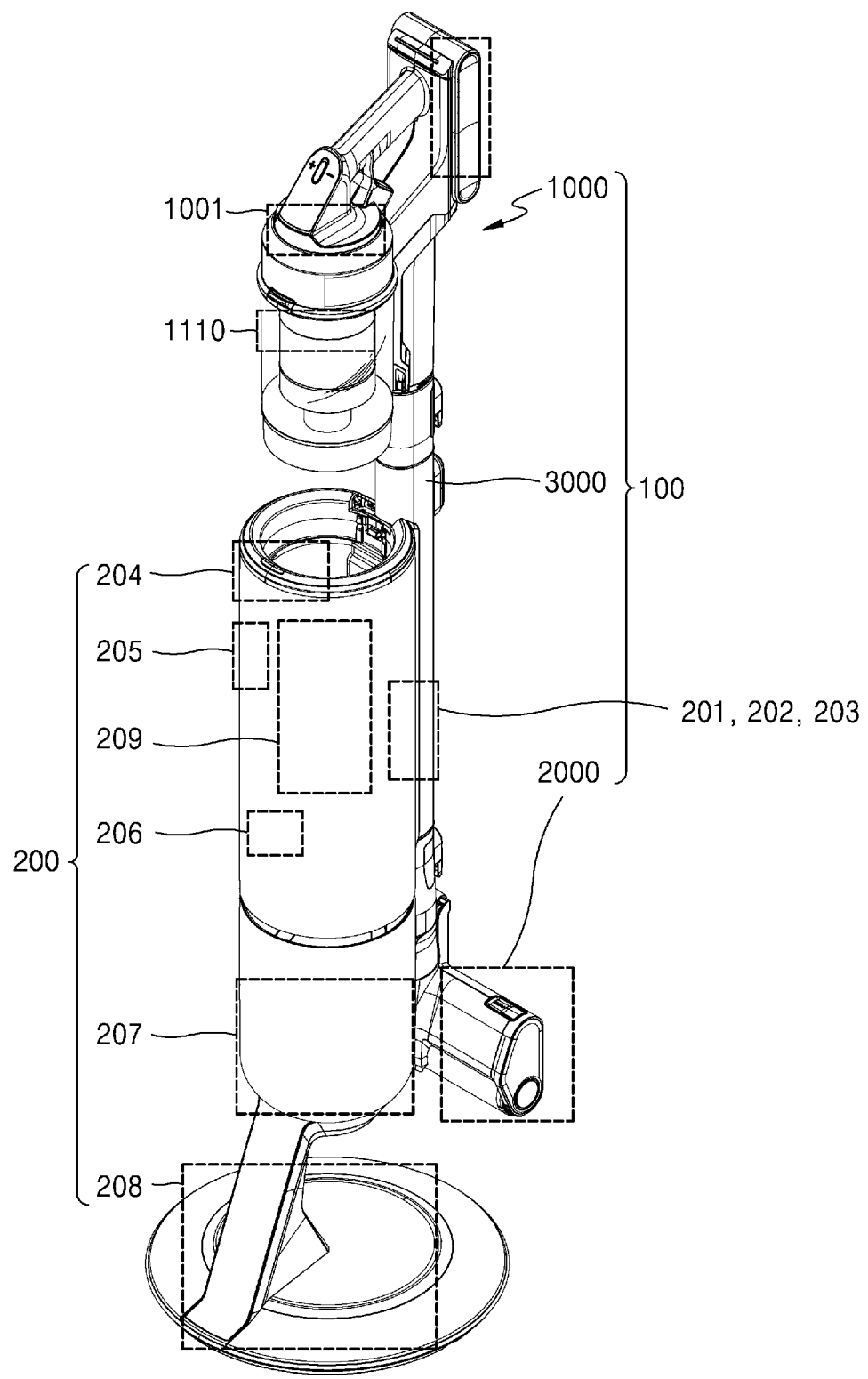
FIG. 2 is a diagram illustrating a cleaning system according to the disclosure.

FIG. 2 is a diagram illustrating an embodiment of a cleaning system according to the disclosure.

In an embodiment of the disclosure, a cordless vacuum cleaner 100 may be a stick-type cleaner including a cleaner main body 1000, a brush device 2000, and an extension pipe (or an extension tube) 3000. However, at least one of the components shown in FIG. 2 may not be an essential component. The cordless vacuum cleaner 100 may be implemented with more or fewer components than those shown in FIG. 2. In an embodiment, the cordless vacuum cleaner 100 may be implemented with the cleaner main body 1000 and the brush device 2000, excluding the extension pipe 3000, for example.

The cleaner main body 1000 is a part that the user may hold in one hand and move during cleaning, and may include a suction motor 1110 (hereinafter also referred to as a first suction motor) that creates a vacuum inside the cordless vacuum cleaner 100. The suction motor 1110 may be disposed within the dust bin 1200 (refer to FIG. 4) where foreign substances sucked in from a surface being cleaned (e.g., floor, bedding, sofa, etc.) are received. The cleaner main body 1000 may further include, in addition to the suction motor 1110, at least one processor 1001, a battery, a memory 1900 storing software related to control of the cordless vacuum cleaner 100, and a motion sensor 1950, but is not limited thereto. The cleaner main body 1000 is described in more detail below with reference to FIG. 3.

The brush device 2000 is a device that is in close contact with a surface to be cleaned and is capable of sucking in air and foreign substances from the surface to be cleaned. The brush device 2000 may also be also referred to as a cleaner head. The brush device 2000 may be rotatably coupled to the extension pipe 3000. The brush device 2000 may include a motor, a drum with a rotating brush attached thereto, etc., but is not limited thereto. In an embodiment of the disclosure, the brush device 2000 may further include at least one processor for controlling communication with the cleaner main body 1000. The brush device 2000 may be of various types, and the types of brush device 2000 is described in detail below with reference to FIG. 5.

The extension pipe 3000 may be formed as a pipe having predetermined rigidity or a flexible hose. The extension pipe 3000 may transmit a suction power generated by the suction motor 1110 of the cleaner main body 1000 to the brush device 2000, and move the air and foreign substances sucked in via the brush device 2000 to the cleaner main body 1000. The extension pipe 3000 may be detachably connected to the brush device 2000. The extension pipe 3000 may be formed in multiple stages between the cleaner main body 1000 and the brush device 2000. The extension pipe 3000 may be provided as two or more extension pipes 3000.

In an embodiment of the disclosure, each of the cleaner main body 1000, the brush device 2000, and the extension pipe 3000 included in the cordless vacuum cleaner 100 may include a power line (e.g., a positive (+) power line and a negative (−) power line) and a signal line.

The power line may be a line for transmitting power supplied from the battery to the cleaner main body 1000 and the brush device 2000 connected to the cleaner main body 1000. The signal line is different from the power line and may be a line for transmitting and receiving signals between the cleaner main body 1000 and the brush device 2000. The signal line may be implemented to be connected to the power line within the brush device 2000.

In an embodiment of the disclosure, each of the at least one processor 1001 of the cleaner main body 1000 and the at least one processor of the brush device 2000 may control an operation of a switch element connected to the signal line to perform two-way communication between the cleaner main body 1000 and the brush device 2000. Hereinafter, when the cleaner main body 1000 communicates with the brush device 2000 via a signal line, communication between the cleaner main body 1000 and the brush device 2000 may be defined as 'signal line communication'. Moreover, the cleaner main body 1000 may communicate with the brush device 2000 by inter-integrated circuit (I2C) communication or universal asynchronous receiver/transmitter (UART) communication.

In an embodiment of the disclosure, in addition to detecting whether the brush device 2000 is attached to or detached from the cleaner main body 1000, the cleaner main body 1000 may identify a type of the brush device 2000 and adaptively control an operation of the brush device 2000 (e.g., drum rotations per minute (RPM)) based on a status of an environment in which the brush device 2000 is being used (hereinafter, a 'usage environment status of the brush device 2000', e.g., hard floor, carpet, mat, corner, a state of the brush device 2000 being lifted from a surface being cleaned, etc.) In an embodiment, the cleaner main body 1000 may periodically communicate with the brush device 2000 to transmit, to the brush device 2000, a signal for controlling the operation of the brush device 2000, for example.

In an embodiment of the disclosure, the station device 200 may include a communication interface 201, a memory 202, and at least one processor 203. The station device 200 may further include a user interface 204, a wired connector 205, a pressure sensor 206 (hereinafter, also referred to as a second pressure sensor), a suction motor 207 (also referred to as a second suction motor), and a power supply device 208, a dust collection container coupling portion, a collector 209, a filter unit, etc. However, at least one of the components shown in FIG. 2 may not be an essential component. The station device 200 may be implemented with more or fewer components than those shown in FIG. 2. Hereinafter, each of the components of the station device 200 is described.

The station device 200 may include the communication interface 201 for communicating with an external device. In an embodiment, the station device 200 may communicate with the cleaner main body 1000 of the cordless vacuum cleaner 100 or a server device via the communication interface 201, for example. In this case, the communication interface 201 may communicate with the server device by a first communication method (e.g., a Wi-Fi communication method) and with the cordless vacuum cleaner 100 by a second communication method (e.g., a BLE communication method).

The communication interface 201 may include a short-range communication interface, a long-range communication interface, etc. The short-range communication interface may include, but is not limited to, a Bluetooth communication interface, a BLE communication interface, a near field communication (NFC) interface, a Wi-Fi communication interface, a ZigBee communication interface, an Infrared Data Association (IrDA) communication interface, a Wi-Fi Direct (WFD) communication interface, an ultra-wideband (UWB) communication interface, an Ant+ communication interface, etc. The long-range communication interface may be used by the station device 200 to remotely communicate with the server device. The long-range communication interface may include the Internet, a computer network (e.g., a LAN or a WAN), and a mobile communication interface. The mobile communication interface may include, but is not limited to, a third generation (3G) module, a fourth generation (4G) module, a fifth generation (5G) module, a long-term evolution (LTE) module, a narrowband Internet of things (NB-IoT) module, an LTE machine (LTE-M) module, etc.

The communication interface 201 may transmit data to the at least one processor 203 via UART communication, but is not limited thereto.

The memory 202 of the station device 200 may store a program (e.g., one or more instructions) for processing and control by the at least one processor 203, and pieces of input/output data. In an embodiment, the memory 202 of the station device 200 may include, but is not limited to, software related to control of the station device 200, data regarding a status of the suction motor 207, measured values of the pressure sensor 206, and error occurrence data (failure history data), information about an operation mode for dust discharge (e.g., operating time of the suction motor 207 for each operation mode and a suction power generation pattern for each operation mode), a preset threshold suction power reduction amount and discharge timing conditions for a smart discharge mode, etc., for example. The memory 202 of the station device 200 may store data received from the cleaner main body 1000. In an embodiment, the station device 200 may store product information (e.g., identification information, model information, etc.) of the cordless vacuum cleaner 100 docked onto the station device 200, version information of software installed on the cordless vacuum cleaner 100, error occurrence data (failure history data) regarding the cordless vacuum cleaner 100, information about a mainly used cleaning mode, information about the amount of reduction in suction power calculated in a state in which the brush device 2000 is lifted, and information about the cumulative cleaning time after discharging dust, information about the cumulative number of cleaning operations after discharging dust, etc., for example.

The memory 202 may include at least one type of storage medium, i.e., at least one of a flash memory-type memory, a hard disk-type memory, a multimedia card micro-type memory, a card-type memory (e.g., an secure digital (SD) card or an extreme digital (XD) memory), random access memory (RAM), static RAM (SRAM), read-only memory (ROM), programmable ROM (PROM), electrically erasable PROM (EEPROM), a magnetic memory, a magnetic disc, or an optical disc. Programs stored in the memory 202 may be classified into a plurality of modules according to their functions.

The station device 200 may include the at least one processor 203. The station device 200 may include one processor or a plurality of processors. The at least one processor 203 according to the disclosure may include at least one of a central processing unit (CPU), a graphics processing unit (GPU), an accelerated processing unit (APU), a Many Integrated Core (MIC), a digital signal processor (DSP), or a neural processing unit (NPU). The at least one processor 203 may be implemented in the form of an integrated system on a chip (SoC) including one or more electronic components. The at least one processor 203 may be each implemented as separate hardware (H/W). The at least one processor 203 may also be also referred to as a micro-computer, microprocessor computer, or microprocessor controller (MICOM), a microprocessor unit (MPU), a microcontroller unit (MCU), or the like.

The at least one processor 203 according to the disclosure may be implemented as a single-core processor or as a multi-core processor.

The user interface 204 of the station device 200 may include an input interface and an output interface. The input interface may include a discharge start button, a discharge end button, a mode selection button, etc. The output interface may include, but is not limited to, a light-emitting diode (LED), a liquid crystal display (LCD), a touch screen, and an audio output module for voice guidance. The output interface may display a charge level of the battery of the cleaner main body 1000, software update progress information, etc., but is not limited thereto.

The station device 200 may include the wired connector 205. The wired connector 205 may include a terminal for connecting a computing device of a system administrator (e.g., service technician). The system administrator may connect the computing device storing a new version of software to the wired connector 205 and transfer the new version of the software to the memory 202 of the station device 200. In this case, when the new version of software is software related to control of the station device 200, pre-installed software of the station device 200 may be updated. When the new version of software is software related to control of the cordless vacuum cleaner 100, the station device 200 may deliver the new version of software to the cordless vacuum cleaner 100 according to whether a preset condition is satisfied. In an embodiment, when the cordless vacuum cleaner 100 is docked to the station device 200 and is capable of performing BLE communication with the cordless vacuum cleaner 100, the station device 200 may transmit the new version of software to the cordless vacuum cleaner 100, for example. In this case, the cordless vacuum cleaner 100 may update pre-installed software.

The pressure sensor 206 (second pressure sensor) of the station device 200 may be a sensor for measuring pressure inside the station device 200. The pressure sensor 206 may measure a pressure value before dust is discharged, a pressure value while dust is being discharged, or a pressure value after dust is discharged. The pressure sensor 206 may transmit a measured pressure value to the at least one processor 203 via I2C communication or UART communication. The pressure sensor 206 may be provided between the collector 209 and the suction motor 207, but is not limited thereto. When the pressure sensor 206 is provided between the collector 209 and the suction motor 207, the pressure sensor 206 is disposed in front of the suction motor 207, and thus, may be implemented as a negative pressure sensor.

The suction motor 207 (second suction motor) may be a device that generates suction power for discharging foreign substances collected in the dust bin 1200 of the cleaner main body 1000 from the cleaner main body 1000. The suction motor 207 may rotate a suction fan that moves air. The suction fan may include an impeller.

The power supply device 208 may include a switching mode power supply (SMPS) that receives alternating current (AC) power from a power source and converts the AC power into direct current (DC) power. When the cordless vacuum cleaner 100 is docked onto the station device 200, the DC power obtained via conversion by the power supply device 208 may be supplied to the battery of the cleaner main body 1000 via a charging terminal, thereby charging the battery.

The dust collection container coupling portion may be provided so that the dust collection container (the dust bin 1200) of the cleaner main body 1000 may be docked thereon. When the dust bin 1200 is seated on the dust collection container coupling portion, docking of the cleaner main body 1000 to the station device 200 may be completed. The dust collection container coupling portion may include a docking detection sensor for detecting docking of the cleaner main body 1000. The docking detection sensor may be a tunnel magnetoresistance (TMR) sensor, but is not limited thereto. The TMR sensor may sense whether the cleaner main body 1000 is docked by detecting a magnetic material attached to the dust bin 1200. The station device 200 may include a step motor (also referred to as a first step motor) that presses one side of a lid of the dust bin 1200 to open the lid of the dust bin 1200 (also referred to as a door of the dust bin 1200) when the dust bin 1200 is docked to the station device 200. The station device 200 may further include a step motor (also referred to as a second step motor) that presses one side of the lid of the dust bin 1200 to close the lid of the dust bin 1200 after dust discharge is completed.

The collector 209 is a space where foreign substances discharged from the dust bin 1200 of the cleaner main body 1000 may be collected. The collector 209 may include a dust bag in which the foreign substances discharged from the dust bin 1200 are collected. The dust bag includes or consists of a material that is permeable to air and impermeable to foreign substances, so that the foreign substances introduced into the collector 209 from the dust bin 1200 may be collected. The dust bag may be provided to be detachable from the collector 209. The station device 200 may include an ultraviolet (UV) irradiator that emits UV light toward the collector 209. The UV irradiator may include a plurality of UV lamps. The UV irradiator may inhibit the growth of bacteria in the collector 209 including the dust bag. In an embodiment, the UV irradiator may inhibit the growth of bacteria in dust accumulated in the dust bag, for example.

Figure 3:
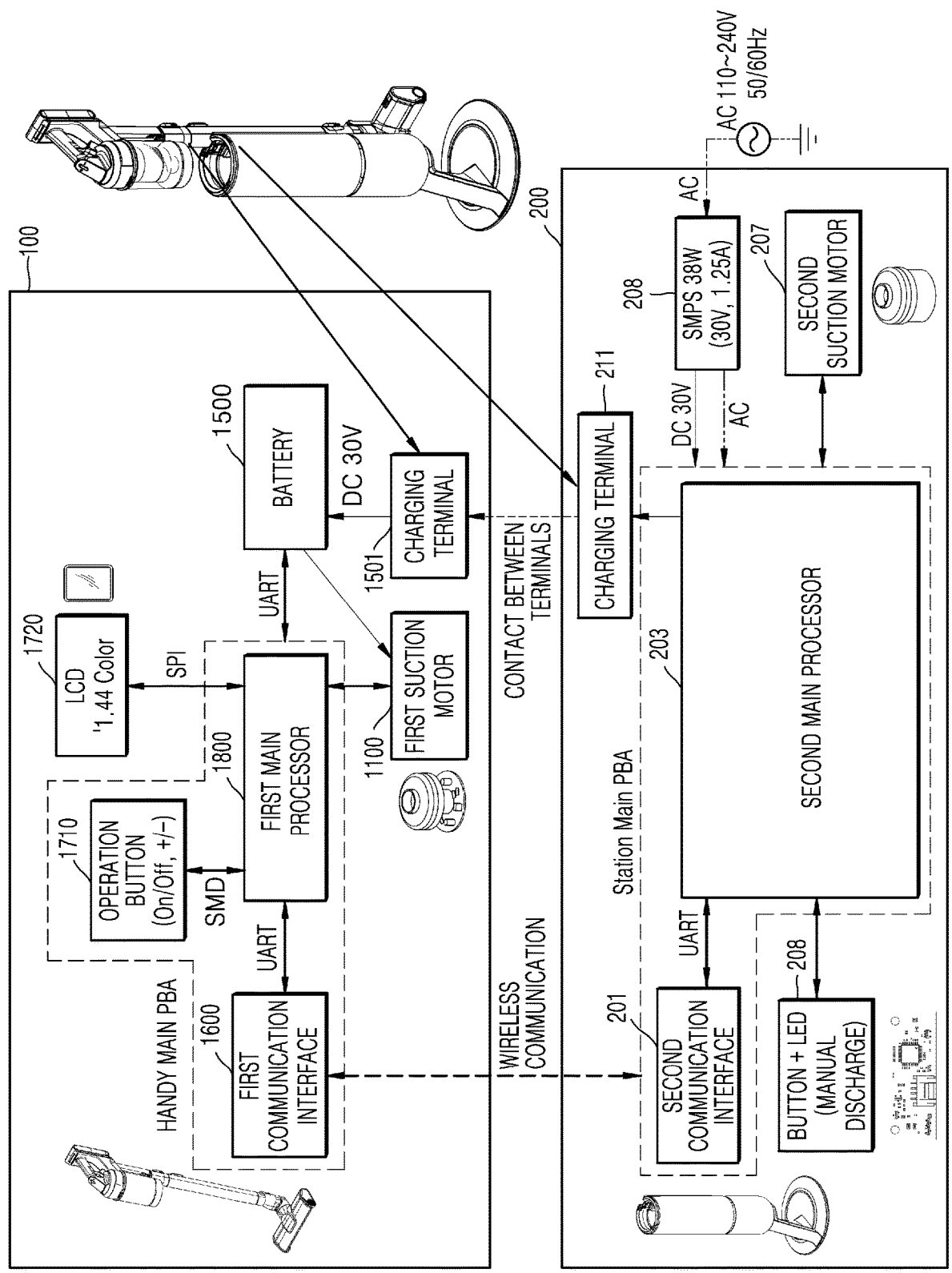
FIG. 3 is a block diagram illustrating an embodiment of functions of a cleaning system, according to the disclosure.

The filter unit may filter out ultrafine dust or the like that is not collected in the collector 209. The filter unit may include an outlet that allows air passing through the filter to be discharged to the outside of the station device 200. The filter unit may include a motor filter, a high-efficiency particulate air (HEPA) filter, etc., but is not limited thereto. FIG. 3 is a block diagram illustrating an embodiment of functions of a cleaning system, according to the disclosure.

In an embodiment of the disclosure, a cordless vacuum cleaner 100 may include, but is not limited to, a suction motor 1100 (hereinafter also referred to as a first suction motor), a battery 1500, a charging terminal 1501, and a communication interface 1600 (hereinafter also referred to as a first communication interface), an input interface 1710, an output interface 1720, and a main processor 1800 (hereinafter also referred to as a first main processor). In an embodiment of the disclosure, the first communication interface 1600, the input interface 1710, and the first main processor 1800 may be included in a main printed circuit board assembly (PBA) of the cleaner main body 1000. The components of the cordless vacuum cleaner 100 are described in more detail later with reference to FIG. 4.

In an embodiment of the disclosure, a station device 200 may include, but is not limited to, a communication interface 201 (hereinafter also referred to as a second communication interface), a main processor 203 (hereinafter also referred to as a second main processor), and a user interface 204 (refer to FIG. 2), a suction motor 207 (hereinafter also referred to as a second suction motor), a power supply device 208, and a charging terminal 211. The second communication interface 201 and the second main processor 203 may be included in a main PBA of the station device 200. Because the components of the station device 200 have been described in detail with reference to FIG. 2, descriptions already provided above will be omitted below.

In an embodiment of the disclosure, the station device 200 may be used for charging the battery 1500 included in the cordless vacuum cleaner 100. Thus, when the cordless vacuum cleaner 100 is docked to the station device 200, the charging terminal 1501 of the cordless vacuum cleaner 100 may contact the charging terminal 211 of the station device 200 connected to the power supply device 208 (e.g., SMPS), and the battery 1500 of the cordless vacuum cleaner 100 may receive a DC from the power supply device 208 of the station device 200 via the charging terminals 1501 and 211.

In an embodiment of the disclosure, when the cordless vacuum cleaner 100 is docked to the station device 200, the first communication interface 1600 of the cordless vacuum cleaner 100 and the second communication interface 201 of the station device 200 may form a short-range wireless communication channel. In an embodiment, the first communication interface 1600 of the cordless vacuum cleaner 100 and the second communication interface 201 of the station device 200 may perform BLE communication, for example, but are not limited thereto. The components of the cordless vacuum cleaner 100 are described in detail with reference to FIG. 4.

Figure 4:
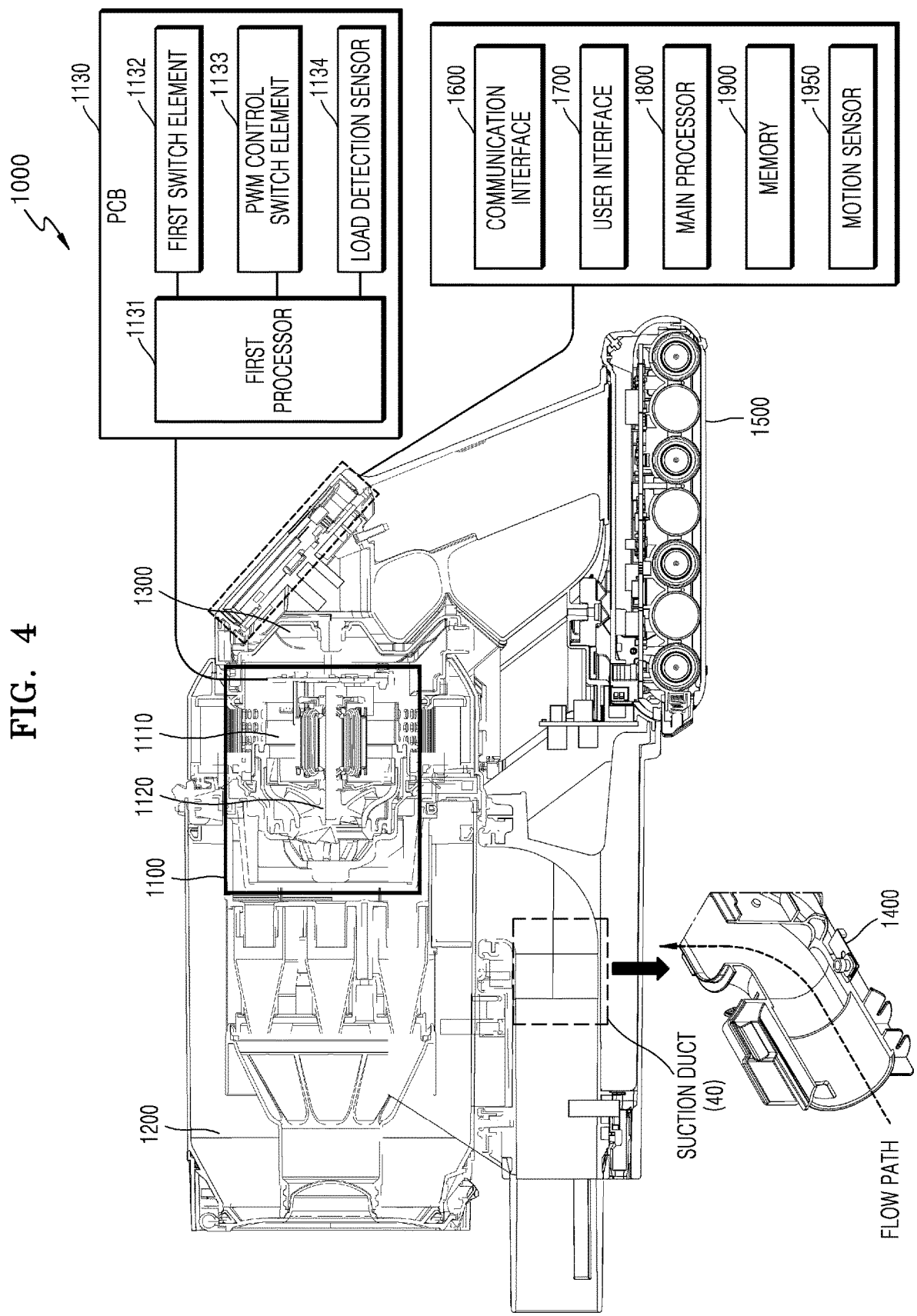
FIG. 4 is a diagram illustrating an embodiment of a cleaner main body according to the disclosure.

FIG. 4 is a diagram illustrating an embodiment of a cleaner main body 1000 according to the disclosure.

Referring to FIG. 4, the cleaner main body 1000 may include a suction power generating device (hereinafter referred to as the motor assembly 1100) that generates a suction power desired to suck in foreign substances on a surface to be cleaned, and a dust collection container 1200 (also referred to as a dust bin) in which foreign substances sucked in from the surface to be cleaned are received, a filter unit 1300, a pressure sensor 1400, a battery 1500 capable of supplying power to the motor assembly 1100, a communication interface 1600, a user interface 1700, at least one processor 1001 (e.g., a main processor 1800), a memory 1900, and at least one motion sensor 1950. However, at least one of the components shown in FIG. 4 may not be an essential component. The cleaner main body 1000 may be implemented with more or fewer components than those shown in FIG. 4.

Hereinafter, each of the components of the cleaner main body 1000 is described.

The motor assembly 1100 may include a suction motor 1110 that converts an electrical force into a mechanical rotational force, a fan 1120 (or impeller) that is connected to the suction motor 1110 and rotates, and a driving circuit (e.g., printed circuit board (PCB)) 1130 connected to the suction motor 1110. The suction motor 1110 and the fan 1120 rotating and connected to the suction motor 1110 may create a vacuum inside the cordless vacuum cleaner 100. In this case, the vacuum refers to a state in which the air pressure in a space is below the atmospheric pressure. The suction motor 1110 may include a brushless motor (hereinafter referred to as a brushless direct current (BLDC) motor), but is not limited thereto.

The driving circuit 1130 may include, but is not limited to, a processor (hereinafter referred to as a first processor 1131) that controls the suction motor 1110 and communication with the brush device 2000, a first switch element 1132 connected to a signal line, a switch element 1133 (hereinafter referred to as a pulse width modulation (PWM) control switch element) for controlling power supply to the brush device 2000, and a load detection sensor 1134 that detects load of the brush device 2000. The PWM control switch element 1133 may include a field effect transistor (FET), a bipolar junction transistor (BJT), an insulated gate bipolar transistor (IGBT), etc. The load detection sensor 1134 may include a shunt resistor, a shunt resistor and operational amplifier (OP-AMP) circuit, a current detection sensor, a magnetic field detection sensor (non-contact type), etc. Hereinafter, for convenience of description, the FET is described in an embodiment of the PWM control switch element 1133, and the shunt resistor is described in an embodiment of the load detection sensor 1134.

The first processor 1131 may obtain data related to a status of the suction motor 1110 (hereinafter referred to as status data) and transmit the status data on the suction motor 1110 to the main processor 1800. Furthermore, the first processor 1131 may control an operation of (e.g., turn on or turn off) the first switch element 1132 connected to the signal line to transmit a signal (hereinafter referred to as a first signal) to the brush device 2000 over the signal line. The first switch element 1132 is an element that may cause a state of the signal line to be low. In an embodiment, the first switch element 1132 may cause a voltage on the signal line to be 0 volt (V), for example. The first signal may include, but is not limited to, data indicating at least one of a target RPM of a rotating brush (hereinafter referred to as a target drum RPM) of the brush device 2000, a target trip level of the brush device 2000, or power consumption of the suction motor 1110. In an embodiment, the first signal may also include data for controlling a lighting device included in the brush device 2000, for example. The first signal may be implemented with a preset number of bits. In an embodiment, the first signal may be implemented with 5 bits or 8 bits, and may have a transmission period of 10 milliseconds (ms) per bit, for example, but is not limited thereto.

The first processor 1131 may detect a signal (hereinafter referred to as a second signal) transmitted by the brush device 2000 over a signal line. The second signal may include data indicating a current state of the brush device 2000, but is not limited thereto. In an embodiment, the second signal may include data regarding current operating conditions (e.g., a current drum RPM, a current trip level, a current value of settings of a lighting device, etc.), for example. In addition, the second signal may further include data indicating a type of the brush device 2000. The first processor 1131 may transmit, to the main processor 1800, data indicating the current state of the brush device 2000 or data indicating the type of the brush device 2000, which is included in the second signal.

The motor assembly 1100 may be disposed within the dust collection container 1200 (dust bin). The dust collection container 1200 may filter out and collect dust or dirt in the air drawn in through the brush device 2000. The dust collection container 1200 may be provided to be detachable from the cleaner main body 1000.

The dust collection container 1200 may collect foreign substances by a cyclone method that uses a centrifugal force to separate the foreign substances. The air from which the foreign substances are removed using the cyclone method may be expelled from the cleaner main body 1000, and the foreign substances may be stored in the dust collection container 1200. A multi-cyclone module may be disposed inside the dust collection container 1200. The dust collection container 1200 may be provided to collect foreign substances in a lower side of the multi-cyclone module. The dust collection container 1200 may include a dust collection container door (also referred to as a lid of the dust collection container 1200) that is provided so that the dust collection container 1200 is opened when connected to the station device 200. The dust collection container 1200 may include a first dust collector that primarily captures and collects relatively large foreign substances, and a second dust collector that captures and collects relatively small foreign substances by the multi-cyclone module. Both the first dust collector and the second dust collector may be disposed to open to the outside when the dust collection container door is opened.

The filter unit 1300 may filter out ultra-fine dust or the like that is not filtered out by the dust collection container 1200. The filter unit 1300 may include an outlet that allows air that has passed therethrough to be expelled out of the cordless vacuum cleaner 100. The filter unit 1300 may include a motor filter, a HEPA filter, etc., but is not limited thereto.

The pressure sensor 1400 may measure pressure inside a flow path (hereinafter also referred to as flow path pressure). For the pressure sensor 1400 provided at a suction side (e.g., a suction duct 40), the pressure sensor 1400 may measure static pressure to measure a change in flow rate at a corresponding location. The pressure sensor 1400 may be an absolute pressure sensor or a relative pressure sensor. When the pressure sensor 1400 is an absolute pressure sensor, the main processor 1800 may use the pressure sensor 1400 to sense a first pressure value before operating the suction motor 1110. In addition, the main processor 1800 may sense a second pressure value after driving the suction motor 1110 at a target RPM, and use a difference between the first pressure value and the second pressure value as a pressure value inside the flow path. In this case, the first pressure value may be a pressure value due to internal/external influences such as weather, altitude, status of the cordless vacuum cleaner 100, amount of sucked in dust, etc. The second pressure value may be a sum of a pressure value due to internal/external influences such as altitude, status of the cordless vacuum cleaner 100, amount of sucked in dust, etc., and a pressure value due to driving the suction motor 1110. A difference between the first pressure value and the second pressure value may be a pressure value according to driving the suction motor 1110. Thus, when the difference between the first pressure value and the second pressure value is used as the pressure value inside the flow path, the internal and external influences other than the suction motor 1110 may be minimized.

The flow path pressure measured by the pressure sensor 1400 may be used to identify a current usage environment status of the brush device 2000 (e.g., a state of a surface being cleaned (hardwood, carpet, mat, corner, etc.), a state of the brush device 2000 being lifted from the surface being cleaned, etc.), and measure a suction power that varies with the degree of contamination or dust collection in the dust collection container 1200.

The pressure sensor 1400 may be disposed at the suction side (e.g., the suction duct 40). The suction duct 40 may be a structure that connects the dust collection container 1200 to the extension pipe 3000 or connects the dust collection container 1200 to the brush device 2000 to allow fluid including or consisting of foreign substances to move into the dust collection container 1200. The pressure sensor 1400 may be disposed at an end of a linear portion (or an inflection point of the linear portion and a curved portion) of the suction duct 40 by taking into account contamination due to foreign substances/dust, but is not limited thereto. The pressure sensor 1400 may be disposed in the middle of the straight portion of the suction duct 40. Moreover, when the pressure sensor 1400 is disposed in the suction duct 40, the pressure sensor 1400 may be implemented as a negative pressure sensor because the pressure sensor 1400 is disposed in front of the suction motor 1110 that generates a suction power.

In the disclosure, a case where the pressure sensor 1400 is disposed in the suction duct 40 is described in an embodiment, but the disclosure is not limited thereto. The pressure sensor 1400 may be disposed at a discharge side (e.g., within the motor assembly 1100). When the pressure sensor 1400 is disposed at the discharge side, the pressure sensor 1400 may be implemented as a positive pressure sensor because the pressure sensor 1400 is disposed in the rear of the suction motor 1110. Furthermore, a plurality of pressure sensors 1400 may be provided within the cordless vacuum cleaner 100.

The battery 1500 may be detachably disposed (e.g., mounted) to the cleaner main body 1000. The battery 1500 may be electrically connected to a charging terminal provided in the station device 200. The battery 1500 may be charged by receiving power from the charging terminal.

The cleaner main body 1000 may include the communication interface 1600 for communicating with an external device. In an embodiment, the cleaner main body 1000 may communicate with the station device 200 (or a server device 300 of FIG. 10) via the communication interface 1600, for example. The communication interface 1600 may include a short-range communication interface, a long-range communication interface, etc. The short-range communication interface may include, but is not limited to, a Bluetooth communication interface, a BLE communication interface, an NFC interface, a Wi-Fi communication interface, a ZigBee communication interface, an IrDA communication interface, a WFD communication interface, an UWB communication interface, an Ant+ communication interface, etc.

The user interface 1700 may be provided on a handle. The user interface 1700 may include the input interface (1710 of FIG. 3) and the output interface (1720 of FIG. 3). The cleaner main body 1000 may receive a user input related to an operation of the cordless vacuum cleaner 100 via the user interface 1700 and output information related to the operation of the cordless vacuum cleaner 100 via the user interface 1700. The cleaner main body 1000 may output, via the user interface 1700, information about a status of docking, information about a status of the dust bin 1200, information about a status of a dust bag, etc.

The input interface 1710 may include at least one of a motion input interface, a voice input interface (e.g., a microphone), or a manipulation input interface (e.g., a power button, a suction power strength control button), but is not limited thereto. In an embodiment, the input interface 1710 and the main processor 1800 may transmit data through a storage module device (SMD) interface. The output interface 1720 may include, but is not limited to, an LED display, an LCD, a touch screen, a speaker, etc. In an embodiment, the output interface 1720 and the main processor 1800 may transmit data through a serial peripheral interface (SPI).

The cleaner main body 1000 may include the at least one processor 1001. The cleaner main body 1000 may include a single processor or a plurality of processors. In an embodiment, the cleaner main body 1000 may include the main processor 1800 connected to the user interface 1700 and the first processor 1131 connected to the suction motor 1110, for example. The at least one processor 1001 may control all operations of the cordless vacuum cleaner 100. In an embodiment, the at least one processor 1001 may determine power consumption (suction power strength) of the suction motor 1110, a drum RPM of the brush device 2000, a trip level of the brush device 2000, etc., for example.

In an embodiment of the disclosure, in response to detecting that the docking of the cordless vacuum cleaner 100 to the station device 200 is terminated, the at least one processor 1001 may analyze movement information obtained via the at least one motion sensor 1950 to thereby detect at least one movement pattern among predefined movement patterns. The at least one processor 1001 may identify at least one control command corresponding to the detected at least one movement pattern and control an operation of the cordless vacuum cleaner 100 based on the identified at least one control command. In this case, the at least one control command may include, but is not limited to, at least one of a control command for turning the power on or off, a control command for adjusting the strength of a suction power, a control command for adjusting the RPM of the rotating brush in the brush device, or a control command for setting an operation mode.

The at least one processor 1001 may activate a gesture detection mode to detect at least one movement pattern for a predetermined time period after detecting that the docking of the cordless vacuum cleaner 100 to the station device 200 is terminated. The at least one processor 1001 may deactivate the gesture detection mode when at least one movement pattern is not detected for the predetermined time period. When receiving a user input for turning on the power of the cordless vacuum cleaner 100 while the gesture detection mode is deactivated, the at least one processor 1001 may reactivate the gesture detection mode, analyze movement information of the cordless vacuum cleaner 100, and detect at least one movement pattern among the predefined movement patterns.

The at least one processor 1001 may obtain, from the battery 1500 of the cordless vacuum cleaner 100, information about whether there is contact between the charging terminal 1501 of the cordless vacuum cleaner 100 and the charging terminal 211 of the station device 200. In an embodiment, the at least one processor 1001 may obtain, from the battery 1500, information indicating that the battery 1500 is being charged because the charging terminal 1501 of the cordless vacuum cleaner 100 contacts the charging terminal 211 of the station device 200, information indicating that the charging of the battery 1500 is stopped because the contact between the charging terminal 1501 of the cordless vacuum cleaner 100 and the charging terminal 211 of the station device 200 has been terminated, or the like, for example. The at least one processor 1001 may detect that docking of the cordless vacuum cleaner 100 onto the station device 200 is terminated, based on information about whether there is contact between the charging terminal 1501 of the cordless vacuum cleaner 100 and the charging terminal 211 of the station device 200. In an embodiment, when the charging terminal 1501 of the cordless vacuum cleaner 100 and the charging terminal 211 of the station device 200 change from a contact state to a non-contact state, the cordless vacuum cleaner 100 may detect that the docking of the cordless vacuum cleaner 100 to the station device 200 is terminated, for example.

In an embodiment of the disclosure, the at least one processor 1001 measures a voltage at the charging terminal 1501 of the cordless vacuum cleaner 100 and, based on the measured voltage, detect that the docking of the cordless vacuum cleaner to the station device 200 is terminated.

In an embodiment of the disclosure, the at least one processor 1001 may detect that docking of the cordless vacuum cleaner 100 to the station device 200 is terminated by a TMR sensor or a micro switch. Furthermore, according to the disclosure, in response to stoppage of a communication connection (e.g., BLE communication or Wi-Fi communication) between the cleaner main body 1000 and the station device 200, the at least one processor 1001 may detect that that the docking of the cordless vacuum cleaner 100 to the station device 200 is terminated.

In an embodiment of the disclosure, when a manual mode is set with respect to the gesture detection mode, the at least one processor 1001 may activate the gesture detection mode in response to receiving a user input for activating the gesture detection mode. When an automatic mode is set with respect to the gesture detection mode, the at least one processor 1001 may automatically activate the gesture detection mode in response to termination of docking of the cordless vacuum cleaner 100 to the station device 200.

The at least one processor 1001 according to the disclosure may include at least one of a CPU, a GPU, an APU, a MIC, a DSP, or an NPU. The at least one processor 1001 may be implemented in the form of an integrated SoC including one or more electronic components. The at least one processor 1001 may be each implemented as separate hardware (H/W). The at least one processor 203 may also be also referred to as a MICOM, which is an abbreviation of a micro-computer, a microprocessor computer, and a microprocessor controller, an MPU, an MCU, or the like.

The at least one processor 1001 according to the disclosure may be implemented as a single-core processor or as a multi-core processor.

The memory 1900 may store a program (e.g., one or more instructions) for processing and control by the at least one processor 1001, and pieces of input/output data. In an embodiment, the memory 1900 may store pre-trained artificial intelligence (AI) models (e.g. a support vector machine (SVM) algorithm, etc.), status data on the suction motor 1110, measured values of the pressure sensor 1400, status data on the battery 1500, status data on the brush device 2000, error occurrence data (failure history data), power consumption of the suction motor 1110 corresponding to operating conditions, RPM of the drum with the rotary brush attached thereto, a trip level of the brush device 2000, and an operation sequence of the suction motor 1110 corresponding to a suction power generation pattern, a type of the brush device 2000 corresponding to a voltage value input via a signal line, a PWM frequency for each type of the brush device 2000, an average input voltage for each type of brush device 2000, a relatively high load reference value (relatively low load reference value) for each type of brush device 2000, information about movement patterns (user gestures) predefined in correspondence to a plurality of control commands, etc., for example. The information about movement patterns (user gestures) predefined in correspondence to a plurality of control commands may be prestored in the memory 1900 from factory of the cordless vacuum cleaner 100. In an alternative embodiment, the cordless vacuum cleaner 100 may receive, from a server device, information about predefined movement patterns (user gestures) corresponding to a plurality of control commands and store the information in the memory 1900.

The memory 1900 may include external memory and internal memory. In an embodiment, the memory 1900 may include at least one type of storage medium, i.e., at least one of a flash memory-type memory, a hard disk-type memory, a multimedia card micro-type memory, a card-type memory (e.g., an SD card or an XD memory), RAM, SRAM, ROM, EEPROM, PROM, a magnetic memory, a magnetic disc, or an optical disc, for example. Programs stored in the memory 1900 may be classified into a plurality of modules according to their functions.

The motion sensor 1950 is a sensor for measuring a movement of the cordless vacuum cleaner 100 (in particular, the cleaner main body 1000), and may include, e.g., but is not limited to, at least one of a gyro sensor, an acceleration sensor, a magnetometer, an inertial measurement unit (IMU), a time of flight (TOF) sensor, an image sensor, or an ultrasonic sensor. Hereinafter, for convenience of description, a gyro sensor and an acceleration sensor will be described as embodiments of the motion sensor 1950.

The motion sensor 1950 may be provided within the cleaner main body 1000. A location of the motion sensor 1950 is described in detail with reference to FIG. 5.

Figure 5:
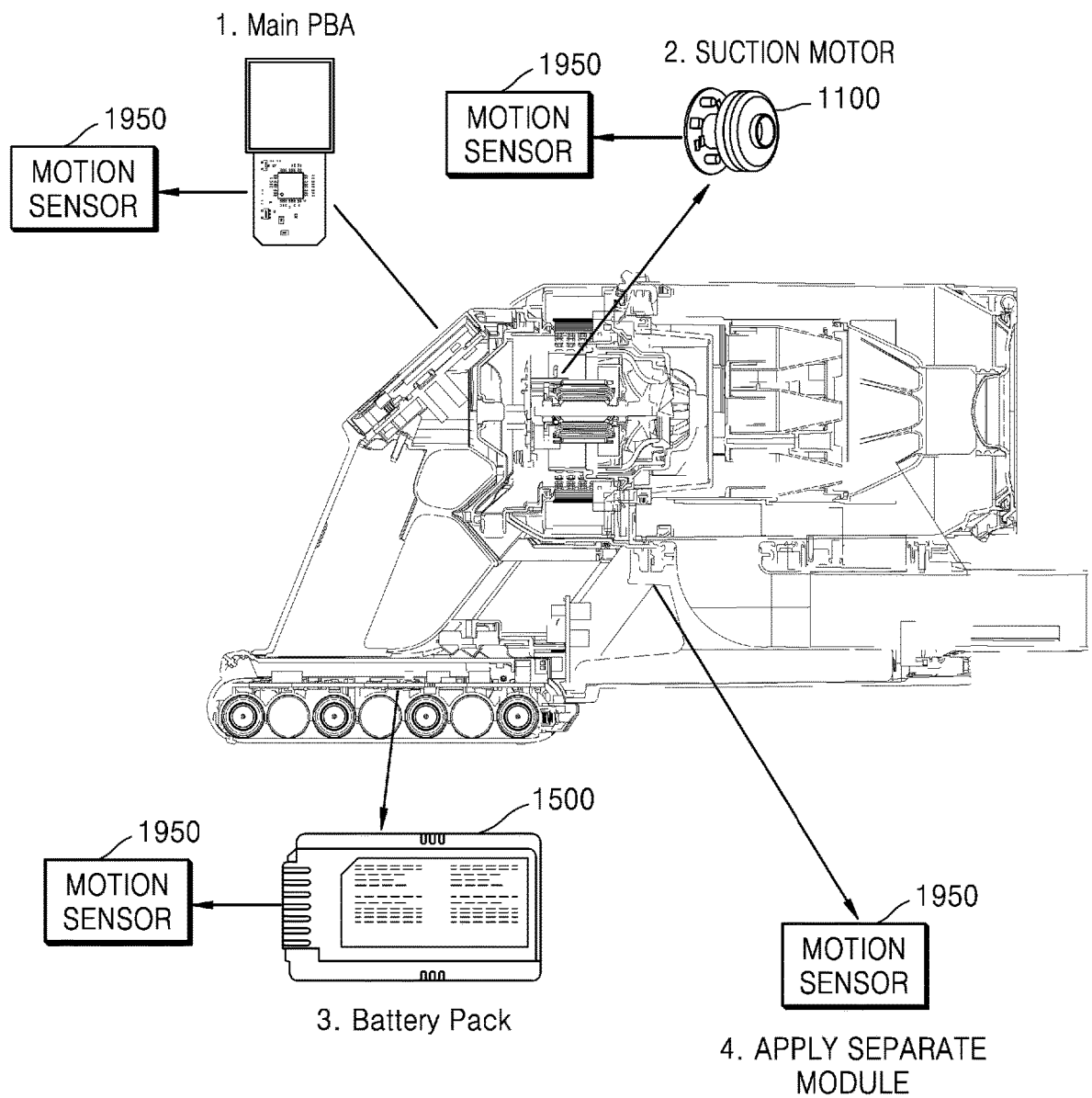
FIG. 5 is a diagram illustrating an embodiment of a location of a motion sensor, according to the disclosure.

FIG. 5 is a diagram illustrating an embodiment of a location of the motion sensor 1950, according to the disclosure.

The motion sensor 1950 may be provided at various locations within the cleaner main body 1000. In an embodiment, the motion sensor 1950 may be provided in the main PBA of the cleaner main body 1000, a PBA in the motor assembly 1100, or a PBA in the battery 1500, or may be implemented as a separate module and provided in the cleaner main body 1000, for example. When the motion sensor 1950 is implemented as a separate module, the motion sensor 1950 may be provided within the handle, near the suction duct 40 (refer to FIG. 4), or near the dust collection container 1200.

Figure 6:
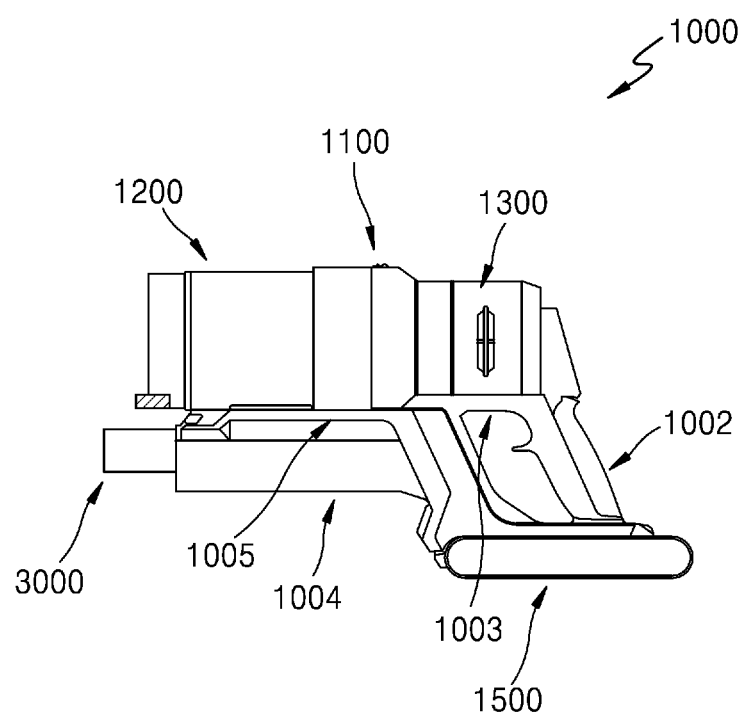
FIG. 6 is a diagram illustrating an embodiment of the appearance of a cleaner main body according to the disclosure.

FIG. 6 is a diagram illustrating an embodiment of the appearance of the cleaner main body 1000 according to the disclosure. Descriptions provided above with respect to FIG. 4 will be omitted below.

Referring to FIG. 6, the cleaner main body 1000 may further include a handle 1002, a support 1003, a pedestal 1004, and an inlet 1005 in addition to the motor assembly 1100, the dust collection container 1200, and the battery 1500. The user may manipulate the cordless vacuum cleaner 100 by the handle 1002 to move the cordless vacuum cleaner 100 according to a predefined movement pattern. In addition, the user may move the cordless vacuum cleaner 100 back and forth by the handle 1002 to allow the brush device 2000 to suck in foreign substances (e.g., dust, hair, debris, etc.) from a surface to be cleaned.

The support 1003 may support one side of the motor assembly 1100 and one side of the filter unit 1300. The pedestal 1004 may be coupled to one side of the dust collection container 1200 and one side of the motor assembly 1100. The inlet 1005 may form a flow path through which dust sucked via the suction duct 40 is introduced into the motor assembly 1100 and the dust collection container 1200.

Operations of processors of the cordless vacuum cleaner 100 are described in detail with reference to FIG. 7.

Figure 7:
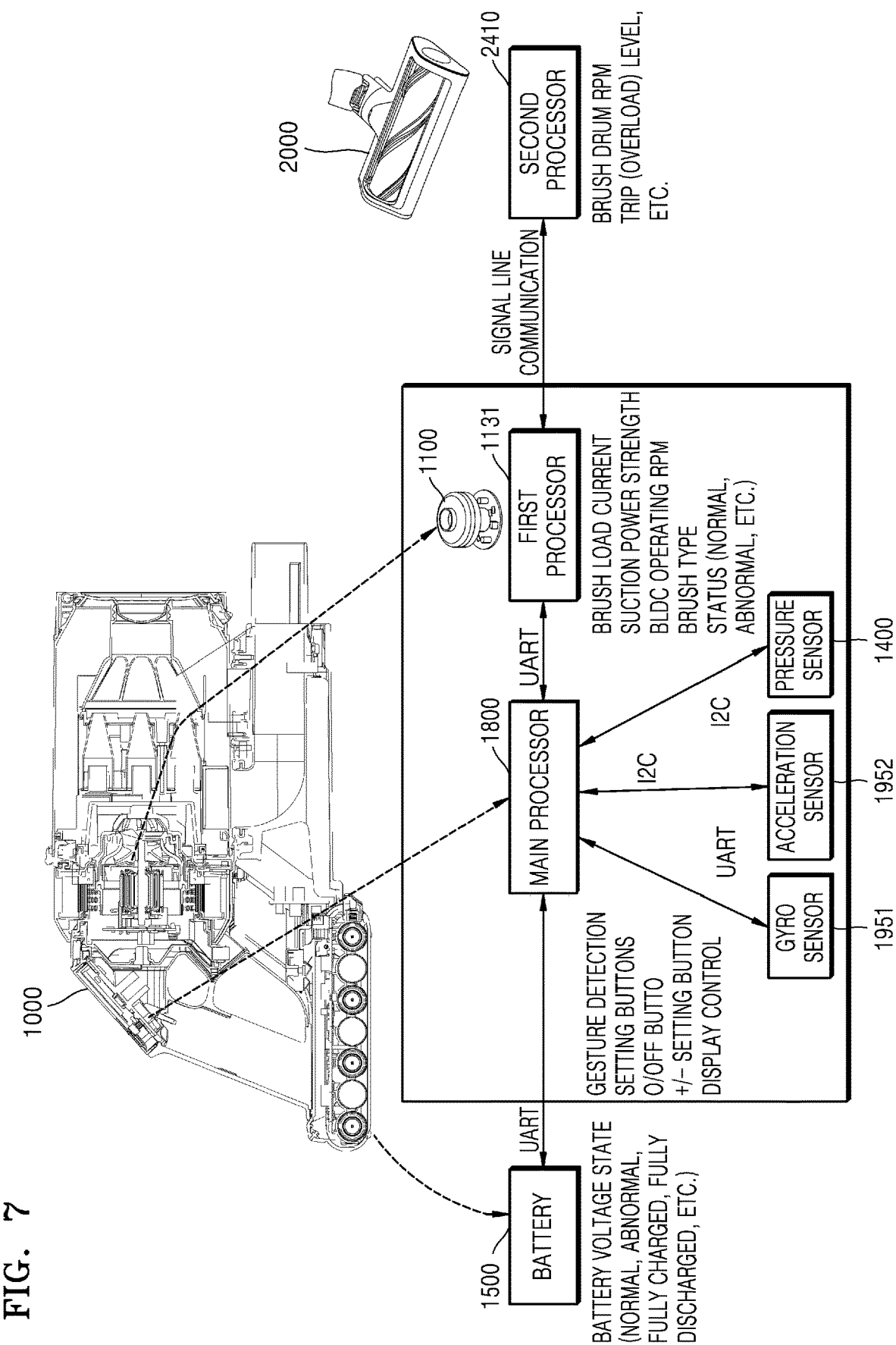
FIG. 7 is a diagram illustrating an embodiment of operations of processors of a cordless vacuum cleaner, according to the disclosure.

FIG. 7 is a diagram illustrating an embodiment of operations of processors of the cordless vacuum cleaner 100, according to the disclosure.

Referring to FIG. 7, the main processor 1800 may identify the status of the components within the cordless vacuum cleaner 100 by communicating with the battery 1500, the pressure sensor 1400, the motion sensor 1950 (e.g., a gyro sensor 1951 and an acceleration sensor 1952), and the first processor 1131 within the motor assembly 1100. In this case, the main processor 1800 may communicate with each component by UART communication or I2C communication, but is not limited thereto. In an embodiment, the main processor 1800 may obtain, from the battery 1500, data regarding a voltage state (e.g., normal, abnormal, fully charged, fully discharged, etc.) of the battery 1500 by the UART, for example. The main processor 1800 may obtain data regarding a flow path pressure from the pressure sensor 1400 by I2C communication. The main processor 1800 may obtain angular velocity data from the gyro sensor 1951 via UART communication and acceleration data from the acceleration sensor 1952 via I2C communication. The main processor 1800 may analyze movement of the cordless vacuum cleaner 100 by the angular velocity data and the acceleration data to thereby detect user gestures (predefined movement patterns).

Furthermore, the main processor 1800 may obtain data regarding a suction power strength, RPM of the suction motor 1110, and a status of the suction motor 1110 (e.g., normal, abnormal, etc.) from the first processor 1131 connected to the suction motor 1110 by UART communication. Suction power is an electrical power consumed to operate the cordless vacuum cleaner 100, and may be expressed as power consumption. The main processor 1800 may obtain data related to load of the brush device 2000 and data related to a type of the brush device 2000 from the first processor 1131.

Moreover, the first processor 1131 may obtain status data (e.g., drum RPM, trip level, normal, abnormal, etc.) regarding the brush device 2000 from the brush device 2000 via signal line communication with a second processor 2410 of the brush device 2000. In this case, the first processor 1131 may transmit status data on the brush device 2000 to the main processor 1800 via UART communication. In an embodiment of the disclosure, the first processor 1131 may transmit status data on the suction motor 1110 and status data on the brush device 2000 to the main processor 1800 at intervals of different periods. In an embodiment, the first processor 1131 may transmit the status data on the suction motor 1110 to the main processor 1800 once every 0.02 second and the status data on the brush device 2000 to the main processor 1800 once every 0.2 second, for example, but is not limited thereto.

The main processor 1800 may determine whether an error has occurred, based on the status of the suction motor 1110, the status of the brush device 2000, the status of components in the cordless vacuum cleaner 100, and periodically transmit data related to the occurrence of the error to the station device 200 via short-distance wireless communication (e.g., BLE communication).

When connecting the first processor 1131 of the cleaner main body 1000 to the second processor 2410 of the brush device 2000 via UART communication or I2C communication, there may be problems such as influence of high impedance due to internal lines of the extension pipe 3000, etc., and burn-out damage to circuit elements (e.g., exceeding a maximum voltage of a Micom AD port) due to electrostatic discharge (ESD) and/or overvoltage. Therefore, according to the disclosure, the first processor 1131 of the cleaner main body 1000 may communicate with the second processor 2410 of the brush device 2000 via signal line communication instead of UART communication or I2C communication. In this case, a circuit for signal line communication may include a voltage distribution circuit (hereinafter referred to as a voltage divider) to prevent burn-out damage or the like to circuit elements due to overvoltage, power noise, surge, electrical overstress (EOS), ESD, etc. However, the communication between the first processor 1131 of the cleaner main body 1000 and the second processor 2410 of the brush device 2000 is not limited to the signal line communication.

In an embodiment of the disclosure, when a noise reduction circuit is applied to the cleaner main body 1000 and the brush device 2000, the first processor 1131 of the cleaner main body 1000 may communicate with the second processor 2410 of the brush device 2000 by UART communication or I2C communication. The noise reduction circuit may include, but is not limited to, at least one of a low pass filter, a high pass filter, a band pass filter, a damping resistor, or a distribution resistor. In an embodiment of the disclosure, when a level shifter circuit is applied to the cleaner main body 1000 or the brush device 2000, the first processor 1131 of the cleaner main body 1000 may communicate with the second processor 2410 of the brush device 2000 by UART communication or I2C communication. Hereinafter, for convenience of description, a case where the cleaner main body 1000 communicates with the brush device 2000 via signal line communication will be described as a main example.

Moreover, the main processor 1800 may receive a user input for setting buttons (e.g., an on/off button, a +/−setting button, etc.) included in the user interface 1700, and control an output of the LCD. By using a pretrained AI model (e.g., an SVM algorithm), the main processor 1800 may identify a usage environment status of the brush device 2000 (e.g., a state of a surface being cleaned (floor, carpet, mat, corner, etc.), a state of the brush device 2000 being lifted from the surface being cleaned, etc.), and determine operation information (e.g., power consumption of the suction motor 1110, drum RPM, trip level, etc.) of the cordless vacuum cleaner 100, which matches the usage environment status of the brush device 2000. In this case, the main processor 1800 may transmit, to the first processor 1131, operation information of the cordless vacuum cleaner 100 that matches the usage environment status of the brush device 2000. The first processor 1131 may adjust a suction power strength (power consumption or RPM) of the suction motor 1110 according to the operation information of the cordless vacuum cleaner 100, and transmit the operation information of the cordless vacuum cleaner 100 that matches the usage environment status of the brush device 2000 to the second processor 2410 via signal line communication. In this case, the second processor 2410 may adjust a drum RPM, a trip level, settings of a lighting device (e.g., an LED display), etc., according to the operation information of the cordless vacuum cleaner 100. The brush device 2000 is described in more detail with reference to FIG. 8.

FIG. 8 is a diagram illustrating an embodiment of the brush device 2000 according to the disclosure.

Referring to FIG. 8, the brush device 2000 may include a motor 2100, a drum 2200 with a rotating brush attached thereto, a lighting device 2300, etc., but is not limited thereto. The motor 2100 of the brush device 2000 may be provided inside or outside the drum 2200. When the motor 2100 is provided outside the drum 2200, the drum 2200 may receive power from the motor 2100 via a belt.

Referring to 810 of FIG. 8, the motor 2100 may be a planetary geared motor. A planetary geared motor may be a combination of a DC motor and a planetary gear 2110. The planetary gear 2110 is used to adjust the RPM of the drum 2200 according to a gear ratio. For a planetary geared motor, RPM of the motor 2100 and RPM of the drum 2200 may have a constant ratio therebetween. Referring to 820 of FIG. 8, the motor 2100 may be a BLDC motor, but is not limited thereto. When the motor 2100 is a BLDC motor, the RPM of the motor 2100 may be equal to the RPM of the drum 2200.

The lighting device 2300 is used to illuminate a dark surface to be cleaned, to facilitate identification of dust or foreign substances on the surface to be cleaned, or to indicate the status of the brush device 2000, and may be provided on the front or top of the brush device 2000. The lighting device 2300 may include an LED display, but is not limited thereto. In an embodiment, the lighting device 2300 may be a laser, for example. The lighting device 2300 may operate automatically as the motor 2100 is driven, or operate under the control of the second processor 2410. In an embodiment of the disclosure, the lighting device 2300 may change color or brightness according to control by the second processor 2410.

Referring to 820 of FIG. 8, the brush device 2000 may further include a driving circuit (e.g., PCB) 2400. The driving circuit 2400 may include a circuit for signal line communication with the cleaner main body 1000. In an embodiment, the driving circuit 2400 may include, but is not limited to, the second processor 2410, a switch element connected to a signal line (hereinafter also referred to as a second switch element) (not shown), and an identification resistor (not shown) indicating a type of the brush device 2000, for example.

Moreover, various types of brush devices 2000 may be available. In an embodiment, the brush device 2000 may include a multi-brush 801, a floor brush 802, a mop brush 803, a turbo (carpet) brush 804, a bed brush 805, a dust brush (not shown), a crevice tool brush (not shown), a pet brush (not shown), etc., for example, but is not limited thereto.

In an embodiment of the disclosure, the type of brush device 2000 may be distinguished by an identification resistor included in the brush device 2000. An operation in which the cleaner main body 1000 identifies the type of brush device 2000 coupled to the cordless vacuum cleaner 100 is described with reference to FIG. 9.

Figure 9:
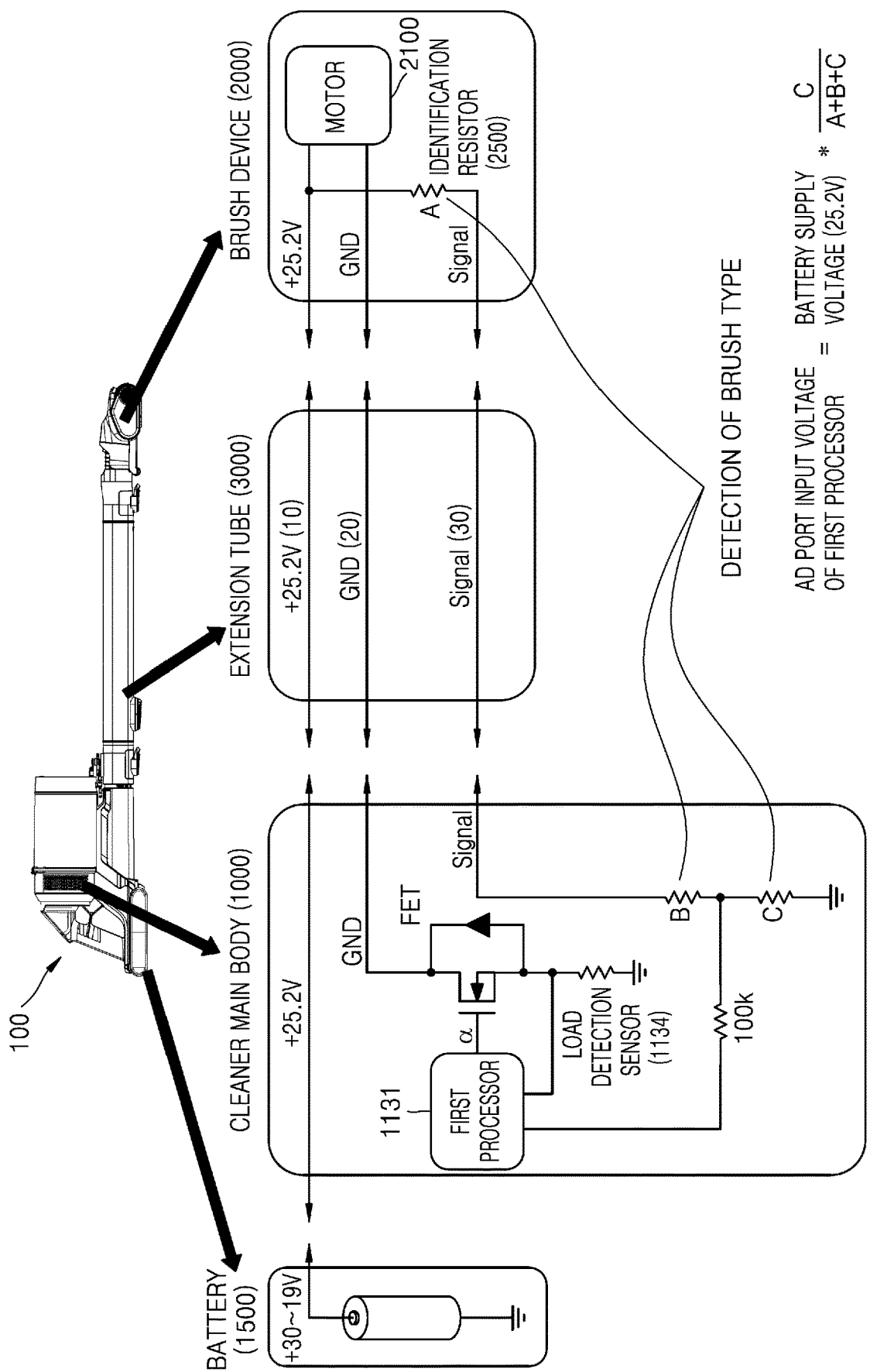
FIG. 9 is a diagram illustrating an embodiment of an operation in which a cleaner main body identifies a type of a brush device, according to the disclosure.

FIG. 9 is a diagram illustrating an embodiment of an operation in which the cleaner main body 1000 identifies a type of the brush device 2000, according to the disclosure.

Referring to FIG. 9, the motor assembly 1100 of the cleaner main body 1000 may include a first processor 1131 and a load detection sensor 1134 (e.g., a shunt resistor), and the brush device 2000 may include an identification resistor 2500. The identification resistor 2500 may be disposed between the power lines 10 and 20 and the signal line 30. The identification resistor 2500 indicates a type of brush device 2000 and may be different for each type of brush device 2000. In an embodiment, the identification resistor 2500 of the multi-brush 801 may have a resistance of 330 kiloohms (KΩ), the identification resistor 2500 of the floor brush 802 may have a resistance of 2.2 megaohms (MΩ), and the identification resistor 2500 of the turbo (carpet) brush 804 may have a resistance of 910 KΩ, for example, but the disclosure is not limited thereto.

The first processor 1131 may detect whether the brush device 2000 is attached to or detached from the cordless vacuum cleaner 100 by the load detection sensor 1134. In an embodiment, when the brush device 2000 is not coupled to the cordless vacuum cleaner 100 (e.g., a handy mode), an operating current of the brush device 2000 detected by the load detection sensor 1134 may be "zero (0) ampere (A)", for example. When the brush device 2000 is coupled to the cordless vacuum cleaner 100 (e.g., a brush mode), the operating current of the brush device 2000 detected by the load detection sensor 1134 may be 50 milliampere (mA) or more. Accordingly, the first processor 1131 may determine that the brush device 2000 is detached from the cordless vacuum cleaner 100 when the operating current of the brush device 2000 detected by the load detection sensor 1134 is 0 A, and determine that the brush device 2000 is attached thereto when the operating current of the brush device 2000 detected by the load detection sensor 1134 is 50 mA or more. Also, a reference operating current value for determining that the brush device 2000 is coupled to the cordless vacuum cleaner 100 is not limited to 50 mA but may be changed.

When determining that the brush device 2000 is coupled to the cordless vacuum cleaner 100, the first processor 1131 may identify a type of brush device 2000 based on a voltage value input to an input port of the first processor 1131. In an embodiment, when the brush device 2000 includes an identification resistor A and the driving circuit 1130 of the cleaner main body 1000 includes a voltage divider (resistor B and resistor C) connected to a signal line 30, a voltage input to an input port of the first processor 1131 may be calculated as follows, for example:

$$\text{AD Port input voltage} = \text{battery supply volage} * \frac{C}{A+B+C}$$

The voltage value input to the input port of the first processor 1131 may decrease as a value of the identification resistor 2500 increases. When the resistor B and the resistor C have constant resistance, the voltage value input to the input port varies depending on the value of identification resistor A, and therefore, the first processor 1131 may identify a type of brush device 2000 corresponding to the identification resistor 2500 based on the voltage value input to the input port.

In an embodiment, the multi-brush 801 may have an identification resistance of 330 KΩ, the floor brush 802 may have an identification resistance of 2.2 MΩ, and the turbo (carpet) brush 804 may have an identification resistance 910 KΩ, for example. When a voltage of the battery 1500 is 25.2 V, a voltage value input to the input port of the first processor 1131 when the multi-brush 801 is coupled to the cordless vacuum cleaner 100 may be 2.785 V, a voltage value input to the input port of the first processor 1131 when the cordless vacuum cleaner 100 is coupled to the floor brush 802 may be 0.791 V, and a voltage value input to the input port of the first processor 1131 when the turbo (carpet) brush 804 is coupled to the cordless vacuum cleaner 100 may be 1.563 V. Therefore, in a situation where it is determined that the brush device 2000 is coupled to the cordless vacuum cleaner 100 and the voltage of the battery 1500 is 25.2 V, the first processor 1131 may identify the multi-brush 801 as being coupled thereto when the voltage value input to the input port is 2.785 V, identify the floor brush 802 as being coupled thereto when the voltage value input to the input port is 0.791 V, and identify the turbo (carpet) brush 804 as being coupled thereto when the voltage value input to the input port is 1.563 V.

In addition, FIG. 9 illustrates an embodiment in which a type of brush device 2000 is distinguished by an identification resistor included in the brush device 2000, but is not limited thereto. In an embodiment of the disclosure, the cleaner main body 1000 may also identify a type of brush device 2000 based on a data signal transmitted by the brush device 2000. In an embodiment, the brush device 2000 may transmit a data signal including information indicating a type of the brush device 2000 to the cleaner main body 1000, for example.

A cleaning system further including a server device and a user terminal in addition to the cordless vacuum cleaner 100 and the station device 200 is described in detail with reference to FIG. 10.

Figure 10:
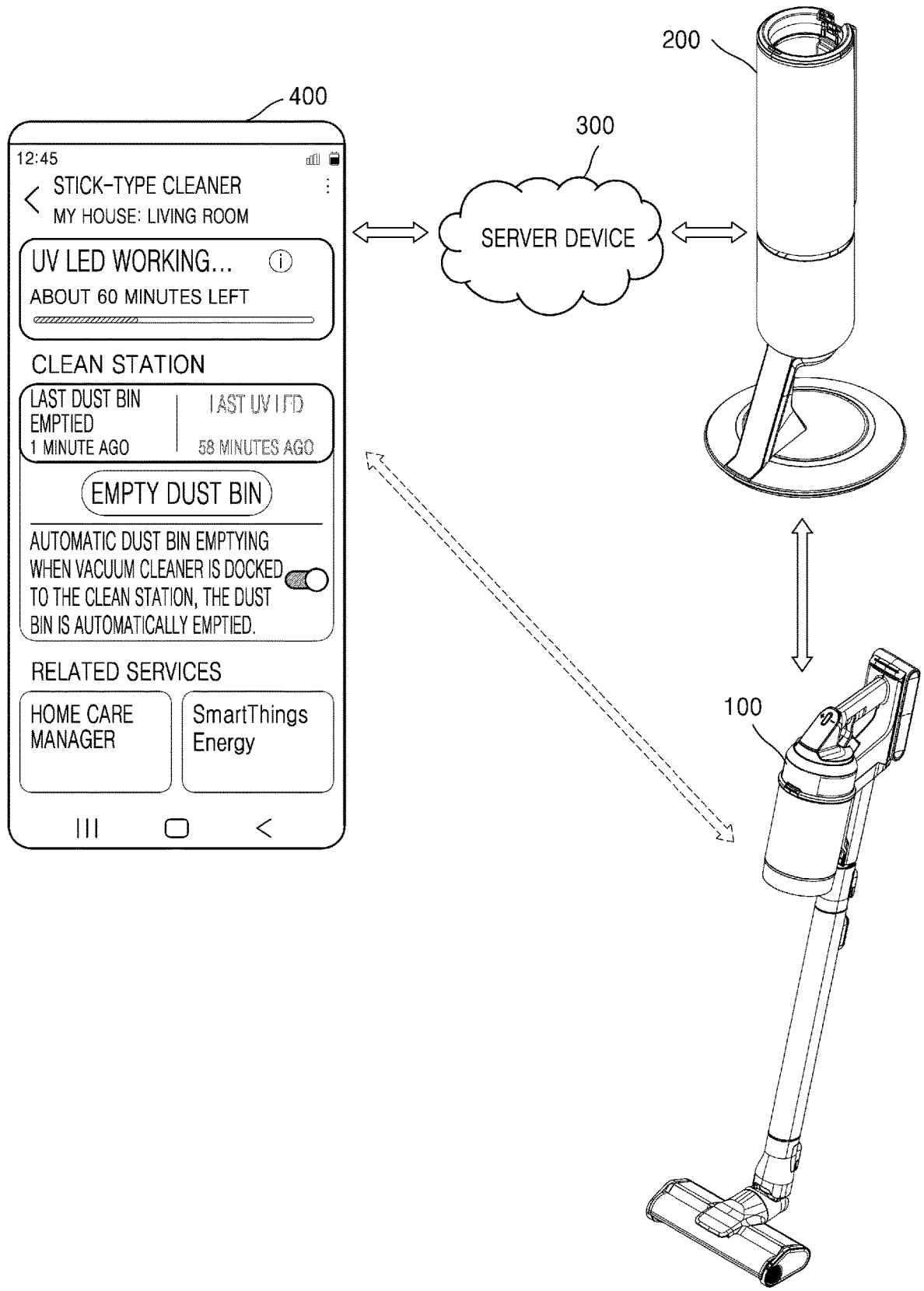
FIG. 10 is a diagram illustrating an embodiment of a cleaning system according to the disclosure.

FIG. 10 is a diagram illustrating an embodiment of a cleaning system according to the disclosure.

Referring to FIG. 10, the cleaning system in the embodiment of the disclosure may further include a server device 300 and a user terminal 400 in addition to the cordless vacuum cleaner 100 and the station device 200. Because the cleaning system including the cordless vacuum cleaner 100 and the station device 200 has been described with reference to FIG. 2, the server device 300 and the user terminal 400 are described herein.

In an embodiment of the disclosure, the server device 300 may be a device for managing the station device 200 and the cordless vacuum cleaner 100. In an embodiment, the server device 300 may be a home appliance management server, for example. The server device 300 may manage user account information and information about home appliances connected to a user account. In an embodiment, the user may access the server device 300 via the user terminal 400 and create a user account, for example. The user account may be identified by an identifier (ID) and a password set by the user. The server device 300 may register the station device 200 and the cordless vacuum cleaner 100 on the user account. In an embodiment, the server device 300 may register the station device 200 and the cordless vacuum cleaner 100 by linking identification information (e.g., a serial number or media access control (MAC) address) of the station device 200 and identification information of the cordless vacuum cleaner 100 to the user account, for example. When the station device 200 and the cordless vacuum cleaner 100 are registered with the server device 300, the server device 300 may manage a status of the station device 200 or a status of the cordless vacuum cleaner 100 by periodically receiving information about the status of the station device 200 or information about the status of the cordless vacuum cleaner 100 from the station device 200.

The user terminal 400 may be a device registered with the server device 300 under the same account as the station device 200 or the cordless vacuum cleaner 100. The user terminal 400 may be a smartphone, a laptop computer, a tablet PC, a digital camera, an e-book terminal, a digital broadcasting terminal, a personal digital assistant (PDA), a portable multimedia player (PMP), a wearable device, a device including a display, etc., but is not limited thereto. Hereinafter, for convenience of description, an embodiment in which the user terminal 400 is a smartphone is described.

In an embodiment of the disclosure, the user terminal 400 may communicate with at least one of the server device 300, the station device 200, or the cordless vacuum cleaner 100. The user terminal 400 may communicate directly with the station device 200 or the cordless vacuum cleaner 100 via short-distance wireless communication, or communicate indirectly with the station device 200 or the cordless vacuum cleaner 100 via the server device 300.

In an embodiment of the disclosure, the user terminal 400 may execute a predetermined application (e.g., a home appliance management application) provided by the server device 300 based on a user input. In this case, the user may check the status of the cordless vacuum cleaner 100 or the status of the station device 200 via an execution window of the application. In an embodiment, the user terminal 400 may provide, via the execution window of the application, information related to an operation of the ultraviolet irradiator (e.g., a UV LED in operation) and information related to dust discharging from the station device 200 (e.g., last dust bin emptied-1 minute ago), for example, but is not limited thereto.

Furthermore, the user terminal 400 may provide a GUI related to user gesture settings to the execution window of the application. Through the GUI, the user may select a type of gesture to be applied to the cordless vacuum cleaner 100 or modify a predefined movement pattern. An operation in which the user terminal 400 provides a GUI related to user gesture settings will be described in detail below with reference to FIGS. 26 and 27.

Figure 11:
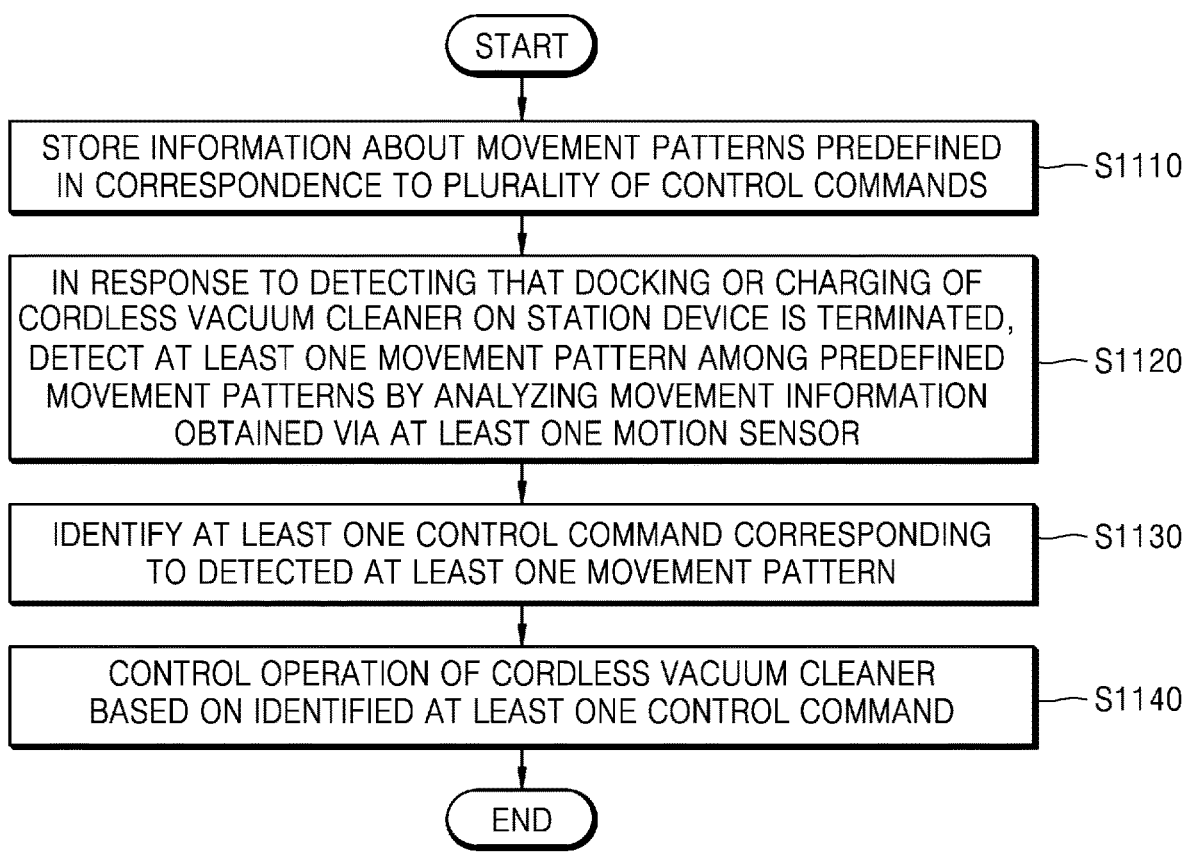
FIG. 11 is a flowchart of a method of controlling an operation of a cordless vacuum cleaner, according to the disclosure.

FIG. 11 is a flowchart of an embodiment of a method of controlling an operation of the cordless vacuum cleaner 100, according to the disclosure.

In operation S1110, according to the disclosure, the cordless vacuum cleaner 100 may store information about movement patterns predefined in correspondence to a plurality of control commands in the memory 1900 of the cordless vacuum cleaner 100.

In an embodiment of the disclosure, the information about the predefined movement patterns corresponding to the plurality of control commands may be obtained from a manufacturer's computing device and stored in the memory 1900, or may be obtained from the server device 300 and stored in the memory 1900.

The plurality of control commands are related to operations of the cordless vacuum cleaner 100 and may include, e.g., but are not limited to, a control command for turning on or off the power, a control command for adjusting a suction power strength, a control command for adjusting RPM of the rotating brush of the brush device 2000, and a control command for setting an operation mode (e.g., energy saving mode, self-diagnostic mode, etc.).

In an embodiment of the disclosure, each of the predefined movement patterns may correspond to a different control command (or control signal). In an embodiment, referring to FIG. 12, a movement pattern of rotating (e.g., rotating the cordless vacuum cleaner 100) clockwise may correspond to a control command for increasing a suction power strength, and a movement pattern of rotating counterclockwise may correspond to a control command for decreasing a suction power strength, for example. A movement pattern of shaking left/right may correspond to a power-related control command (a control command for turning on the power when stationary or a control command for turning off the power when in operation). A movement pattern of moving in the same direction twice may correspond to a control command related to the power of a display. In an embodiment, a movement pattern of moving twice to the left consecutively may correspond to a control command for turning on the display, and a movement pattern of moving twice to the right consecutively may correspond to a control command for turning off the display, for example. A movement pattern of moving twice upward or downward consecutively while the display is turned on may correspond to a control command for changing a menu in the display. In an embodiment, a movement pattern of moving twice upward consecutively may correspond to a control command for moving to a higher-level menu, and a movement pattern of moving twice downward consecutively may correspond to a control command for moving to a lower-level menu, for example. A movement pattern achieved by lifting the cordless vacuum cleaner 100 and rotating the cordless vacuum cleaner 100 by half a turn clockwise or counterclockwise may correspond to a control command for increasing or decreasing the RPM of the brush device 2000. In an embodiment, a movement pattern of rotating by half a turn clockwise may correspond to a control command for increasing the RPM of the brush device 2000, and a movement pattern of rotating by half a turn counterclockwise may correspond to a control command of decreasing the RPM of the brush device 2000. Half a turn may be changed to 1 turn, one and half (1.5) turns, etc., depending on a value set in the memory 1900, for example. The movement pattern achieved by lifting the cordless vacuum cleaner 100 and moving the cordless vacuum cleaner 100 up/down/left/right/diagonally may correspond to a control command for executing a predetermined mode stored in the memory 1900. In an embodiment, a movement pattern achieved by drawing a shape of the letter Z may correspond to a control command for performing self-diagnosis, a movement pattern of consecutively moving in ⤴ directions may correspond to a control command for executing an energy saving mode, a movement pattern of consecutively moving in ⤶ directions may correspond to a control command for executing a jet mode, and a movement pattern of consecutively moving in →↙ directions may correspond to a control command related to a voice notification mode, for example. The correspondence relationship illustrated in FIG. 12 is merely one of embodiments and is not limited thereto. Movement patterns (gestures) and control commands may be combined in a variety of different ways.

In operation S1120, according to the disclosure, in response to detecting that docking or charging of the cordless vacuum cleaner 100 on the station device 200 is terminated, the cordless vacuum cleaner 100 may detect at least one movement pattern among the predefined movement patterns by analyzing movement information of the cordless vacuum cleaner 100 obtained via the at least one motion sensor 1950.

Figure 13A:
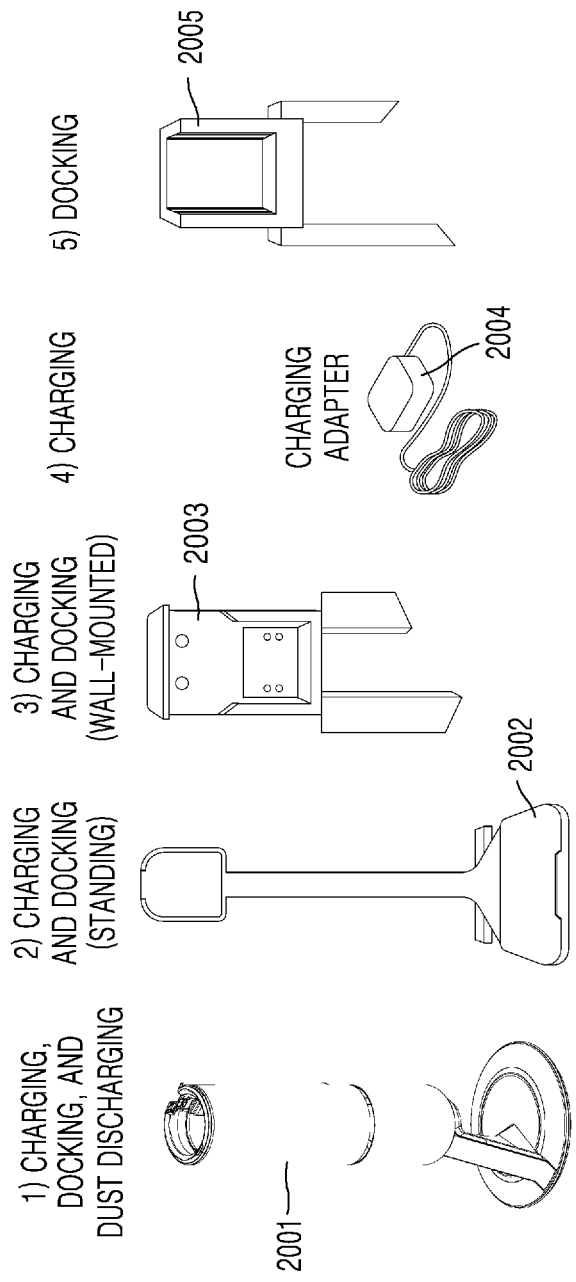
FIG. 13A is a diagram illustrating types of a station device according to the disclosure.

In an embodiment of the disclosure, the station device 200 may be used for storing (docking), charging, or dust discharging for the cordless vacuum cleaner 100. In an embodiment, referring to FIG. 13A, the station device 200 may be a first type of device 2001 that provides functions of charging, dust discharging, and storage (docking) of the cordless vacuum cleaner 100, for example. The station device 200 may be a second type of device 2002 capable of storing (docking) the cordless vacuum cleaner 100 in an upright position and charging the battery 1500 of the cordless vacuum cleaner 100. The station device 200 may be a third type of device 2003 that is fixed to the wall and is capable of storing (docking) the cordless vacuum cleaner 100 by hanging the cordless vacuum cleaner 100 and charging the battery 1500 of the cordless vacuum cleaner 100. The station device 200 may be a fourth type of device 2004 capable of charging the battery 1500 of the cordless vacuum cleaner 100. The station device 200 may be a fifth type of device capable of storing (docking) the cordless vacuum cleaner 100. However, the type of station device 200 is not limited to the example illustrated in FIG. 13A. In an embodiment, the station device 200 may be another type of device that is not capable of charging the battery 1500 of the cordless vacuum cleaner 100 but provides functions of storage and dust discharging of the cordless vacuum cleaner 100, for example.

In an embodiment of the disclosure, the cordless vacuum cleaner 100 may be docked onto the station device 200 for storage, charging, or dust discharging. Additionally, in order to use the cordless vacuum cleaner 100, the user may separate the cordless vacuum cleaner 100 docked onto the station device 200 from the station device 200. When the user separates the cordless vacuum cleaner 100 from the station device 200, the cordless vacuum cleaner 100 may detect that docking or charging thereof on the station device 200 is terminated. In an embodiment, the cordless vacuum cleaner 100 may detect that docking or charging thereof on the station device 200 is terminated by the charging terminal 1501, the communication interface 1600, a TMR sensor, or a micro switch, for example.

Figure 13B:
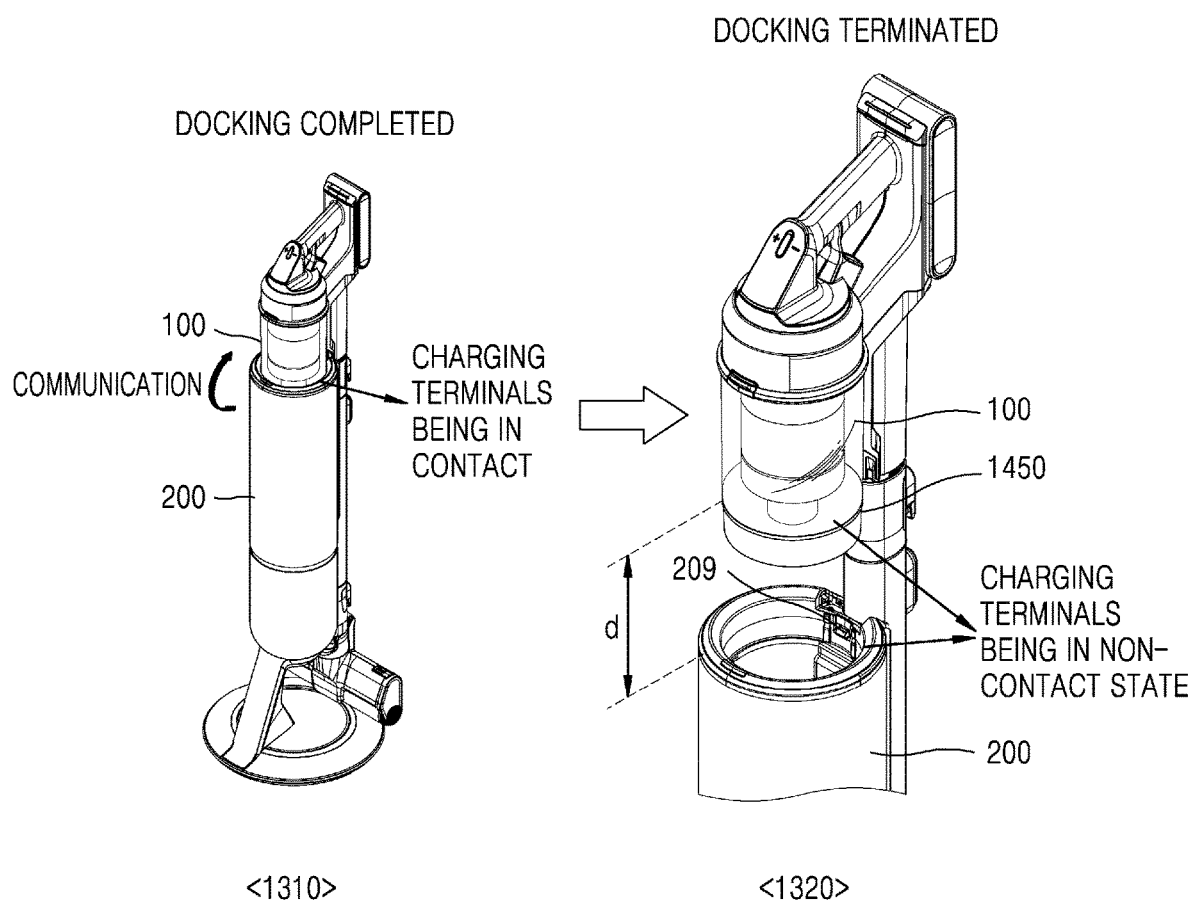
FIG. 13B is a diagram illustrating an embodiment of predefined movement patterns (gestures) according to the disclosure.

Referring to 1310 of FIG. 13B, when the cordless vacuum cleaner 100 is docked to the station device 200, the charging terminal 1501 (refer to FIG. 3) of the cordless vacuum cleaner 100 may contact the charging terminal 211 (refer to FIG. 3) of the station device 200, and the first communication interface 1600 (refer to FIG. 3) of the cordless vacuum cleaner 100 may perform wireless communication (e.g., BLE communication) with the second communication interface 201 (refer to FIG. 3) of the station device 200. In this case, the battery 1500 (refer to FIG. 3) may transmit, to the at least one processor 1001 (e.g., the first main processor 1800 (refer to FIG. 3)), information indicating that the charging terminal 1501 of the cordless vacuum cleaner 100 contacts the charging terminal 211 of the station device 200 (or information indicating that the battery 1500 is being charged).

Referring to 1320 of FIG. 13B, when the cordless vacuum cleaner 100 is separated from the station device 200, the charging terminal 1501 of the cordless vacuum cleaner 100 and the charging terminal 211 of the station device 200 are in a non-contact state, and thus, power may be no longer supplied to the battery 1500 of the cordless vacuum cleaner 100, and the communication connection between the first communication interface 1600 of the cordless vacuum cleaner 100 and the second communication interface 201 of the station device 200 may also be interrupted. In this case, the battery 1500 may transmit, to the at least one processor 1001 (e.g., the first main processor 1800), information indicating that the charging terminal 1501 of the cordless vacuum cleaner 100 and the charging terminal 211 of the station device 200 are in a non-contact state (or information indicating that the charging of the battery 1500 is stopped).

Therefore, according to the disclosure, the at least one processor 1001 of the cordless vacuum cleaner 100 may obtain, from the battery 1500 of the cordless vacuum cleaner 100, information about whether there is contact between the charging terminal 1501 of the cordless vacuum cleaner 100 and the charging terminal 211 of the station device 200. The at least one processor 1001 may detect that docking or charging of the cordless vacuum cleaner 100 on the station device 200 is terminated, based on the information about whether there is contact between the charging terminal 1501 of the cordless vacuum cleaner 100 and the charging terminal 211 of the station device 200. In an embodiment, when the charging terminal 1501 of the cordless vacuum cleaner 100 and the charging terminal 211 of the station device 200 change from a contact state to a non-contact state (or when charging of the battery 1500 is stopped), the at least one processor 1001 may detect that docking or charging of the cordless vacuum cleaner 100 on the station device 200 is terminated, for example.

In an embodiment of the disclosure, the at least one processor 1001 may measure a voltage at the charging terminal 1501 of the cordless vacuum cleaner 100 and, based on the measured voltage, detect that docking or charging of the cordless vacuum cleaner 100 on the station device 200 is terminated. In an embodiment, when the voltage at the charging terminal 1501 decreases or falls below a threshold voltage, the at least one processor 1001 may detect that docking or charging of the cordless vacuum cleaner 100 on the station device 200 is terminated, for example.

In an embodiment of the disclosure, when the communication connection between the first communication interface 1600 of the cordless vacuum cleaner 100 and the second communication interface 201 of the station device 200 is interrupted, the at least one processor 1001 may detect that docking or charging of the cordless vacuum cleaner 100 on the station device 200 is terminated. In an embodiment, when the cordless vacuum cleaner 100 is docked to the station device 200 (or is being charged), the cordless vacuum cleaner 100 and the station device 200 periodically transmit and receive signals therebetween, and thus, when no signals are received from the station device 200 via the first communication interface 1600, the at least one processor 1001 may detect that docking or charging of the cordless vacuum cleaner 100 on the station device 200 is terminated, for example.

In an embodiment of the disclosure, the dust collection container 1200 of the cordless vacuum cleaner 100 may include a TMR sensor, and the dust collection container coupling portion of the station device 200 may include a magnetic material. In this case, when the magnetic material is detected by the TMR sensor, the at least one processor 1001 may determine that the cordless vacuum cleaner 100 is docked to the station device 200. When a magnetic material is not detected by the TMR sensor, the at least one processor 1001 may determine that the docking or charging of the cordless vacuum cleaner 100 on the station device 200 is terminated.

In an embodiment of the disclosure, the dust collection container 1200 of the cordless vacuum cleaner 100 may include a micro switch, and the dust collection container coupling portion of the station device 200 may include a mechanical element for operating the micro switch. In this case, when the micro switch is turned on (when an electrical signal is transmitted from the micro switch), the at least one processor 1001 may determine that the cordless vacuum cleaner 100 is docked to the station device 200. When the micro switch is turned off, the at least one processor 1001 may determine that docking or charging of the cordless vacuum cleaner 100 to the station device 200 is terminated.

In an embodiment of the disclosure, in response to detecting that docking or charging of the cordless vacuum cleaner 100 on the station device 200 is terminated, the cordless vacuum cleaner 100 may activate a gesture detection mode and analyze movement information obtained via the at least one motion sensor 1950 of the cordless vacuum cleaner 100. The gesture detection mode may be a mode for detecting a predefined movement pattern (user gesture) input by the user. Movement information may include, but is not limited to, movement direction, movement speed, movement distance, rotation angle, rotation direction, rotation distance, movement intensity, degree of lifting of the brush device 2000 from the floor, etc.

When the user separates the cordless vacuum cleaner 100 from the station device 200, the user is highly likely to manipulate the cordless vacuum cleaner 100 for cleaning. Thus, the cordless vacuum cleaner 100 may activate the gesture detection mode and analyze the movement information of the cordless vacuum cleaner 100. Activating the gesture detection mode may mean determining whether a current movement pattern of the cordless vacuum cleaner 100 corresponds to one of the predefined movement patterns by analyzing the movement information of the cordless vacuum cleaner 100.

In an embodiment of the disclosure, the cordless vacuum cleaner 100 may detect at least one movement pattern among the predefined movement patterns by analyzing movement information of the cordless vacuum cleaner 100, which is obtained through the motion sensor 1950. In an embodiment, referring to FIG. 12, the cordless vacuum cleaner 100 may detect at least one of a movement pattern of shaking left and right, a movement of rotating clockwise, a movement pattern of rotating counterclockwise, a movement pattern of moving twice in the left or right direction consecutively, a movement pattern of moving twice in the up or down direction consecutively, a movement pattern of rotating by half a turn clockwise or counterclockwise, a movement pattern achieved by drawing a shape of the letter Z, a movement pattern of moving consecutively in the ↙→ directions, a movement pattern of moving consecutively in the ←↗ directions, or a movement pattern of moving consecutively in the →↙ directions, for example.

In operation S1130, according to the disclosure, the cordless vacuum cleaner 100 may identify at least one control command corresponding to the detected at least one movement pattern.

In an embodiment of the disclosure, the cordless vacuum cleaner 100 may identify at least one control command corresponding to the at least one movement pattern detected via the motion sensor 1950, based on the information about the movement patterns predefined in correspondence to the plurality of control commands stored in the memory 1900. In an embodiment, when a movement pattern of shaking the cleaner main body 1000 left and right is detected, the cordless vacuum cleaner 100 may identify a control command for turning on the power, which corresponds to the movement pattern of shaking the cleaner main body 1000 left and right, for example. When a movement pattern of rotating the cleaner main body 1000 clockwise is detected, the cordless vacuum cleaner 100 may identify a control command for increasing a suction power strength, which corresponds to the movement pattern of rotating the cleaner main body 1000 clockwise.

In operation S1140, according to the disclosure, the cordless vacuum cleaner 100 may control an operation of the cordless vacuum cleaner 100 based on the identified at least one control command.

In an embodiment of the disclosure, based on the identified at least one control command, the cordless vacuum cleaner 100 may control power, adjust a suction power strength (power consumption) of the suction motor 1110, control an operation of the brush device 2000 (e.g., controlling drum RPM, controlling a color of the lighting device 2300, etc.), or set a predetermined operation mode (e.g., self-diagnostic mode, energy saving mode, jet mode that maximizes a suction power strength, an AI mode that automatically adjusts a suction power strength according to a usage environment status of the brush device 2000, etc.).

In an embodiment, referring to FIG. 12, when a movement pattern of shaking the cleaner main body 1000 left and right is detected, the cordless vacuum cleaner 100 may turn on the power and operate in a default mode, for example. When a movement pattern of rotating the cleaner main body 1000 counterclockwise is detected, the cordless vacuum cleaner 100 may decrease a suction power strength from a super-strong mode to a strong mode. The cordless vacuum cleaner 100 may execute a self-diagnostic mode when a movement pattern achieved by drawing a shape of the letter Z with the cleaner main body 1000 is detected.

In an embodiment of the disclosure, the cordless vacuum cleaner 100 may visually or audibly provide the user with information about a function or mode performed using a predefined movement pattern (user gesture) to the user. In an embodiment, when executing the self-diagnostic mode, the cordless vacuum cleaner 100 may display an icon indicating the self-diagnostic mode on the display or output, via a speaker, a voice indicating that self-diagnosis is started, for example.

Moreover, according to the disclosure, the cordless vacuum cleaner 100 may deactivate some of the plurality of control commands based on a current operating state. In an embodiment, the cordless vacuum cleaner 100 may deactivate a control command for turning on the power when the current operating state is a cleaning state, and deactivate a control command for turning off the power when the current operating state is a powered-off state, for example. Thus, even when a movement pattern corresponding to the control command for turning on the power is detected during a cleaning operation, the cordless vacuum cleaner 100 may ignore the detected movement pattern.

Figure 14:
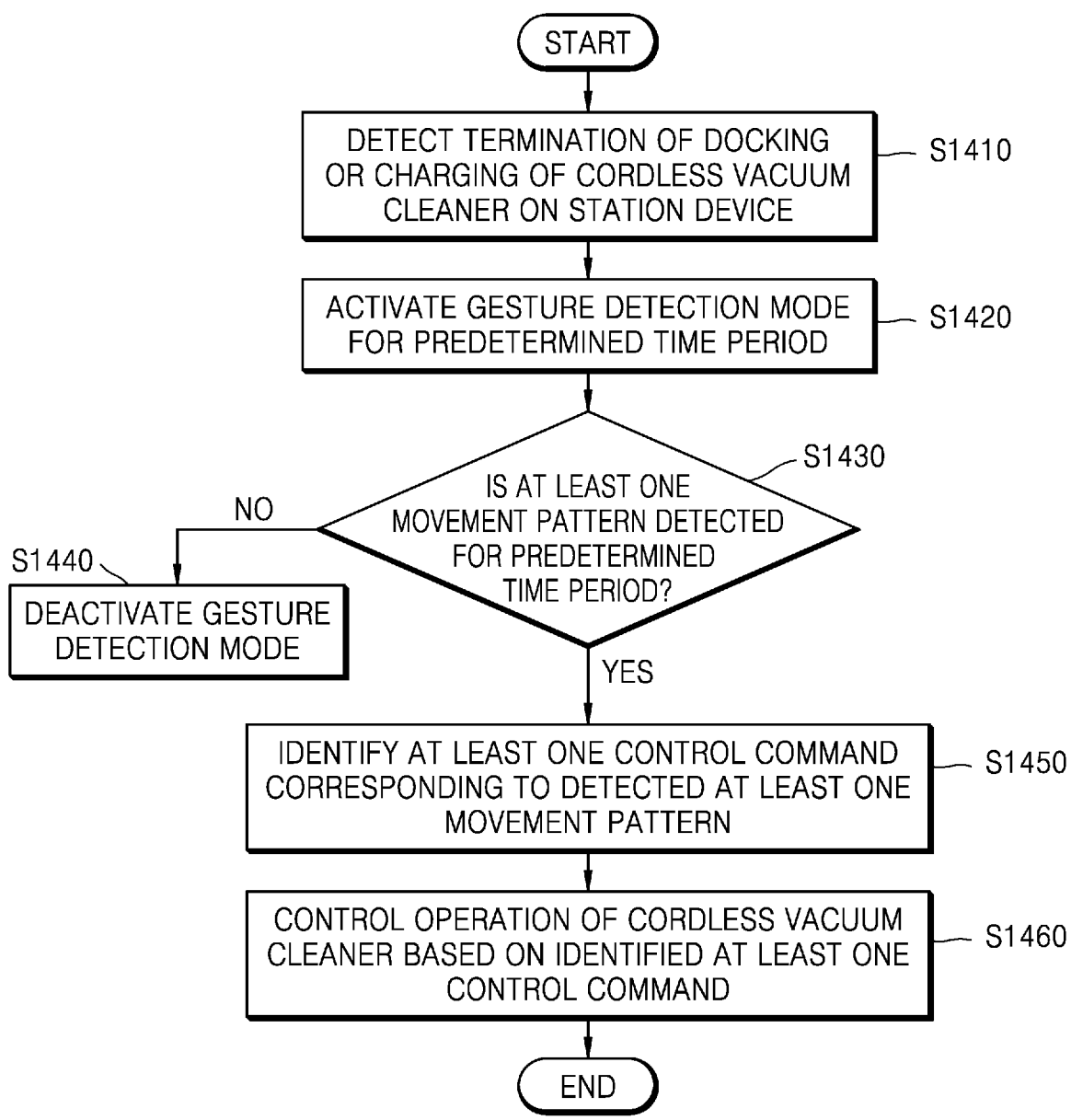
FIG. 14 is a flowchart of an embodiment of a method, performed by a cordless vacuum cleaner, of activating or deactivating a gesture detection mode, according to the disclosure.

FIG. 14 is a flowchart of an embodiment of a method, performed by the cordless vacuum cleaner 100, of activating or deactivating a gesture detection mode, according to the disclosure.

In operation S1410, according to the disclosure, the cordless vacuum cleaner 100 may detect that docking or charging of the cordless vacuum cleaner 100 on the station device 200 is terminated. In an embodiment, the cordless vacuum cleaner 100 may detect that docking or charging thereof on the station device 200 is terminated by the charging terminal 1501, the communication interface 1600, a TMR sensor, or a micro switch, for example.

In an embodiment of the disclosure, the at least one processor 1001 of the cordless vacuum cleaner 100 may obtain, from the battery 1500 of the cordless vacuum cleaner 100, information about whether there is contact between the charging terminal 1501 of the cordless vacuum cleaner 100 and the charging terminal 211 of the station device 200. The at least one processor 1001 may detect that docking or charging of the cordless vacuum cleaner 100 on the station device 200 is terminated, based on the information about whether there is contact between the charging terminal 1501 of the cordless vacuum cleaner 100 and the charging terminal 211 of the station device 200. In an embodiment, when the charging terminal 1501 of the cordless vacuum cleaner 100 and the charging terminal 211 of the station device 200 change from a contact state to a non-contact state (or when charging of the battery 1500 is stopped), the at least one processor 1001 may detect that the docking or charging of the cordless vacuum cleaner 100 on the station device 200 is terminated, for example.

In an embodiment of the disclosure, the at least one processor 1001 may measure a voltage at the charging terminal 1501 of the cordless vacuum cleaner 100 and, based on the measured voltage, detect that docking or charging of the cordless vacuum cleaner 100 on the station device 200 is terminated. In an embodiment, when the voltage at the charging terminal 1001 decreases or falls below a threshold voltage, the at least one processor 1001 may detect that docking or charging of the cordless vacuum cleaner 100 on the station device 200 is terminated, for example.

In an embodiment of the disclosure, when the communication connection between the first communication interface 1600 of the cordless vacuum cleaner 100 and the second communication interface 201 of the station device 200 is interrupted, the at least one processor 1001 may detect that docking or charging of the cordless vacuum cleaner 100 on the station device 200 is terminated. In an embodiment, because the cordless vacuum cleaner 100 and the station device 200 periodically transmit and receive signals therebetween when the cordless vacuum cleaner 100 is docked to the station device 200, when no signals are received from the station device 200 via the first communication interface 1600, the at least one processor 1001 may detect that docking or charging of the cordless vacuum cleaner 100 on the station device 200 is terminated, for example.

In an embodiment of the disclosure, the dust collection container 1200 of the cordless vacuum cleaner 100 may include a TMR sensor, and the dust collection container coupling portion of the station device 200 may include a magnetic material. In this case, when the magnetic material is detected by the TMR sensor, the at least one processor 1001 may determine that the cordless vacuum cleaner 100 is docked to the station device 200. When a magnetic material is not detected by the TMR sensor, the at least one processor 1001 may determine that the docking or charging of the cordless vacuum cleaner 100 on the station device 200 is terminated.

In an embodiment of the disclosure, the dust collection container 1200 of the cordless vacuum cleaner 100 may include a micro switch, and the dust collection container coupling portion of the station device 200 may include a mechanical element for operating the micro switch. In this case, when the micro switch is turned on (when an electrical signal is transmitted from the micro switch), the at least one processor 1001 may determine that the cordless vacuum cleaner 100 is docked to the station device 200. When the micro switch is turned off, the at least one processor 1001 may determine that docking or charging of the cordless vacuum cleaner 100 to the station device 200 is terminated.

In operation S1420, according to the disclosure, the cordless vacuum cleaner 100 may activate a gesture detection mode for a predetermined time period after the docking or charging of the cordless vacuum cleaner 100 on the station device 200 is terminated.

In an embodiment of the disclosure, when the docking or charging of the cordless vacuum cleaner 100 on the station device 200 is terminated, the user is highly likely to manipulate the cordless vacuum cleaner 100 for cleaning, and thus, the gesture detection mode may be activated. However, according to the disclosure, the cordless vacuum cleaner 100 may activate the gesture detection mode for the predetermined time period. The predetermined time period may be an appropriate length of time that is desired for the user to separate the cordless vacuum cleaner 100 from the station device 200 and move the cordless vacuum cleaner 100 to a surface to be cleaned. In an embodiment, the predetermined time period may be a period between 1 minute and 5 minutes, for example, but is not limited thereto. The predetermined time period may be adjusted to be longer or shorter depending on an area of a cleaning space.

In operations S1430 and S1440, according to the disclosure, the cordless vacuum cleaner 100 may deactivate the gesture detection mode when at least one movement pattern is not detected among a plurality of predefined movement patterns for the predetermined time period.

In an embodiment of the disclosure, deactivating the gesture detection mode may mean not performing an operation of comparing a movement pattern of the cordless vacuum cleaner 100 obtained via the motion sensor 1950 with a plurality of predefined movement patterns. Therefore, when the gesture detection mode is deactivated, the cordless vacuum cleaner 100 may ignore a predetermined movement pattern even when the predetermined movement pattern is input.

In an embodiment, the user may separate the cordless vacuum cleaner 100 from the station device 200 to use it, but when the phone rings, the cordless vacuum cleaner 100 may be left standing for a moment by leaning the cordless vacuum cleaner 100 against the wall, for example. In this case, a safety issue may occur when the cordless vacuum cleaner 100 turns on the power by incorrectly detecting a movement of the cordless vacuum cleaner 100 leaning against the wall and then falling over as a movement pattern in which the cleaner main body 1000 shakes left and right. Thus, when the predetermined time period (e.g., 60 seconds) has elapsed since detection of the termination of docking to the station device 200, the cordless vacuum cleaner 100 may not respond to a predefined movement pattern even when the predefined movement pattern is input. That is, according to the disclosure, when a predefined movement pattern is not detected for the predetermined time period after docking of the cordless vacuum cleaner 100 to the station device 200 is terminated, the safety of the cordless vacuum cleaner 100 may be increased by deactivating the gesture detection mode. In addition, the cordless vacuum cleaner 100 may reduce the consumption of the battery 1500 by deactivating the gesture detection mode when unnecessary, thereby increasing the usage time of the cordless vacuum cleaner 100.

In operation S1450, according to the disclosure, when at least one movement pattern is detected among the plurality of predefined movement for the predetermined time period (YES in operation S1430), the cordless vacuum cleaner 100 may identify at least one control command corresponding to the detected at least one movement pattern.

In an embodiment of the disclosure, the cordless vacuum cleaner 100 may identify at least one control command corresponding to the at least one movement pattern detected via the motion sensor 1950, based on the information about the movement patterns predefined in correspondence to the plurality of control commands stored in the memory 1900. In an embodiment, when a movement pattern of shaking the cleaner main body 1000 left and right is detected, the cordless vacuum cleaner 100 may identify a control command for turning on the power, which corresponds to the movement pattern of shaking the cleaner main body 1000 left and right, for example. When a movement pattern of rotating the cleaner main body 1000 clockwise is detected, the cordless vacuum cleaner 100 may identify a control command for increasing a suction power strength, which corresponds to the movement pattern of rotating the cleaner main body 1000 clockwise.

Moreover, according to the disclosure, the cordless vacuum cleaner 100 may apply different sensitivities for detecting movement patterns (hereinafter also referred to as gesture detection sensitivity) depending on user-defined settings or system settings. The higher the gesture detection sensitivity applied to the cordless vacuum cleaner 100, the lower the detection accuracy for a predefined movement pattern, and the lower the gesture detection sensitivity applied to the cordless vacuum cleaner 100, the higher the detection accuracy for a predefined movement pattern. In an embodiment, when the gesture detection sensitivity is set to 'high', the cordless vacuum cleaner 100 may detect a current movement pattern as a predefined movement pattern when a degree of matching between the predefined movement pattern and the current movement pattern is 75% to 84%, for example. When the gesture detection sensitivity is set to 'low', the cordless vacuum cleaner 100 may detect the current movement pattern as a predefined movement pattern when a degree of matching between the predefined movement pattern and the current movement pattern is 91% to 100%.

In operation S1460, according to the disclosure, the cordless vacuum cleaner 100 may control an operation of the cordless vacuum cleaner 100 based on the identified at least one control command.

In an embodiment of the disclosure, based on the identified at least one control command, the cordless vacuum cleaner 100 may control power, adjust a suction power strength (power consumption) of the suction motor 1110, control an operation of the brush device 2000, or set a predetermined operation mode. Because operation S1460 corresponds to operation S1140 of FIG. 11, descriptions thereof already provided above will be omitted below.

The operation in which the cordless vacuum cleaner 100 activates or deactivates a gesture detection mode is described in more detail with reference to FIG. 15.

FIG. 15 is a diagram illustrating an embodiment of an operation in which the cordless vacuum cleaner 100 activates or deactivates a gesture detection mode, according to the disclosure. An embodiment in which a movement pattern of shaking the cleaner main body 1000 left and right corresponds to a control command for turning on the power is described with reference to FIG. 15.

Referring to 1510 of FIG. 15, the cordless vacuum cleaner 100 may activate a gesture detection mode for a predetermined time period (e.g., 60 seconds) after docking or charging thereof on the station device 200 is terminated. Thus, when the user shakes the cleaner main body 1000 left and right within the predetermined time period (60 seconds) after the docking or charging on the station device 200 is terminated, the cordless vacuum cleaner 100 may detect a movement pattern of shaking the cleaner main body 1000 left and right and turn on the power.

Referring to 1520 of FIG. 15, when a predefined movement pattern is not detected for the predetermined time period (e.g., 60 seconds) after the docking or charging on the station device 200 is terminated, the cordless vacuum cleaner 100 may deactivate the gesture detection mode. Thus, even when the user shakes the cleaner main body 1000 left and right at a time point when the predetermined time period (e.g., 60 seconds) has elapsed since the termination of the docking or charging on the station device 200, the cordless vacuum cleaner 100 may not turn on the power.

In an embodiment of the disclosure, the cordless vacuum cleaner 100 may reactivate the gesture detection mode when receiving a user input for turning on the cordless vacuum cleaner 100 while the gesture detection mode is deactivated. Additionally, the cordless vacuum cleaner 100 may detect at least one movement pattern among predefined movement patterns by analyzing movement information of the cordless vacuum cleaner 100. In an embodiment, the gesture detection mode may be deactivated when the user separates the cordless vacuum cleaner 100 from the station device 200 and leaves the predefined movement pattern on the floor for a predetermined time period or longer, for example. In this case, because the user is not able to turn on the power of the cordless vacuum cleaner 100 with the movement pattern of shaking the cleaner main body 1000 left and right, the user may press a power button included in the user interface 1700 with his or her finger. When receiving an input for pressing the power button from the user, the cordless vacuum cleaner 100 may turn on the power, operate in a default mode, and reactivate the gesture detection mode. Because the gesture detection mode has been activated again, the user may manipulate the cordless vacuum cleaner 100 according to a predefined movement pattern. In an embodiment, the user may increase the strength of a suction power via a movement pattern of rotating the cleaner main body 1000 clockwise, for example.

Figure 16:
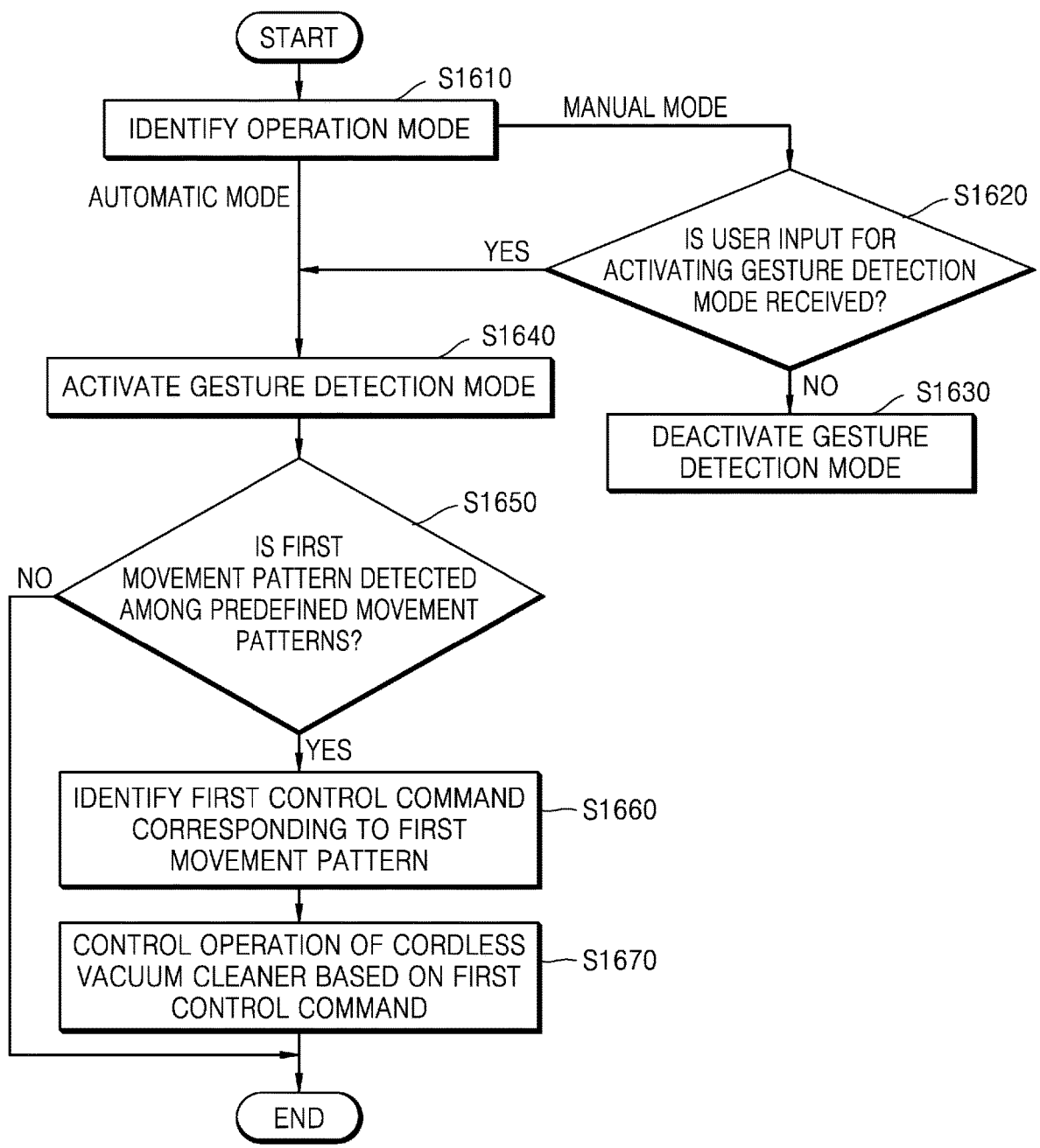
FIG. 16 is a flowchart of an embodiment of a method, performed by a cordless vacuum cleaner, of operating in an automatic mode or a manual mode, according to the disclosure.

FIG. 16 is a flowchart of an embodiment of a method, performed by the cordless vacuum cleaner 100, of operating in an automatic mode or a manual mode, according to the disclosure.

In operation S1610, according to the disclosure, the cordless vacuum cleaner 100 may identify an operation mode related to gesture detection when docking or charging of the cordless vacuum cleaner 100 on the station device 200 is terminated. In this case, operation modes related to gesture detection may include an automatic mode and a manual mode. The automatic mode may be a mode in which the gesture detection mode is automatically activated when the docking or charging of the cordless vacuum cleaner 100 on the station device 200 is terminated, and the manual mode may be a mode in which the gesture detection mode is activated via a predetermined user input after the docking or charging of the cordless vacuum cleaner 100 on the station device 200 is terminated.

In operation S1620, according to the disclosure, when the identified mode is a manual mode, the cordless vacuum cleaner 100 may determine whether a user input for activating the gesture detection mode is received after the docking or charging of the cordless vacuum cleaner 100 on the station device 200 is terminated.

In an embodiment of the disclosure, there may be various user inputs for activating the gesture detection mode. In an embodiment, the user input for activating the gesture detection mode may include, but is not limited to, an input of touching a + button, − button, or power button a predetermined number of times (e.g., twice) or more, an input of pressing the + button, − button, or power button for a predetermined time period (e.g., 3 seconds) or longer, and an input of pressing a predetermined button for the gesture detection mode, for example.

In an embodiment of the disclosure, when a user input for activating the gesture detection mode is received, the cordless vacuum cleaner 100 may activate the gesture detection mode for a predetermined time period (e.g., 30 seconds). In addition, according to the disclosure, when the user input for activating the gesture detection mode is received, the cordless vacuum cleaner 100 may activate the gesture detection mode until the power is turned off.

In operation S1630, according to the disclosure, when the identified operation mode is a manual mode, the cordless vacuum cleaner 100 may deactivate the gesture detection mode when the user input for activating the gesture detection mode is not received after the docking or charging of the cordless vacuum cleaner 100 on the station device 200 is terminated. Accordingly, in the case of the manual mode, the user first needs to press a button for activating the gesture detection mode in order to manipulate the cordless vacuum cleaner 100 with a predefined movement pattern.

In operation S1640, according to the disclosure, when the identified operation mode is an automatic mode, the cordless vacuum cleaner 100 may automatically activate the gesture detection mode in response to the termination of the docking or charging of the cordless vacuum cleaner 100 on the station device 200. Accordingly, after separating the cordless vacuum cleaner 100 from the station device 200, the user may freely manipulate the cordless vacuum cleaner 100 by a predefined movement pattern.

In operation S1650, according to the disclosure, the cordless vacuum cleaner 100 may detect a first movement pattern among predefined movement patterns while the gesture detection mode is activated.

In operation S1660, according to the disclosure, the cordless vacuum cleaner 100 may identify a first control command corresponding to the first movement pattern.

In operation S1670, the cordless vacuum cleaner 100 in an embodiment of the disclosure may control an operation of the cordless vacuum cleaner 100 based on the first control command.

Because operations S1650 to S1670 respectively correspond to operation S1120 to S1140 of FIG. 11, descriptions already provided above will be omitted below.

Figure 17:
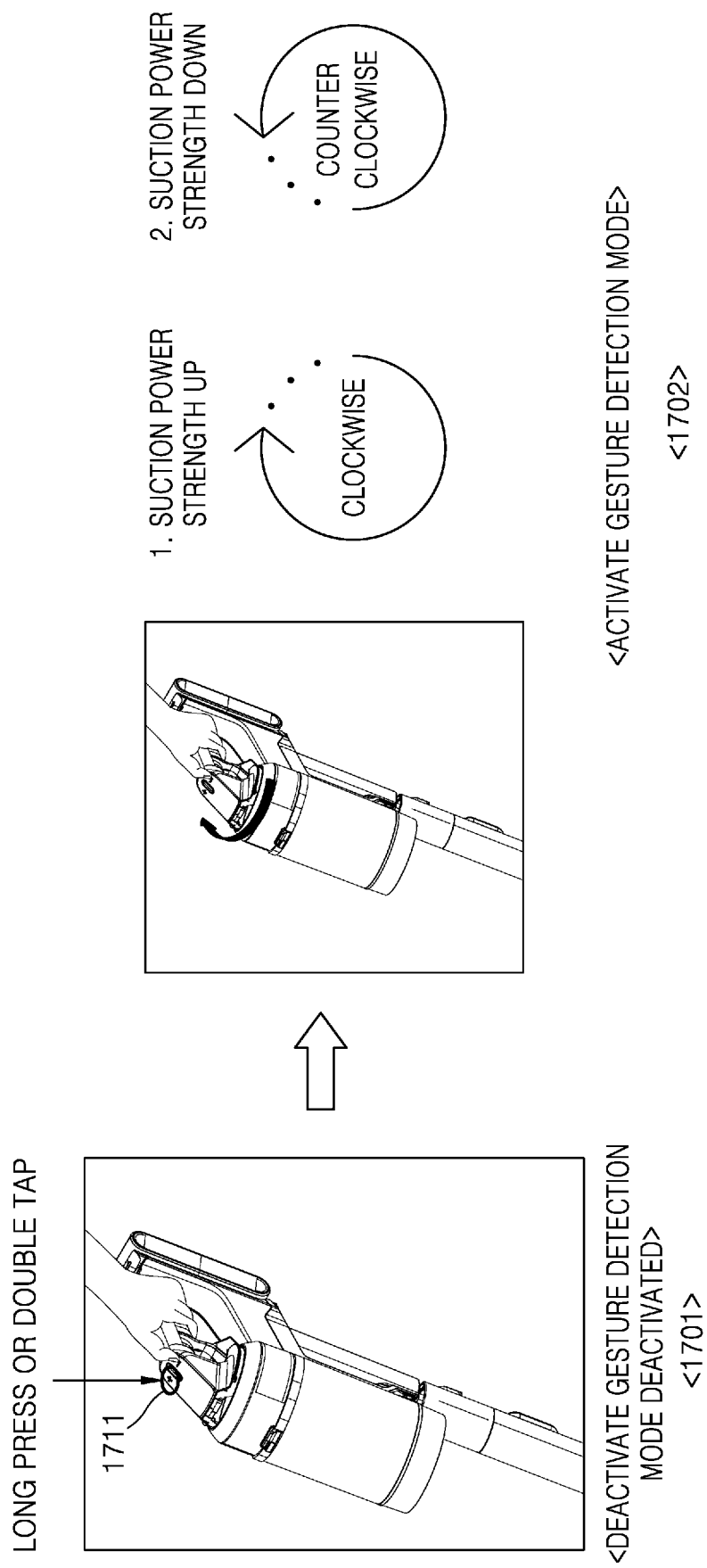
FIG. 17 is a diagram illustrating an embodiment of a manual mode according to the disclosure.

FIG. 17 is a diagram illustrating an embodiment of a manual mode according to the disclosure.

In an embodiment of the disclosure, a manual mode may be set as an operation mode related to gesture detection in the cordless vacuum cleaner 100. In an embodiment, the user may set a manual mode with respect to gesture detection via the user terminal 400, the user interface 204 of the station device 200, or the user interface 1700 of the cordless vacuum cleaner 100, for example.

When the manual mode is set, the cordless vacuum cleaner 100 may deactivate the gesture detection mode even when docking or charging thereof on the station device 200 is terminated (1701). In this case, the cordless vacuum cleaner 100 may not respond even when the user moves the cordless vacuum cleaner 100 according to a predefined movement pattern.

In an embodiment of the disclosure, the user may press a + button 1711 for a predetermined time period or longer (long press) or touch the + button 1711 twice (double tap) to activate the gesture detection mode. The cordless vacuum cleaner 100 may activate the gesture detection mode when receiving an input of pressing the + button 1711 for a predetermined time period or longer (a long press on the + button 1711) or touching the + button 1711 twice (a double tap thereon) (1702). Accordingly, the user may manipulate the cordless vacuum cleaner 100 by moving the cordless vacuum cleaner 100 according to a predefined movement pattern. In an embodiment, the user may activate the gesture detection mode by pressing the + button 1711 for a predetermined time period (e.g., 3 seconds) or longer and then increase a strength of a suction power by rotating the cleaner main body 1000 clockwise, for example.

Although FIG. 17 illustrates an embodiment in which the user input for activating the gesture detection mode is an input of pressing the + button 1711 for the predetermined time period (e.g., 3 seconds) or longer (long press) or touching the + button 1711 twice (double tap), the disclosure is not limited thereto. In an embodiment, the user input for activating the gesture detection mode may be an input of simultaneously pressing the + button 1711 and a − button, for example.

Figure 18:
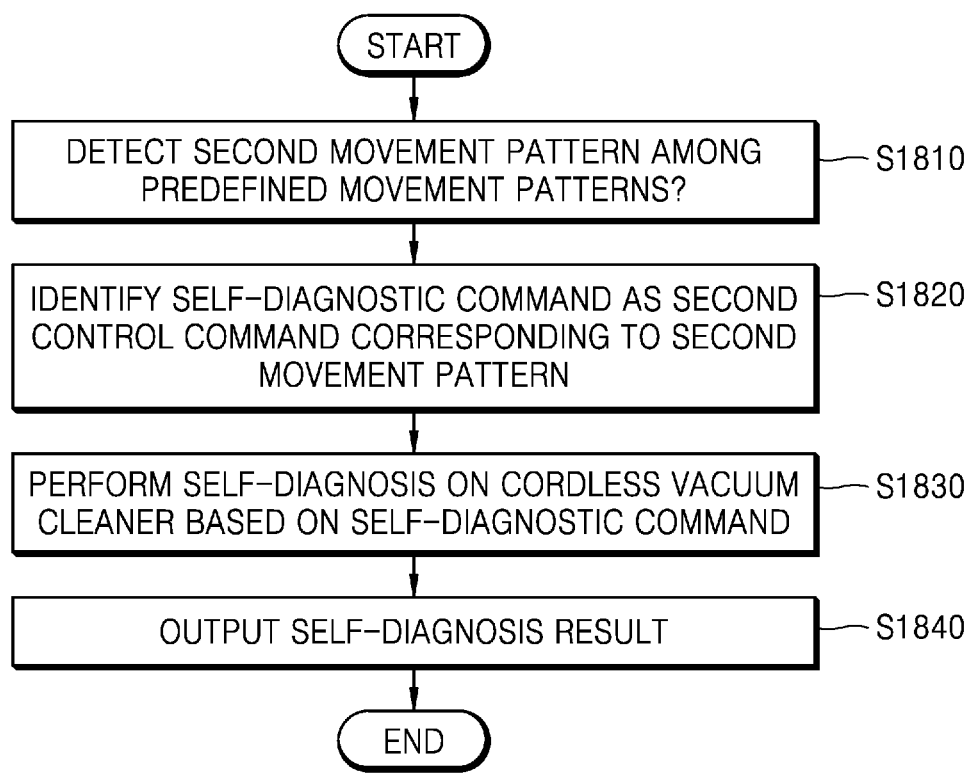
FIG. 18 is a flowchart of an embodiment of a method, performed by a cordless vacuum cleaner, of performing self-diagnosis according to user gestures according to the disclosure.

FIG. 18 is a flowchart of an embodiment of a method, performed by the cordless vacuum cleaner 100, of performing self-diagnosis according to user gestures according to the disclosure.

In operation S1810, according to the disclosure, the cordless vacuum cleaner 100 may detect a second movement pattern related to self-diagnosis among the predefined movement patterns. In an embodiment, the second movement pattern related to self-diagnosis may be a movement pattern achieved by lifting the cordless vacuum cleaner 100 and drawing a shape of the letter Z, for example, but is not limited thereto.

In operation S1820, according to the disclosure, the cordless vacuum cleaner 100 may identify a self-diagnostic command as a second control command corresponding to the second movement pattern. In an embodiment of the disclosure, the second movement pattern may be predefined by matching with the self-diagnostic command.

Referring to 1910 of FIG. 19, the user may clean the floor by the cordless vacuum cleaner 100. The user may want the cordless vacuum cleaner 100 to perform self-diagnosis to determine whether the dust bin 1200 needs to be emptied or whether the flow path is clogged during cleaning. In this case, referring to 1920 of FIG. 19, the user may manipulate the cordless vacuum cleaner 100 according to a predefined movement pattern corresponding to the self-diagnostic command. In an embodiment, the user may lift the cordless vacuum cleaner 100 to draw a shape of the letter Z, for example. In this case, in response to detecting a movement pattern achieved by drawing the shape of the letter Z, the cordless vacuum cleaner 100 may identify the self-diagnostic command among a plurality of control commands.

In operation S1830, according to the disclosure, the cordless vacuum cleaner 100 may perform self-diagnosis on the cordless vacuum cleaner 100 based on the self-diagnostic command.

In an embodiment of the disclosure, the cordless vacuum cleaner 100 may predict an assembly status of the brush device 2000, the presence of foreign substances trapped in the brush device 2000, etc., based on an operating current of the brush device 2000 detected via the load detection sensor (also referred to as load sensing sensor) 1134 (refer to FIG. 4), and display guidance information (notification) to the user or automatically calibrate an AI model (e.g., an SVM algorithm, etc.) trained to infer a usage environment status of the brush device 2000.

Figure 20:
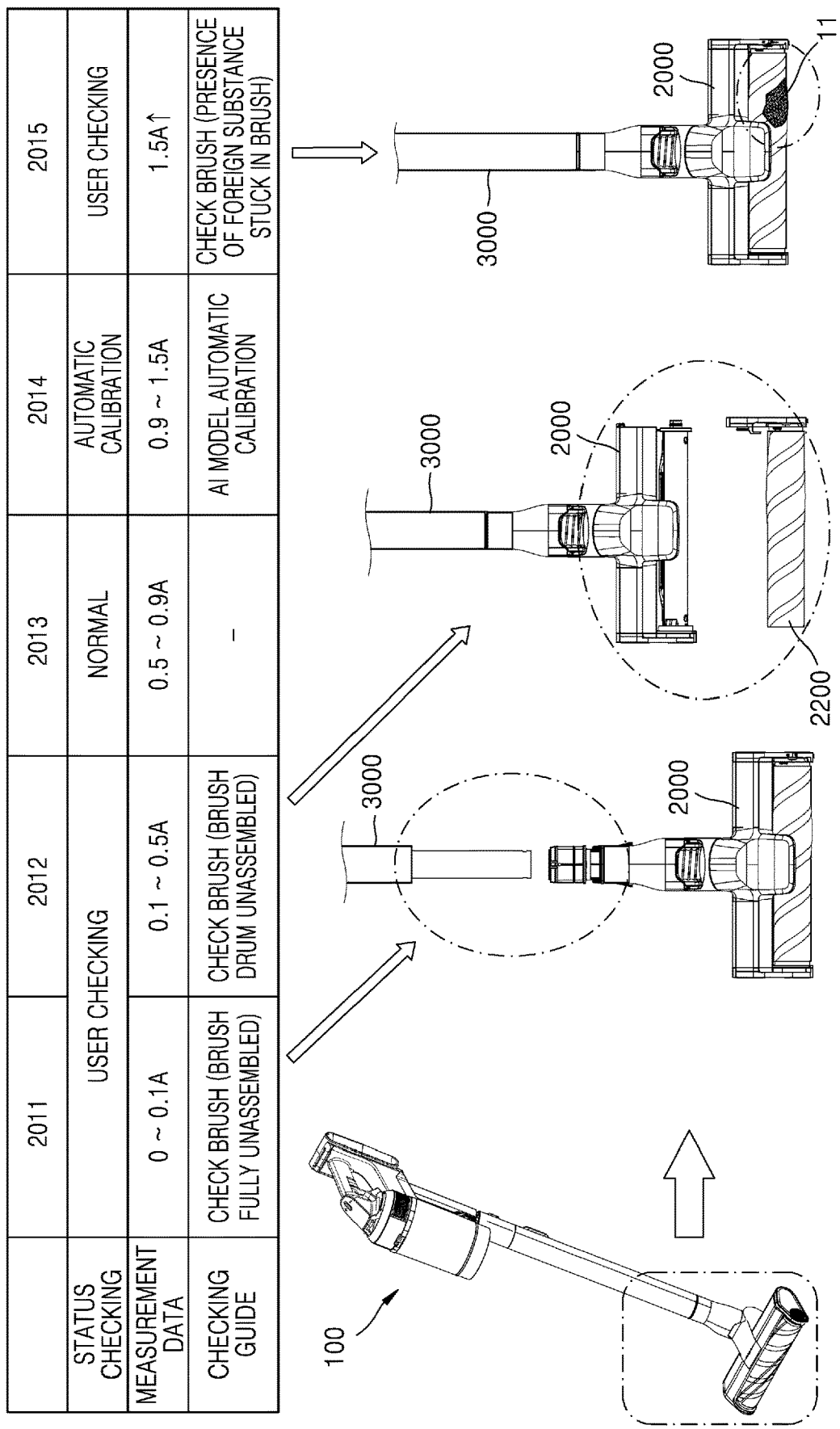
FIG. 20 is a diagram illustrating an embodiment of an operation in which a cordless vacuum cleaner performs self-diagnosis based on data related to a load of a brush device, according to the disclosure.

In an embodiment, referring to FIG. 20, when the operating current of the brush device 2000 is 0 A to 0.1 A (2011), the cordless vacuum cleaner 100 may determine that the brush device 2000 has been detached from the extension pipe 3000, for example. In this case, the cordless vacuum cleaner 100 may output, to the user, a notification to check whether the brush device 2000 is coupled to the extension pipe 3000.

When the operating current of the brush device 2000 is 0.1 A to 0.5 A (2012), the cordless vacuum cleaner 100 may determine that the drum 2200 is not assembled in the brush device 2000. Accordingly, the cordless vacuum cleaner 100 may output a notification to the user to check whether the drum 2200 is assembled.

When the operating current of the brush device 2000 is 0.5 A to 0.9 A (2013), the cordless vacuum cleaner 100 may determine that the state of the cordless vacuum cleaner 100 is normal.

Furthermore, when the operating current of the brush device 2000 is 0.9 A to 1.5 A (2014), the cordless vacuum cleaner 100 may determine that a small foreign substance (e.g., dust, hair, or the like) is stuck in the brush device 2000. In this case, the cordless vacuum cleaner 100 may automatically modify parameter values of the AI model without outputting a separate notification to the user. When the AI model is an SVM model, a hyperplane for discriminating the usage environment status of the brush device 2000 may be represented by a linear equation (y=ax+b) or a higher-order equation (e.g., $y=ax^2+b$, $y=ax^3+b$, etc.). Here, a and b may be parameter values, and may be automatically modified by the cordless vacuum cleaner 100 during self-diagnosis.

When the operating current of the brush device 2000 is 1.5 A or more (2015), the cordless vacuum cleaner 100 may determine that a large foreign substance 11 (e.g., paper, handkerchief, etc.) is stuck in the brush device 2000. In this case, the cordless vacuum cleaner 100 may output, to the user, a notification to check the status of the brush device 2000 or remove the large foreign substance 11 from the brush device 2000.

In an embodiment of the disclosure, the cordless vacuum cleaner 100 may predict a state of the dust bin 1200, a state of the flow path, etc., based on a pressure value measured via the pressure sensor 1400, and display guide information (notification) to the user or automatically calibrate the AI model.

Figure 21:
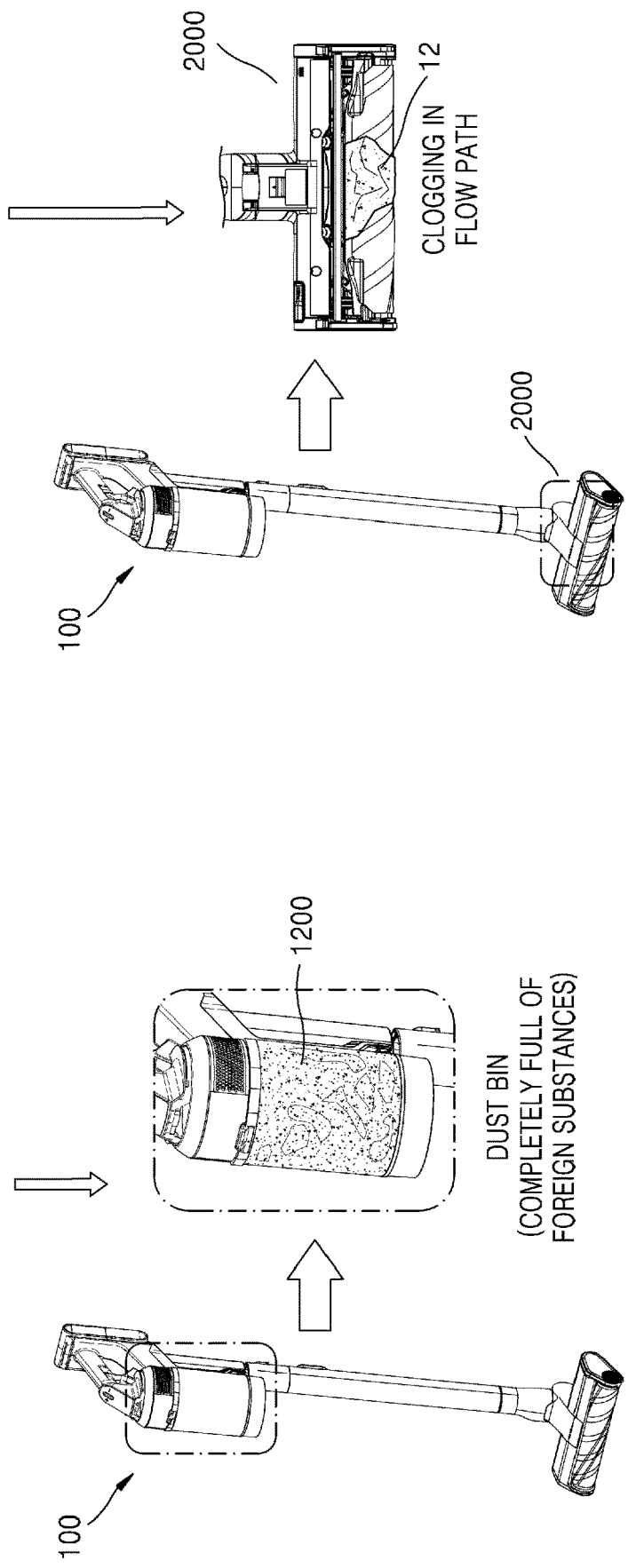
FIG. 21 is a diagram illustrating an embodiment of an operation in which a cordless vacuum cleaner performs self-diagnosis based on data regarding a flow path pressure, according to the disclosure.

In an embodiment, referring to FIG. 21, when a pressure value is 0 pascal (Pa) to 200 Pa (2101), the cordless vacuum cleaner 100 may determine that the dust bin 1200 is completely full of foreign substances and output, to the user, a notification to check the dust bin 1200. When the pressure sensor 1400 is provided in the suction duct 40, the dust bin 1200 may be disposed downstream (in the rear) from the pressure sensor 1400 with respect to the flow of air, for example. Accordingly, the more dust accumulated in the dust bin 1200, the lower the pressure value measured by the pressure sensor 1400.

When the pressure value is 200 Pa to 300 Pa (2102), the cordless vacuum cleaner 100 may determine that the dust bin 1200 is slightly full of foreign substances. At this time, the cordless vacuum cleaner 100 may automatically modify parameter values of the AI model without outputting a separate notification to the user.

When the pressure value is 300 Pa to 500 Pa (2103), the cordless vacuum cleaner 100 may determine that the state of the cordless vacuum cleaner 100 is normal. In addition, when the pressure value is 500 Pa to 1000 Pa (2104), the cordless vacuum cleaner 100 may determine that the flow path is slightly clogged by a small foreign substance (e.g., dust, hair, or the like). In this case, the cordless vacuum cleaner 100 may automatically modify parameter values of the AI model without outputting a separate notification to the user.

When the pressure value is 1000 Pa or more (2105), the cordless vacuum cleaner 100 may determine that the flow path is clogged by a large foreign substance 12 (e.g., paper, handkerchief, etc.). In this case, the cordless vacuum cleaner 100 may output, to the user, a notification to check for clogging in the flow path or to remove the large foreign substance 12 from the brush device 2000. When the pressure sensor 1400 is provided in the suction duct 40, the extension pipe 3000 and the brush device 2000 may be disposed upstream from the pressure sensor 1400 with respect to the flow of air. Accordingly, when the extension pipe 3000 becomes clogged or a foreign substance is stuck in the brush device 2000, a pressure value measured by the pressure sensor 1400 is increased.

In operation S1840, according to the disclosure, the cordless vacuum cleaner 100 may output a result of the self-diagnosis.

In an embodiment of the disclosure, the cordless vacuum cleaner 100 may visually or audibly provide the result of self-diagnosis to the user. In an embodiment, the cordless vacuum cleaner 100 may display the result of self-diagnosis on the display, or output the result of self-diagnosis as a voice via a speaker, for example.

Figure 22:
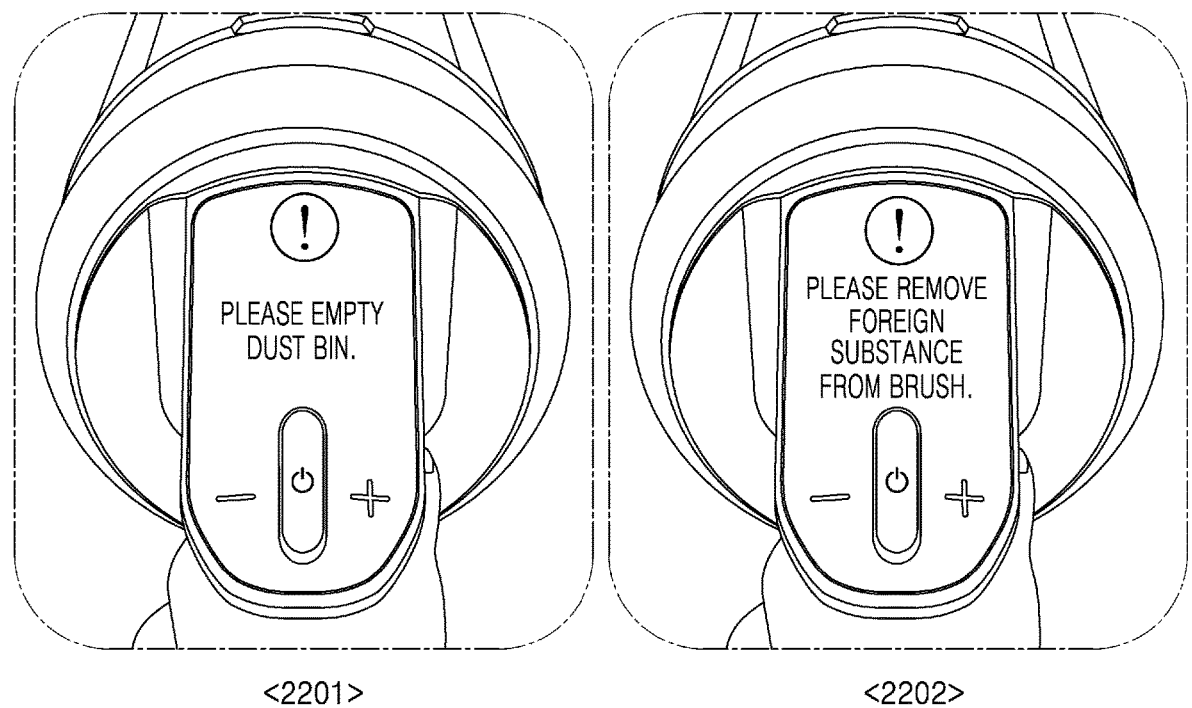
FIG. 22 is a diagram illustrating an embodiment of an operation in which a cordless vacuum cleaner outputs a self-diagnosis result according to the disclosure.

In an embodiment, referring to 2201 in FIG. 22, when it is determined, as a result of the self-diagnosis, that the dust bin 1200 is completely full of foreign substances, the cordless vacuum cleaner 100 may output to the user a notification to check the dust bin 1200 (e.g., "Please empty the dust bin"), for example. Referring to 2202 in FIG. 22, when it is determined, as a result of the self-diagnosis, that the flow path is clogged by a foreign substance (e.g., paper, handkerchief, etc.), the cordless vacuum cleaner 100 may output a notification to remove the foreign substance from the brush device 2000 (e.g., "Please remove the foreign substance from the brush").

Figure 23:
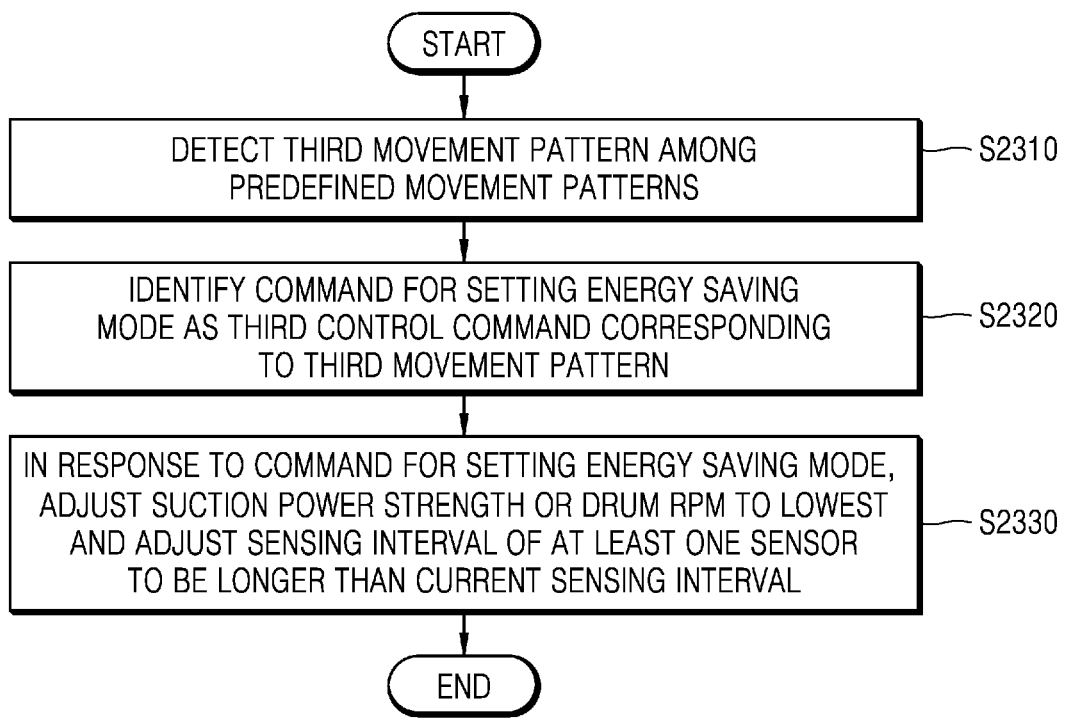
FIG. 23 is a flowchart illustrating an embodiment of a method, performed by a cordless vacuum cleaner, of operating in an energy saving mode according to a user gesture, according to the disclosure.

FIG. 23 is a flowchart illustrating an embodiment of a method, performed by the cordless vacuum cleaner 100, of operating in an energy saving mode according to a user gesture, according to the disclosure.

In operation S2310, according to the disclosure, the cordless vacuum cleaner 100 may detect a third movement pattern related to an energy saving mode among the predefined movement patterns. In an embodiment, the third movement pattern related to the energy saving mode may be a movement pattern of consecutively moving in the ↙→ directions, for example, but is not limited thereto. The energy saving mode may be a mode for increasing the usage time of the battery 1500 by minimizing the energy usage of the cordless vacuum cleaner 100. The energy saving mode may also be also referred to as a low power mode.

In operation S2320, according to the disclosure, the cordless vacuum cleaner 100 may identify a command for setting the energy saving mode as a third control command corresponding to the third movement pattern. In an embodiment of the disclosure, the third movement pattern may be predefined by matching the command for setting the energy saving mode.

In operation S2330, according to the disclosure, in response to the command for setting the energy saving mode, the cordless vacuum cleaner 100 may adjust a suction power strength or drum RPM to a lowest level, and adjust a sensing interval of at least one sensor to be longer than a current sensing interval.

In an embodiment of the disclosure, the cordless vacuum cleaner 100 may operate in the energy saving mode in response to detecting the third movement pattern. When operating in the energy saving mode, the cordless vacuum cleaner 100 may adjust the suction power strength to the lowest level in order to reduce usage of the battery 1500. Additionally, the cleaner main body 1000 of the cordless vacuum cleaner 100 may transmit, to the brush device 2000, a signal indicating adjustment of the drum RPM to a lowest level. The brush device 2000 may adjust the drum RPM to the lowest level based on the received signal.

Moreover, the cordless vacuum cleaner 100 may adjust a sensing interval of the sensors included in the cleaner main body 1000 to be longer than a current sensing interval. In an embodiment of the disclosure, the at least one sensor may include the pressure sensor 1400, the gyro sensor 1951, the acceleration sensor 1952, etc., but is not limited thereto.

The operation in which the cordless vacuum cleaner 100 sets the energy saving mode is described in more detail with reference to FIG. 24.

Figure 24:
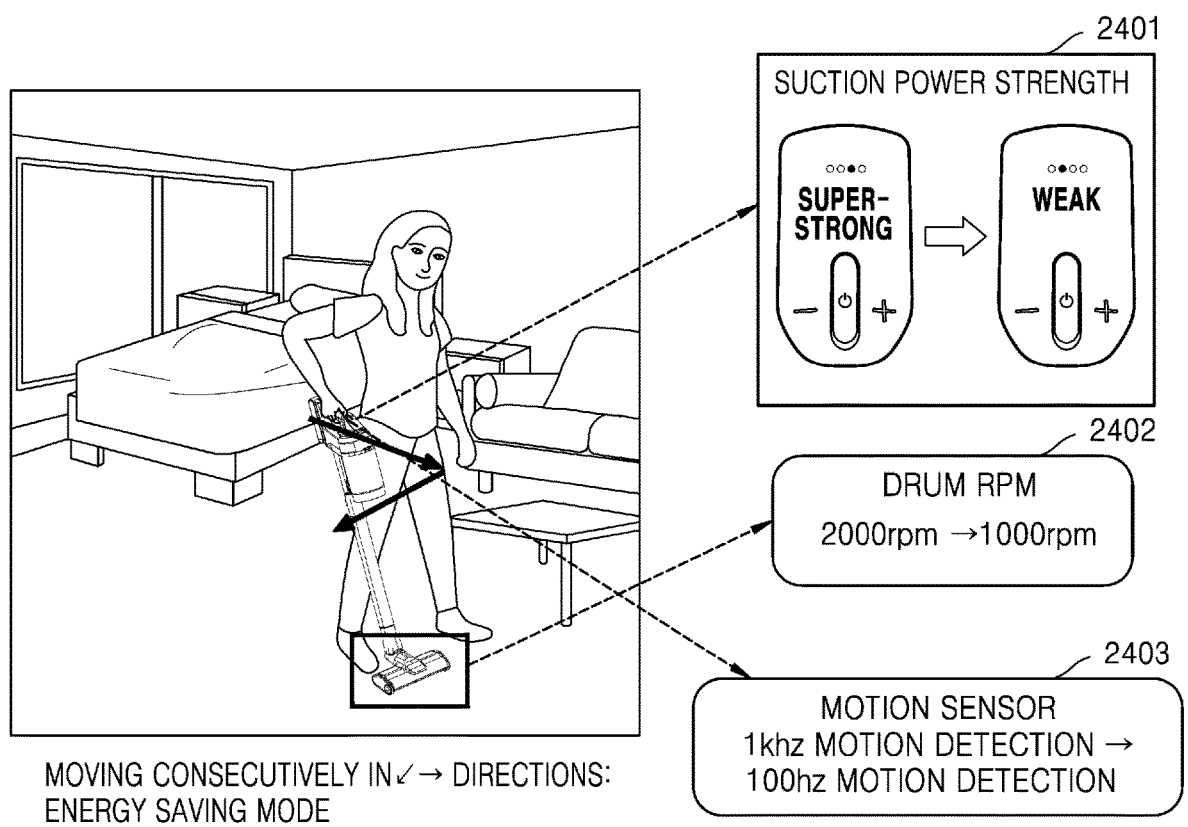
FIG. 24 is a diagram illustrating an embodiment of an operation in which a cordless vacuum cleaner sets an energy saving mode in response to a user gesture, according to the disclosure.

FIG. 24 is a diagram illustrating an embodiment of an operation in which the cordless vacuum cleaner 100 sets an energy saving mode in response to a user gesture, according to the disclosure. An embodiment in which a movement pattern in which the cordless vacuum cleaner 100 continuously moves in the ↙→ directions corresponds to a control command for setting an energy saving mode is described with reference to FIG. 24.

The user may consecutively move the cordless vacuum cleaner 100 in the ←↗ directions to reduce usage of the battery 1500 during cleaning. At this time, the cordless vacuum cleaner 100 may detect a movement pattern of consecutively moving in the →↙ directions, and switch the operation mode to the energy saving mode. In the energy saving mode, the cordless vacuum cleaner 100 may adjust a suction power strength to a lowest level. In an embodiment, when a current suction power mode is a super-strong mode, the cordless vacuum cleaner 100 may switch to a weak mode (2401), for example.

Additionally, in the energy saving mode, the cordless vacuum cleaner 100 may adjust a drum RPM of the brush device 2000 to a lowest level. In an embodiment, when the current drum RPM is 2000 RPM, the cordless vacuum cleaner 100 may transmit, via the first processor 1131 of the motor assembly 1100, a signal indicating adjustment of the drum RPM to 1000 RPM to the second processor 2410 of the brush device 2000 (2402), for example.

In an embodiment of the disclosure, in the energy saving mode, the cordless vacuum cleaner 100 may adjust a sensing interval of at least one sensor to be long. In an embodiment, when the motion sensor 1950 currently detects movement once every 0.001 second (1 kilohertz (khz) motion detection), the cordless vacuum cleaner 100 may control the motion sensor 1950 to detect movement once every 0.01 second (100 hz motion detection) (2403), for example.

Figure 25:
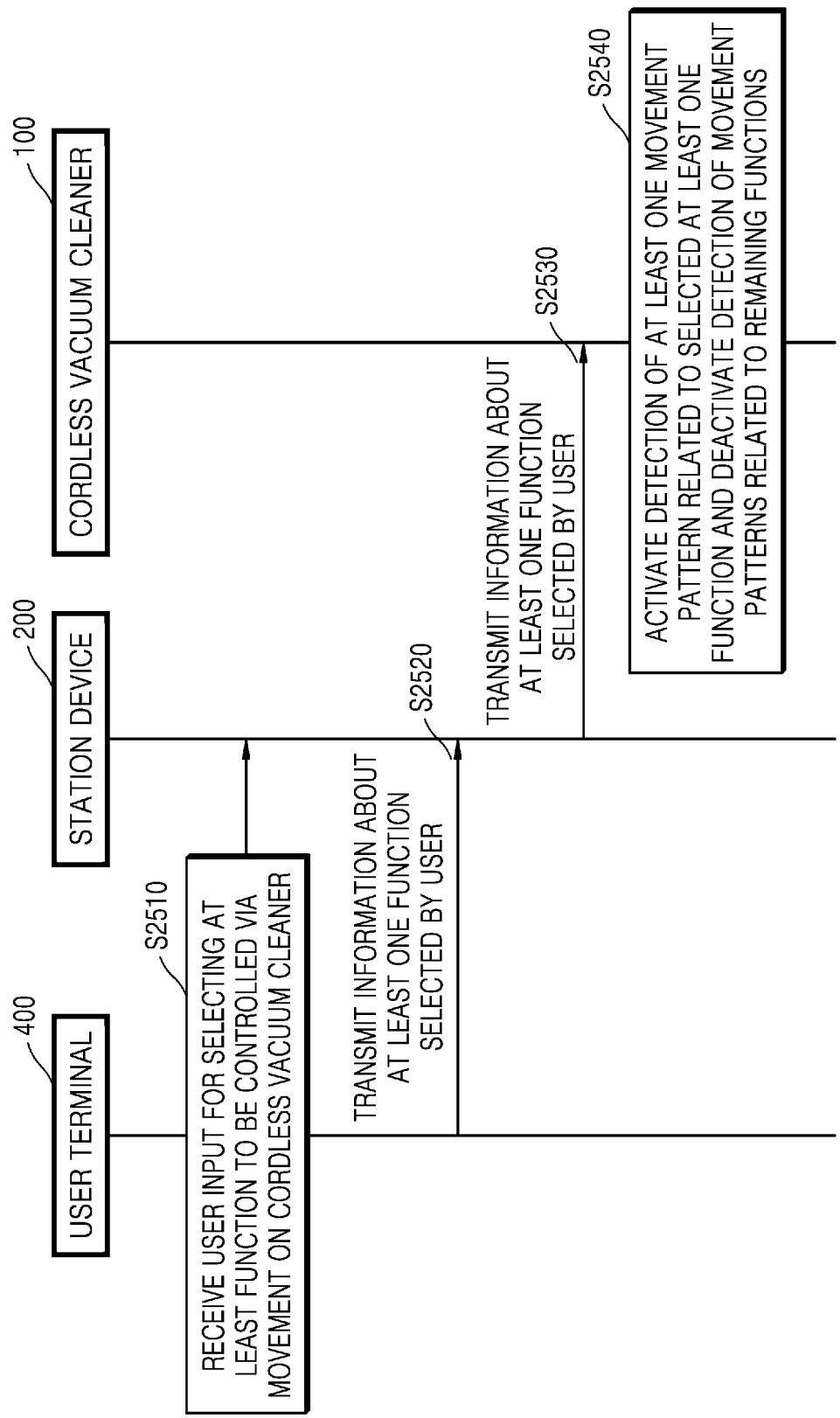
FIG. 25 is a flowchart of an embodiment of a method, performed by a cordless vacuum cleaner, of activating detection of a movement pattern associated with some functions selected by a user, according to the disclosure.

FIG. 25 is a flowchart of an embodiment of a method, performed by the cordless vacuum cleaner 100, of activating detection of movement patterns associated with some functions selected by the user, according to the disclosure.

In operation S2510, according to the disclosure, the user terminal 400 may receive a user input for selecting at least one function to be controlled via a movement (gesture) using the cordless vacuum cleaner 100.

In an embodiment of the disclosure, the user terminal 400 may execute a predetermined application for managing the cordless vacuum cleaner 100 according to a user's request. A plurality of functions provided by the cordless vacuum cleaner 100 may be displayed in the predetermined application. The plurality of functions may include, but are not limited to, a function of turning on or off the power, a function of adjusting the strength of suction power, a function of performing self-diagnosis, a function of turning on or off the display, and a function of executing a predetermined mode (e.g., executing an energy saving mode and executing a jet mode for 2 seconds). The user may select at least one function to be controlled via a movement (gesture) from among the plurality of functions. In an embodiment, the user may select, from among the plurality of functions, a function of turning on or off the power and a function of adjusting the strength of a suction power, for example.

In operation S2520, according to the disclosure, the user terminal 400 may transmit information about the at least one function selected by the user to the station device 200.

In an embodiment of the disclosure, the user terminal 400 may transmit, via the server device 300, the information about the at least one function selected by the user to the station device 200. In an alternative embodiment, the user terminal 400 may directly transmit the information about the at least one function selected by the user to the station device 200 via device to device (D2D) communication (e.g., BLE communication, WFD communication, etc.).

In operation S2530, according to the disclosure, the station device 200 may transmit the information about the at least one function selected by the user to the cordless vacuum cleaner 100. In an embodiment, when the cordless vacuum cleaner 100 is docked to the station device 200, the station device 200 may establish a short-range wireless communication channel (e.g., BLE communication channel) with the cordless vacuum cleaner 100 and transmit the information about the at least one function selected by the user to the cordless vacuum cleaner 100 via the short-range wireless communication channel, for example.

In operation S2540, according to the disclosure, the cordless vacuum cleaner 100 may activate detection of at least one movement pattern associated with the selected at least one function and deactivate detection of movement patterns associated with the remaining functions.

In an embodiment, when the user selects a function of turning on or off the power and a function of adjusting the strength of a suction power from among the plurality of functions, the cordless vacuum cleaner 100 may activate detection of a first movement pattern (e.g., a movement pattern of shaking the cleaner main body 1000 left and right) associated with the function of turning the power on or off and a second movement pattern (e.g., a movement pattern of rotating clockwise or counterclockwise) associated with the function of adjusting the strength of suction power, for example. In addition, the cordless vacuum cleaner 100 may deactivate detection of a third movement pattern (e.g., a movement pattern of moving twice in the same direction consecutively)associated with the function of turning off or on the display, a fourth movement pattern (e.g., a movement pattern achieved by drawing a shape of the letter Z) associated with a self-diagnosis function, and a fifth movement pattern (e.g., a movement pattern of moving consecutively in the ⤢ directions) associated with the energy saving mode. In other words, the cordless vacuum cleaner 100 may only compare a current movement pattern obtained via the motion sensor 1950 with the first movement pattern and the second movement pattern. The cordless vacuum cleaner 100 may not compare the current movement pattern obtained via the motion sensor 1950 with the third movement pattern, the fourth movement pattern, and the fifth movement pattern.

Although FIG. 25 illustrates an embodiment in which the user selects at least one function via the user terminal 400, but the disclosure is not limited thereto. The user may select at least one function via the user interface 1700 of the cordless vacuum cleaner 100 or the user interface 204 of the station device 200.

Figure 26:
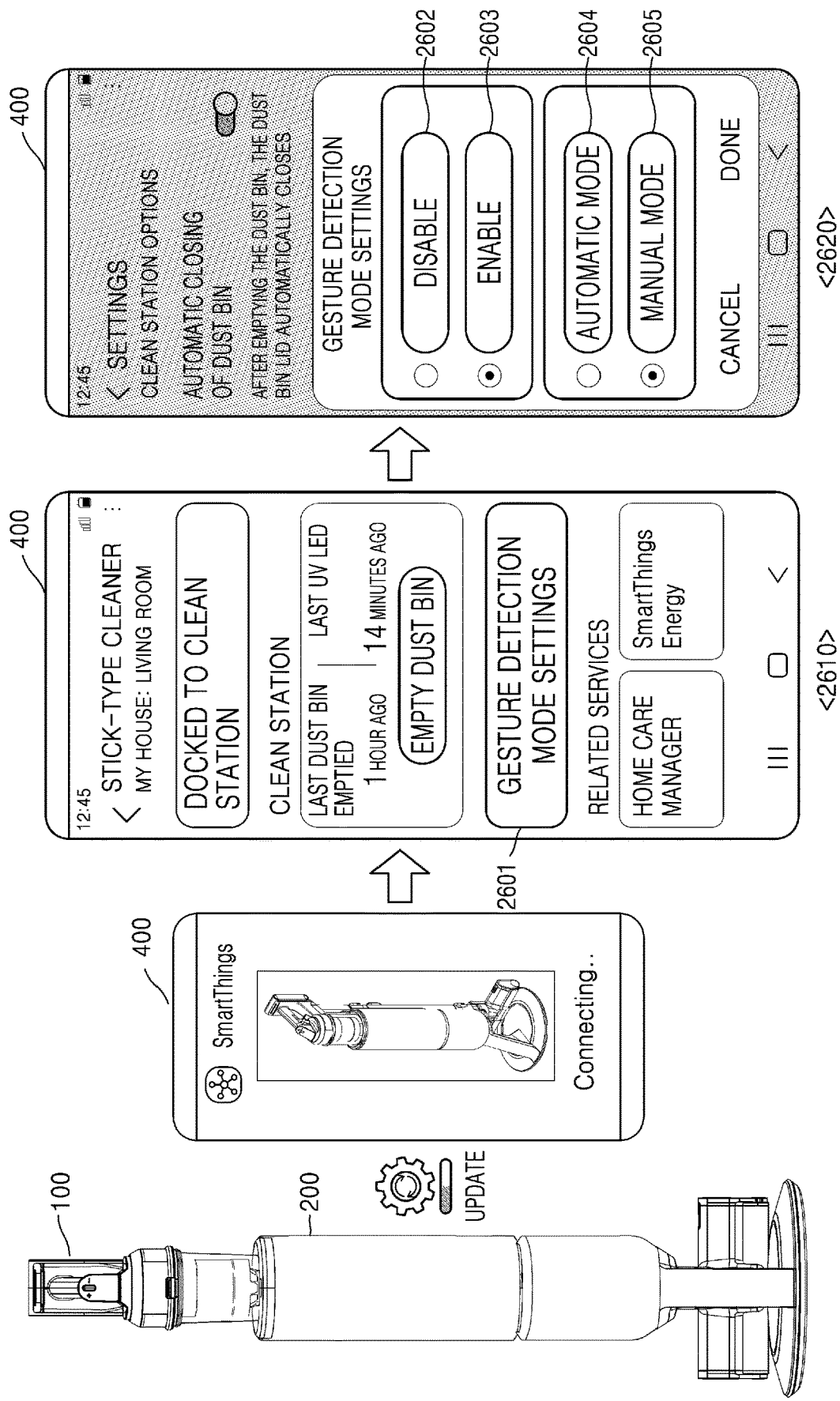
FIG. 26 is a diagram illustrating an embodiment of a graphical user interface (GUI) for inputting settings related to a gesture detection mode, according to the disclosure.

FIG. 26 is a diagram illustrating an embodiment of a GUI for inputting settings related to a gesture detection mode, according to the disclosure.

Referring to FIG. 26, the user may input settings related to the gesture detection mode through the user terminal 400 connected to the station device 200. In an embodiment, the user terminal 400 may display a first screen 2610 of a predetermined application (e.g., a home appliance management application), for example. The first screen 2610 may include an icon 2601 for setting the gesture detection mode. When the user selects the icon 2601 for setting the gesture detection mode on the first screen 2610, the user terminal 400 may display a second screen 2620. The second screen 2620 may include, but is not limited to, a first icon 2602 for disabling the gesture detection mode, a second icon 2603 for enabling the gesture detection mode, a third icon 2604 for setting an automatic mode, and a fourth icon 2605 for setting a manual mode.

When the user selects the first icon 2602, the user terminal 400 may transmit, to the sever device 300, information indicating that the user wishes to disable the gesture detection mode. In this case, the server device 300 may transmit, via the station device 200, a signal indicating deactivation of the gesture detection mode to the cordless vacuum cleaner 100.

When the user selects the second icon 2603 and one of the third icon 2604 and the fourth icon 2605, the user terminal 400 may transmit information corresponding to the selected icons to the server device 300. In an embodiment, when the user selects the second icon 2603 and the third icon 2604, the user terminal 400 may transmit, to the server device 300, information indicating that the user wants to automatically execute the gesture detection mode, for example. In this case, the server device 300 may transmit, via the station device 200, a signal indicating automatic execution of the gesture detection mode to the cordless vacuum cleaner 100. Thereafter, when detecting that docking to the station device 200 is terminated, the cordless vacuum cleaner 100 may automatically activate the gesture detection mode.

When the user selects the second icon 2603 and the fourth icon 2605, the user terminal 400 may transmit, to the server device 300, information indicating that the user wants to manually execute the gesture detection mode. In this case, the server device 300 may transmit, via the station device 200, a signal indicating manual execution of the gesture detection mode to the cordless vacuum cleaner 100. Thereafter, the cordless vacuum cleaner 100 may activate the gesture detection mode when a user input for activating the gesture detection mode is received.

FIG. 27 is a diagram illustrating an embodiment of a GUI for inputting detailed gesture settings, according to the disclosure.

Referring to FIG. 27, the user terminal 400 may display, in an application execution window, functions that may be controlled via a movement using the cordless vacuum cleaner 100. In this case, the user may select at least one function that he or she wishes to control via a movement on the cordless vacuum cleaner 100 from among the functions displayed in the application execution window. Referring to 2710 of FIG. 27, the user may select a function of turning on/off the power, a function of increasing a suction power, and a function of decreasing a suction power, from among the functions of turning on/off the power, the function of increasing a suction power, the function of decreasing a suction power, and a function of performing self-diagnosis. Referring to 2720 of FIG. 27, the user may select only a function of executing an energy saving mode from among a function of turning on the display, a function of turning off the display, the function of executing an energy saving mode, and a function of executing a jet mode.

In this case, the user terminal 400 may transmit information about the functions selected by the user to the server device 300, and the server device 300 may transmit, via the station device 200, the information about the functions selected by the user to the cordless vacuum cleaner 100. At this time, the cordless vacuum cleaner 100 may activate only detection of movement patterns corresponding to the functions selected by the user. In an embodiment, the cordless vacuum cleaner 100 may detect only movement patterns corresponding to the function of turning the power on/off, the function of increasing a suction power, the function of decreasing a suction power, and the function of executing an energy saving mode, while not detecting movement patterns corresponding to the other functions, for example. Thus, when the user shakes the cordless vacuum cleaner 100 left and right, the power of the cordless vacuum cleaner 100 may be turned on/off, but even when the user draws a Z shape with the cordless vacuum cleaner 100, the cordless vacuum cleaner 100 may not perform self-diagnosis.

Moreover, according to the disclosure, a user may modify a predefined movement pattern via an application execution window. In an embodiment, the user may modify a predefined movement pattern associated with turning the power on/off from shaking left and right to shaking up and down, for example. Additionally, the user may newly define a movement pattern in relation to a new function of the cordless vacuum cleaner 100. An operation in which the user defines a movement pattern is described with reference to FIG. 28.

Figure 28:
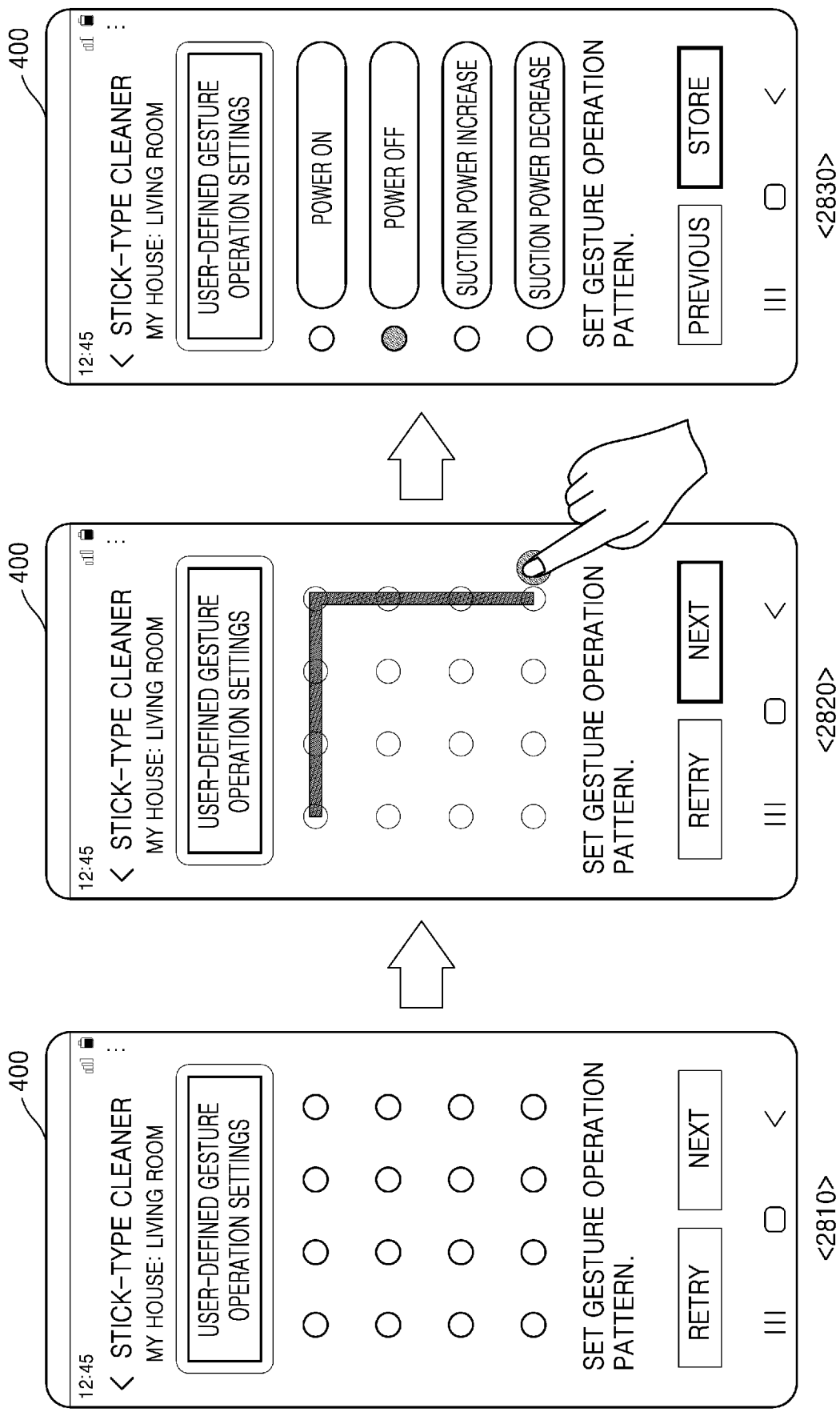
FIG. 28 is a diagram illustrating an embodiment of a GUI for defining a movement pattern, according to the disclosure.

FIG. 28 is a diagram illustrating an embodiment of a GUI for defining a movement pattern, according to the disclosure.

Referring to 2810 of FIG. 28, the user terminal 400 may display a GUI which allows the user to define a movement pattern in an application execution window. The GUI may include a plurality of points disposed at regular intervals, but is not limited thereto. In an embodiment, a GUI may be a blank slate where the user may freely draw lines, for example.

Referring to 2820 of FIG. 28, the user may define a movement pattern for the cordless vacuum cleaner 100 by connecting some of the plurality of points included in the GUI. In an embodiment, the user may create a '¬' pattern by connecting points disposed in a first row with points disposed in a last column, for example.

Referring to 2830 of FIG. 28, when the user has completed defining the movement pattern, the user terminal 400 may display a list of functions of the cordless vacuum cleaner 100 via an application execution window. At this time, the user may select, from the list of functions, a function (control command) of the cordless vacuum cleaner 100 to match the defined movement pattern. In an embodiment, the user may select power OFF among power ON, power OFF, suction power increase, and suction power decrease, for example.

When the user completes the selection of power OFF, the user terminal 400 may transmit, to the server device 300, via the application, information indicating that the user has matched the movement pattern of consecutively moving in →↓→↓ directions with the function of turning off the power. The server device 300 may transmit, to the cordless vacuum cleaner 100, via the station device 200, the information indicating that the movement pattern of consecutively moving in the →↓ directions has been defined in relation to the function of turning off the power. Thereafter, when a movement pattern of consecutively moving in the →↓ directions is detected, the cordless vacuum cleaner 100 may turn off the power thereof.

Moreover, according to the disclosure, the cordless vacuum cleaner 100 may apply different sensitivities for detecting movement patterns (hereinafter also referred to as gesture detection sensitivity) according to user-defined settings. In an embodiment of the disclosure, the user may set a sensitivity with which the cordless vacuum cleaner 100 detects movement patterns, via the user interface 204 of the station device 200, the user interface 1700 of the cordless vacuum cleaner 100, or the application execution window of the user terminal 400. Hereinafter, an operation in which the user sets a gesture detection sensitivity via the application execution window of the user terminal 400 is described in detail with reference to FIG. 29.

Figure 29:
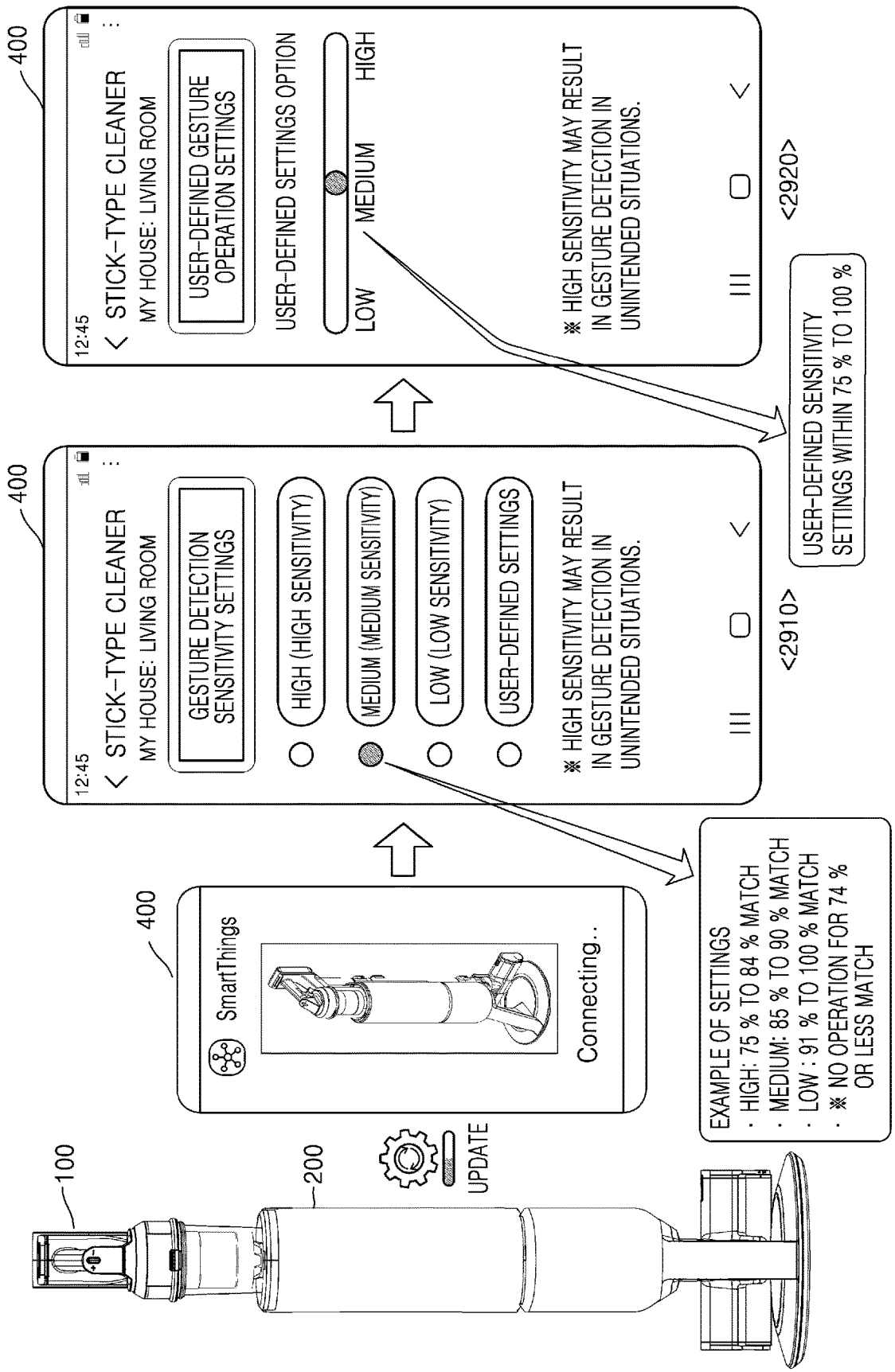
FIG. 29 is a diagram illustrating an embodiment of a GUI for setting a sensitivity to detection of a movement pattern (gesture detection sensitivity), according to the disclosure.

FIG. 29 is a diagram illustrating an embodiment of a GUI for setting a sensitivity to detection of a movement pattern (gesture detection sensitivity), according to the disclosure.

Referring to 2910 of FIG. 29, according to the disclosure, the user terminal 400 may display a GUI for setting gesture detection sensitivity in the application execution window. The gesture detection sensitivity may refer to the sensitivity with which the cordless vacuum cleaner 100 detects a predefined movement pattern.

In an embodiment of the disclosure, the higher the gesture detection sensitivity applied to the cordless vacuum cleaner 100, the lower the detection accuracy for a predefined movement pattern, and the lower the gesture detection sensitivity applied to the cordless vacuum cleaner 100, the higher the detection accuracy for a predefined movement pattern. In an embodiment, the user may set the gesture detection sensitivity to 'high'. In this case, the cordless vacuum cleaner 100 may detect a current movement pattern as a predefined movement pattern when a degree of matching between the predefined movement pattern and the current movement pattern is 75% to 84%, for example. The user may set the gesture detection sensitivity to 'medium'. In this case, the cordless vacuum cleaner 100 may detect the current movement pattern as a predefined movement pattern when the degree of matching between the predefined movement pattern and the current movement pattern is 85% to 90%. The user may set the gesture detection sensitivity to 'low'. In this case, the cordless vacuum cleaner 100 may detect the current movement pattern as a predefined movement pattern when the degree of matching between the predefined movement pattern and the current movement pattern is 91% to 100%.

That is, when the gesture detection sensitivity is set to high, the cordless vacuum cleaner 100 may perform predetermined functions in situations not intended by the user. Therefore, the user needs to appropriately set a gesture detection sensitivity according to his or her preference.

Referring to 2920 of FIG. 29, the user terminal 400 may display a GUI that allows detailed adjustment of gesture detection sensitivity in the application execution window. In an embodiment, the user terminal 400 may set the gesture detection sensitivity between 75% and 100%, for example. When the user sets the gesture detection sensitivity to 75%, the cordless vacuum cleaner 100 may detect the current movement pattern as a predefined movement pattern when the degree of matching between the predefined movement pattern and the current movement pattern is 75% or more.

In an embodiment of the disclosure, there may be provided the cordless vacuum cleaner 100 for controlling an operation thereof based on a user gesture for moving the cordless vacuum cleaner 100 according to a predefined movement pattern. In an embodiment of the disclosure, there may be provided the cordless vacuum cleaner 100 for detecting a user gesture for moving the cordless vacuum cleaner 100 by activating a gesture detection mode when detecting that docking of the cordless vacuum cleaner 100 to the station device 200 is terminated.

The cordless vacuum cleaner 100 in an embodiment of the disclosure may include the at least one motion sensor 1950 which obtains movement information of the cordless vacuum cleaner 100, the memory 1900 storing information about predefined movement patterns corresponding to a plurality of control commands, and the at least one processor 1001. The at least one processor 1001 may, in response to detecting that docking or charging of the cordless vacuum cleaner 100 on the station device 200 is terminated, detect at least one movement pattern among the predefined movement patterns by analyzing movement information obtained via the at least one motion sensor 1950. The at least one processor 1001 may identify at least one control command corresponding to the detected at least one movement pattern. The at least one processor 1001 may control an operation of the cordless vacuum cleaner 100 based on the identified at least one control command.

The at least one processor 1001 may activate a gesture detection mode to detect the at least one movement pattern for a predetermined time period after the detecting that the docking or charging of the cordless vacuum cleaner 100 on the station device 200 is terminated. The at least one processor 1001 may deactivate the gesture detection mode when the at least one movement pattern is not detected for the predetermined time period.

The at least one processor 1001 may reactivate the gesture detection mode when receiving a user input for turning on power of the cordless vacuum cleaner 100 while the gesture detection mode is deactivated. The at least one processor 1001 may detect at least one movement pattern among the predefined movement patterns by analyzing the movement information of the cordless vacuum cleaner 100.

The at least one control command may include at least one of a control command for turning the power on or off, a control command for adjusting a strength of a suction power, a control command for adjusting RPM of the rotating brush in the brush device 2000, or a control command for setting an operation mode.

The at least one processor 1001 may obtain, from the battery 1500 of the cordless vacuum cleaner 100, information about whether there is contact between the charging terminal 1501 of the cordless vacuum cleaner 100 and the charging terminal 211 of the station device 200. The at least one processor 1001 may detect that the docking or charging of the cordless vacuum cleaner 100 on the station device 200 is terminated, based on the information about whether there is contact between the charging terminal 1501 of the cordless vacuum cleaner 100 and the charging terminal 211 of the station device 200.

The at least one processor 1001 may measure a voltage at the charging terminal 1501 of the cordless vacuum cleaner 100. The at least one processor 1001 may detect, based on the measured voltage, that the docking or charging of the cordless vacuum cleaner 100 on the station device 200 is terminated.

The at least one processor 1001 may, when a manual mode is set with respect to the gesture detection mode, receive a user input for activating the gesture detection mode. The at least one processor 1001 may activate the gesture detection mode in response to receiving the user input. The at least one processor 1001 may, when detecting a first movement pattern among the predefined movement patterns by analyzing the movement information obtained via the at least one motion sensor 1950, identify a first control command corresponding to the first movement pattern. The at least one processor 1001 may control an operation of the cordless vacuum cleaner 100 based on the first control command.

The at least one processor 1001 may, when detecting a second movement pattern among the predefined movement patterns by analyzing the movement information obtained via the at least one motion sensor 1950, identify a self-diagnostic command, from among the plurality of control commands, as a second control command corresponding to the second movement pattern. The at least one processor 1001 may perform self-diagnosis on the cordless vacuum cleaner 100 based on the self-diagnostic command. The at least one processor 1001 may output a result of the self-diagnosis performed on the cordless vacuum cleaner 100 via a display or a speaker.

The at least one processor 1001 may, when detecting a third movement pattern among the predefined movement patterns by analyzing the movement information obtained via the at least one motion sensor 1950, identify a command for setting an energy saving mode, from among the plurality of control commands, as a third control command corresponding to the third movement pattern. The at least one processor 1001 may, in response to the command for setting the energy saving mode, adjust the strength of suction power or the RPM of the rotating brush in the brush device 2000 to a lowest level, and adjust a sensing interval of at least one sensor included in the cordless vacuum cleaner 100 to be longer than a current sensing interval.

The cordless vacuum cleaner 100 may include the communication interface 1600 which receives the information about the predefined movement patterns corresponding to the plurality of control commands from the server device 300 via the station device 200.

The at least one processor 1001 may receive a user input for selecting, from among functions of the cordless vacuum cleaner 100, at least one function to be controlled via a movement using the cordless vacuum cleaner 100.

The at least one processor 1001 may activate detection of at least one movement pattern associated with the selected at least one function from among the predefined movement patterns and deactivate detection of movement patterns associated with the remaining functions other than the selected at least one function from among the predefined movement patterns.

The at least one processor 1001 may deactivate some of the plurality of control commands based on a current operating state of the cordless vacuum cleaner 100.

The at least one motion sensor 1950 may include at least one of a gyro sensor, an acceleration sensor, a magnetic sensor, a depth sensor, or an ultrasonic sensor.

A method of controlling an operation of the cordless vacuum cleaner 100, in an embodiment of the disclosure, may include storing information about predefined movement patterns corresponding to a plurality of control commands in the memory 1900 of the cordless vacuum cleaner 100, in response to detecting that docking or charging of the cordless vacuum cleaner 100 on the station device 200 is terminated, analyzing movement information obtained via the at least one motion sensor 1950 to detect at least one movement pattern among the predefined movement patterns, identifying at least one control command corresponding to the detected at least one movement pattern, and controlling an operation of the cordless vacuum cleaner 100 based on the identified at least one control command.

The method of controlling the operation of the cordless vacuum cleaner 100 may include activating a gesture detection mode to detect the at least one movement pattern for a predetermined time period after the detecting that the docking or charging of the cordless vacuum cleaner 100 on the station device 200 is terminated, and deactivating the gesture detection mode when the at least one movement pattern is not detected for the predetermined time period.

The at least one control command may include at least one of a control command for turning the power on or off, a control command for adjusting a strength of a suction power, a control command for adjusting RPM of the rotating brush in the brush device 2000, or a control command for setting an operation mode.

The method of controlling the operation of the cordless vacuum cleaner 100 may include obtaining, via the battery 1500 of the cordless vacuum cleaner 100, information about whether there is contact between the charging terminal 1501 of the cordless vacuum cleaner 100 and the charging terminal 211 of the station device 200, and detecting that the docking or charging of the cordless vacuum cleaner 100 on the station device 200 is terminated, based on the information about whether there is contact between the charging terminal 1501 of the cordless vacuum cleaner 100 and the charging terminal 211 of the station device 200.

The method of controlling the operation of the cordless vacuum cleaner 100 may include measuring a voltage at the charging terminal 1501 of the cordless vacuum cleaner 100, and detecting, based on the measured voltage, that the docking or charging of the cordless vacuum cleaner 100 on the station device 200 is terminated.

The method of controlling the operation of the cordless vacuum cleaner 100 may include receiving the information about the predefined movement patterns corresponding to the plurality of control commands from the server device 300 via the station device 200.

A machine-readable storage medium may be provided in the form of a non-transitory storage medium. In this regard, the term 'non-transitory' only means that the storage medium does not include a signal (e.g., an electromagnetic wave) and is a tangible device, and the term does not differentiate between where data is semi-permanently stored in the storage medium and where the data is temporarily stored in the storage medium. In an embodiment, the 'non-transitory storage medium' may include a buffer in which data is temporarily stored, for example.

In an embodiment, methods according to various embodiments of the disclosure may be included in a computer program product when provided. The computer program product may be traded, as a product, between a seller and a buyer. The computer program product may be distributed in the form of a machine-readable storage medium (e.g., compact disc-ROM (CD-ROM) or universal serial bus (USB) flash drive) or distributed (e.g., downloaded or uploaded) on-line via an application store or directly between two user devices (e.g., smartphones). For online distribution, at least a part of the computer program product (e.g., a downloadable app) may be at least transiently stored or temporally generated in the machine-readable storage medium such as memory of a server of a manufacturer, a server of an application store, or a relay server.

The invention claimed is:

1. A cordless vacuum cleaner comprising:
   at least one motion sensor which obtains movement information of the cordless vacuum cleaner;
   a memory which stores information about predefined movement patterns corresponding to a plurality of control commands; and
   at least one processor which:
      in response to detecting that docking or charging of the cordless vacuum cleaner on a station device is terminated, detects at least one movement pattern among the predefined movement patterns by analyzing the movement information obtained via the at least one motion sensor,
      identifies at least one control command corresponding to the detected at least one movement pattern, and
      controls an operation of the cordless vacuum cleaner based on the identified at least one control command.

2. The cordless vacuum cleaner of claim 1, wherein the at least one processor further:
   activates a gesture detection mode to detect the at least one movement pattern for a predetermined time period after the detecting that the docking or charging of the cordless vacuum cleaner on the station device is terminated, and
   deactivates the gesture detection mode when the at least one movement pattern is not detected for the predetermined time period.

3. The cordless vacuum cleaner of claim 2, wherein the at least one processor further:
   reactivates the gesture detection mode when receiving a user input for turning on power of the cordless vacuum cleaner while the gesture detection mode is deactivated, and
   detects at least one movement pattern among the predefined movement patterns by analyzing the movement information of the cordless vacuum cleaner.

4. The cordless vacuum cleaner of claim 1, wherein the at least one control command comprises at least one of a control command for turning power on or off, a control command for adjusting a strength of a suction power, a control command for adjusting revolutions per minute of a rotating brush in a brush device, or a control command for setting an operation mode.

5. The cordless vacuum cleaner of claim 1, wherein the at least one processor further:
   obtains, from a battery of the cordless vacuum cleaner, information about whether there is contact between a charging terminal of the cordless vacuum cleaner and a charging terminal of the station device, and
   detects that the docking or charging of the cordless vacuum cleaner on the station device is terminated, based on the information about whether there is contact between the charging terminal of the cordless vacuum cleaner and the charging terminal of the station device.

6. The cordless vacuum cleaner of claim 1, wherein the at least one processor further:
   measures a voltage at a charging terminal of the cordless vacuum cleaner, and
   detects, based on the measured voltage, that the docking or charging of the cordless vacuum cleaner on the station device is terminated.

7. The cordless vacuum cleaner of claim 2, wherein the at least one processor further:
   when a manual mode is set with respect to the gesture detection mode, receives a user input for activating the gesture detection mode,
   activates the gesture detection mode in response to receiving the user input,
   when detecting a first movement pattern among the predefined movement patterns by analyzing the movement information obtained via the at least one motion sensor, identifies a first control command corresponding to the first movement pattern, and
   controls an operation of the cordless vacuum cleaner based on the first control command.

8. The cordless vacuum cleaner of claim 1, wherein the at least one processor further:
   when detecting a second movement pattern among the predefined movement patterns by analyzing the movement information obtained via the at least one motion sensor, identifies a self-diagnostic command, from among the plurality of control commands, as a second control command corresponding to the second movement pattern,
   performs self-diagnosis on the cordless vacuum cleaner based on the self-diagnostic command, and
   outputs a result of the self-diagnosis performed on the cordless vacuum cleaner via a display or a speaker of the cordless vacuum cleaner.

9. The cordless vacuum cleaner of claim 1, wherein the at least one processor further:
   when detecting a third movement pattern among the predefined movement patterns by analyzing the movement information obtained via the at least one motion sensor, identifies a command for setting an energy saving mode, from among the plurality of control commands, as a third control command corresponding to the third movement pattern, and
   in response to the command for setting the energy saving mode, adjusts a strength of suction power or revolutions per minute of a rotating brush in a brush device to a lowest level, and adjusts a sensing interval of at least one sensor included in the cordless vacuum cleaner to be longer than a current sensing interval.

10. The cordless vacuum cleaner of claim 1, further comprising a communication interface which receives the information about the predefined movement patterns corresponding to the plurality of control commands from a server device via the station device.

11. The cordless vacuum cleaner of claim 1, wherein the at least one processor further receives a user input for selecting, from among functions of the cordless vacuum cleaner, at least one function to be controlled via a movement using the cordless vacuum cleaner.

12. The cordless vacuum cleaner of claim 11, wherein the at least one processor further activates detection of at least one movement pattern associated with a selected at least one function from among the predefined movement patterns and deactivates detection of movement patterns associated with remaining functions other than the selected at least one function from among the predefined movement patterns.

13. The cordless vacuum cleaner of claim 1, wherein the at least one processor further deactivates some of the plurality of control commands based on a current operating state of the cordless vacuum cleaner.

14. The cordless vacuum cleaner of claim 1, wherein the at least one motion sensor comprises at least one of a gyro sensor, an acceleration sensor, a magnetic sensor, a depth sensor, or an ultrasonic sensor.

* * * * *